US011668890B2

(12) United States Patent
Rosson

(10) Patent No.: US 11,668,890 B2
(45) Date of Patent: Jun. 6, 2023

(54) MULTIPORTS AND OTHER DEVICES HAVING OPTICAL CONNECTION PORTS WITH SECURING FEATURES AND METHODS OF MAKING THE SAME

(71) Applicant: Corning Research & Development Corporation, Corning, NY (US)

(72) Inventor: Joel Christopher Rosson, Hickory, NC (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 16/658,627

(22) Filed: Oct. 21, 2019

(65) Prior Publication Data

US 2020/0049922 A1 Feb. 13, 2020

Related U.S. Application Data

(63) Continuation of application No. PCT/US2018/040104, filed on Jun. 28, 2018, which is a continuation-in-part of application No. 16/018,918, filed on Jun. 26, 2018, now Pat. No. 10,379,298, and a continuation-in-part of application No. PCT/US2018/039494, filed on Jun. 26, 2018, and a continuation-in-part of application No. 16/018,988, (Continued)

(51) Int. Cl.
*G02B 6/44* (2006.01)

(52) U.S. Cl.
CPC ......... *G02B 6/4472* (2013.01); *G02B 6/4444* (2013.01)

(58) Field of Classification Search
CPC ................................... G02B 6/38; G02B 6/00
See application file for complete search history.

(56) References Cited

U.S. PATENT DOCUMENTS 3,792,284 A 2/1974 Kaelin
3,912,362 A 10/1975 Hudson
(Continued)

FOREIGN PATENT DOCUMENTS

AU 2006232206 A1 10/2006
CN 1060911 A 5/1992
(Continued)

OTHER PUBLICATIONS

Invitation to pay Additional Fees of the European International Searching Authority; PCT/US2019/058316; dated Feb. 14, 2020; 12 pgs.
(Continued)

*Primary Examiner* — Eric Wong
(74) *Attorney, Agent, or Firm* — Michael E. Carroll, Jr.

(57) ABSTRACT

Devices such as multiports comprising connection ports with associated securing features and methods for making the same are disclosed. In one embodiment, the device comprises a shell, at least one connection port, and at least one securing feature. The at least one connection port is disposed on the multiport with the at least one connection port comprising an optical connector opening extending from an outer surface of the multiport to a cavity of the multiport and defining a connection port passageway. The at least one securing feature is associated with the connection port passageway, and is biased by a resilient member.

22 Claims, 34 Drawing Sheets

Related U.S. Application Data filed on Jun. 26, 2018, now Pat. No. 10,359,577, and a continuation-in-part of application No. 16/019,008, filed on Jun. 26, 2018, now Pat. No. 10,429,594, and a continuation-in-part of application No. PCT/US2018/039485, filed on Jun. 26, 2018, and a continuation-in-part of application No. PCT/US2018/039490, filed on Jun. 26, 2018, and a continuation-in-part of application No. PCT/US2018/039484, filed on Jun. 26, 2018, and a continuation-in-part of application No. 16/018,997, filed on Jun. 26, 2018, now Pat. No. 10,386,584, and a continuation-in-part of application No. 16/015,588, filed on Jun. 22, 2018, now Pat. No. 10,605,998, and a continuation-in-part of application No. PCT/US2018/039020, filed on Jun. 22, 2018, and a continuation-in-part of application No. PCT/US2018/039019, filed on Jun. 22, 2018, and a continuation-in-part of application No. 16/015,583, filed on Jun. 22, 2018, now Pat. No. 10,429,593, and a continuation-in-part of application No. PCT/US2017/064063, filed on Nov. 30, 2017, and a continuation-in-part of application No. PCT/US2017/064095, filed on Nov. 30, 2017, and a continuation-in-part of application No. PCT/US2017/064092, filed on Nov. 30, 2017, and a continuation-in-part of application No. PCT/US2017/064071, filed on Nov. 30, 2017, and a continuation-in-part of application No. PCT/US2017/064022, filed on Nov. 30, 2017, and a continuation-in-part of application No. PCT/US2017/064072, filed on Nov. 30, 2017.

(60) Provisional application No. 62/526,011, filed on Jun. 28, 2017, provisional application No. 62/526,018, filed on Jun. 28, 2017, provisional application No. 62/526,195, filed on Jun. 28, 2017.

(56) References Cited

U.S. PATENT DOCUMENTS

| | | | |
|---|---|---|---|
| 4,148,557 | A | 4/1979 | Garvey |
| 4,167,303 | A | 9/1979 | Bowen et al. |
| 4,168,109 | A | 9/1979 | Dumire |
| 4,336,977 | A | 6/1982 | Monaghan et al. |
| 4,373,777 | A | 2/1983 | Borsuk et al. |
| 4,413,880 | A | 11/1983 | Forrest et al. |
| 4,423,922 | A | 1/1984 | Porter |
| 4,440,471 | A | 4/1984 | Knowles |
| 4,461,537 | A | 7/1984 | Raymer et al. |
| 4,547,937 | A | 10/1985 | Collins |
| 4,615,581 | A | 10/1986 | Morimoto |
| 4,634,858 | A | 1/1987 | Gerdt et al. |
| 4,688,200 | A | 8/1987 | Poorman et al. |
| 4,690,563 | A | 9/1987 | Barton et al. |
| 4,711,752 | A | 12/1987 | Deacon et al. |
| 4,723,827 | A | 2/1988 | Shaw et al. |
| 4,741,590 | A | 5/1988 | Caron |
| 4,842,363 | A | 6/1989 | Margolin et al. |
| 4,844,570 | A | 7/1989 | Tanabe |
| 4,877,303 | A | 10/1989 | Caldwell et al. |
| 4,944,568 | A | 7/1990 | Danbach et al. |
| 4,979,792 | A | 12/1990 | Weber et al. |
| 5,007,860 | A | 4/1991 | Robinson et al. |
| 5,067,783 | A | 11/1991 | Lampert |
| 5,073,042 | A | 12/1991 | Mulholland et al. |
| 5,076,656 | A | 12/1991 | Briggs et al. |
| 5,085,492 | A | 2/1992 | Kelsoe et al. |
| 5,088,804 | A | 2/1992 | Grinderslev |
| 5,091,990 | A | 2/1992 | Leung et al. |
| 5,131,735 | A | 7/1992 | Berkey et al. |
| 5,142,602 | A | 8/1992 | Cabato et al. |
| 5,146,519 | A | 9/1992 | Miller et al. |
| 5,155,900 | A | 10/1992 | Grois et al. |
| 5,162,397 | A | 11/1992 | Descamps et al. |
| 5,210,810 | A | 5/1993 | Darden et al. |
| 5,212,752 | A | 5/1993 | Stephenson et al. |
| 5,224,187 | A | 6/1993 | Davisdon |
| 5,231,685 | A | 7/1993 | Hanzawa et al. |
| 5,245,683 | A | 9/1993 | Belenkiy et al. |
| 5,263,239 | A | 11/1993 | Ziemek |
| 5,276,750 | A | 1/1994 | Manning |
| 5,317,663 | A | 5/1994 | Beard et al. |
| 5,321,917 | A | 6/1994 | Franklin et al. |
| 5,375,183 | A | 12/1994 | Edwards et al. |
| 5,381,494 | A | 1/1995 | O'Donnell et al. |
| 5,390,269 | A | 2/1995 | Palecek et al. |
| 5,408,570 | A | 4/1995 | Cook et al. |
| 5,425,121 | A | 6/1995 | Cooke et al. |
| 5,452,388 | A | 9/1995 | Rittle et al. |
| 5,519,799 | A | 5/1996 | Murakami et al. |
| 5,553,186 | A | 9/1996 | Allen |
| 5,557,696 | A | 9/1996 | Stein |
| 5,569,050 | A | 10/1996 | Lloyd |
| 5,588,077 | A | 12/1996 | Woodside |
| 5,600,747 | A | 2/1997 | Yamakawa et al. |
| 5,603,631 | A | 2/1997 | Kawahara et al. |
| 5,608,828 | A | 3/1997 | Coutts et al. |
| 5,631,993 | A | 5/1997 | Cloud et al. |
| 5,647,045 | A | 7/1997 | Robinson et al. |
| 5,673,346 | A | 9/1997 | Iwano et al. |
| 5,694,507 | A | 12/1997 | Walles |
| 5,748,821 | A | 5/1998 | Schempp et al. |
| 5,761,359 | A | 6/1998 | Chudoba et al. |
| 5,781,686 | A | 7/1998 | Robinson et al. |
| 5,782,892 | A | 7/1998 | Castle et al. |
| 5,790,740 | A | 8/1998 | Cloud et al. |
| 5,791,918 | A | 8/1998 | Pierce |
| 5,796,895 | A | 8/1998 | Jennings et al. |
| RE35,935 | E | 10/1998 | Cabato et al. |
| 5,818,993 | A | 10/1998 | Chudoba et al. |
| 5,857,050 | A | 1/1999 | Jiang et al. |
| 5,862,290 | A | 1/1999 | Burek |
| 5,876,071 | A | 3/1999 | Aldridge |
| 5,883,999 | A | 3/1999 | Cloud et al. |
| 5,884,000 | A | 3/1999 | Cloud et al. |
| 5,884,001 | A | 3/1999 | Cloud et al. |
| 5,884,002 | A | 3/1999 | Cloud et al. |
| 5,884,003 | A | 3/1999 | Cloud et al. |
| 5,887,099 | A | 3/1999 | Csipkes et al. |
| 5,920,669 | A | 7/1999 | Knecht et al. |
| 5,925,191 | A | 7/1999 | Stein et al. |
| 5,926,596 | A | 7/1999 | Edwards et al. |
| 5,960,141 | A | 9/1999 | Sasaki et al. |
| 5,961,344 | A | 10/1999 | Rosales et al. |
| 5,971,626 | A | 10/1999 | Knodell et al. |
| RE36,592 | E | 2/2000 | Giebel et al. |
| 6,030,129 | A | 2/2000 | Rosson |
| 6,035,084 | A | 3/2000 | Haake et al. |
| 6,045,270 | A | 4/2000 | Weiss et al. |
| 6,094,517 | A | 7/2000 | Yuuki |
| 6,108,482 | A | 8/2000 | Roth |
| 6,112,006 | A | 8/2000 | Foss |
| 6,179,482 | B1 | 1/2001 | Takizawa et al. |
| 6,193,421 | B1 | 2/2001 | Tamekuni et al. |
| RE37,079 | E | 3/2001 | Stephenson et al. |
| RE37,080 | E | 3/2001 | Stephenson et al. |
| 6,200,040 | B1 | 3/2001 | Edwards et al. |
| 6,206,581 | B1 | 3/2001 | Driscoll et al. |
| 6,220,762 | B1 | 4/2001 | Kanai et al. |
| 6,224,268 | B1 | 5/2001 | Manning et al. |
| 6,224,270 | B1 | 5/2001 | Nakajima et al. |
| 6,293,710 | B1 | 9/2001 | Lampert et al. |
| 6,298,190 | B2 | 10/2001 | Waldron et al. |
| 6,321,013 | B1 | 11/2001 | Hardwick et al. |
| 6,356,390 | B1 | 3/2002 | Hall, Jr. |
| 6,375,363 | B1 | 4/2002 | Harrison et al. |
| 6,402,388 | B1 | 6/2002 | Imazu et al. |
| 6,404,962 | B1 | 6/2002 | Hardwick et al. |
| 6,409,391 | B1 | 6/2002 | Chang |
| 6,427,035 | B1 | 7/2002 | Mahony |

(56) References Cited

U.S. PATENT DOCUMENTS

| | | |
|---|---|---|
| 6,428,215 B1 | 8/2002 | Nault |
| 6,466,725 B2 | 10/2002 | Battey et al. |
| 6,496,641 B1 | 12/2002 | Mahony |
| 6,522,804 B1 | 2/2003 | Mahony |
| 6,533,468 B2 | 3/2003 | Nakajima et al. |
| 6,536,956 B2 | 3/2003 | Luther et al. |
| 6,542,652 B1 | 4/2003 | Mahony |
| 6,554,489 B2 | 4/2003 | Kent et al. |
| 6,625,375 B1 | 9/2003 | Mahony |
| 6,629,782 B2 | 10/2003 | McPhee et al. |
| 6,672,774 B2 | 1/2004 | Theuerkorn et al. |
| 6,678,442 B2 | 1/2004 | Gall et al. |
| 6,695,489 B2 | 2/2004 | Nault |
| 6,702,475 B1 | 3/2004 | Giobbio et al. |
| 6,738,555 B1 | 5/2004 | Cooke et al. |
| 6,748,146 B2 | 6/2004 | Parris |
| 6,771,861 B2 | 8/2004 | Wagner et al. |
| 6,789,950 B1 | 9/2004 | Loder et al. |
| 6,841,729 B2 | 1/2005 | Sakabe et al. |
| 6,856,748 B1 | 2/2005 | Elkins et al. |
| 6,877,906 B2 | 4/2005 | Mizukami et al. |
| 6,880,219 B2 | 4/2005 | Griffioen et al. |
| 6,908,233 B2 | 6/2005 | Nakajima et al. |
| 6,916,120 B2 | 7/2005 | Zimmel et al. |
| 6,944,387 B2 | 9/2005 | Howell et al. |
| 6,962,445 B2 | 11/2005 | Zimmel et al. |
| 6,970,629 B2 | 11/2005 | Lail et al. |
| 6,983,095 B2 | 1/2006 | Reagan et al. |
| 7,013,074 B2 | 3/2006 | Battey et al. |
| 7,044,650 B1 | 5/2006 | Tran et al. |
| 7,052,185 B2 | 5/2006 | Rubino et al. |
| 7,088,899 B2 | 8/2006 | Reagan et al. |
| 7,103,255 B2 | 9/2006 | Reagan et al. |
| 7,103,257 B2 | 9/2006 | Donaldson et al. |
| 7,118,283 B2 | 10/2006 | Nakajima et al. |
| 7,118,284 B2 | 10/2006 | Nakajima et al. |
| 7,120,347 B2 | 10/2006 | Blackwell, Jr. et al. |
| 7,146,089 B2 | 12/2006 | Reagan et al. |
| 7,150,567 B1 | 12/2006 | Luther et al. |
| 7,171,102 B2 | 1/2007 | Reagan et al. |
| 7,195,403 B2 | 3/2007 | Oki et al. |
| 7,200,317 B2 | 4/2007 | Reagan et al. |
| 7,201,518 B2 | 4/2007 | Holmquist |
| 7,213,975 B2 | 5/2007 | Khemakhem et al. |
| 7,213,980 B2 | 5/2007 | Oki et al. |
| 7,228,047 B1 | 6/2007 | Szilagyi et al. |
| 7,232,260 B2 | 6/2007 | Takahashi et al. |
| 7,236,670 B2 | 6/2007 | Lail et al. |
| 7,260,301 B2 | 8/2007 | Barth et al. |
| 7,261,472 B2 | 8/2007 | Suzuki et al. |
| 7,266,265 B2 | 9/2007 | Gall et al. |
| 7,266,274 B2 | 9/2007 | Elkins et al. |
| 7,277,614 B2 | 10/2007 | Cody et al. |
| 7,279,643 B2 | 10/2007 | Morrow et al. |
| 7,292,763 B2 | 11/2007 | Smith et al. |
| 7,302,152 B2 | 11/2007 | Luther et al. |
| 7,318,677 B2 | 1/2008 | Dye |
| 7,326,091 B2 | 2/2008 | Nania et al. |
| 7,330,629 B2 | 2/2008 | Cooke et al. |
| 7,333,708 B2 | 2/2008 | Blackwell, Jr. et al. |
| 7,336,873 B2 | 2/2008 | Lail et al. |
| 7,341,382 B2 | 3/2008 | Dye |
| 7,346,256 B2 | 3/2008 | Marrs et al. |
| 7,349,605 B2 | 3/2008 | Noonan et al. |
| 7,357,582 B2 | 4/2008 | Oki et al. |
| 7,366,416 B2 | 4/2008 | Ramachandran et al. |
| 7,394,964 B2 | 7/2008 | Tinucci et al. |
| 7,397,997 B2 | 7/2008 | Ferris et al. |
| 7,400,815 B2 | 7/2008 | Mertesdorf et al. |
| 7,407,332 B2 | 8/2008 | Oki et al. |
| 7,428,366 B2 | 9/2008 | Mullaney et al. |
| 7,444,056 B2 | 10/2008 | Allen et al. |
| 7,454,107 B2 | 11/2008 | Miller et al. |
| 7,463,803 B2 | 12/2008 | Cody et al. |
| 7,469,091 B2 | 12/2008 | Mullaney et al. |
| 7,477,824 B2 | 1/2009 | Reagan et al. |
| 7,480,437 B2 | 1/2009 | Ferris et al. |
| 7,484,898 B2 | 2/2009 | Katagiyama et al. |
| 7,485,804 B2 | 2/2009 | Dinh et al. |
| 7,489,849 B2 | 2/2009 | Reagan et al. |
| 7,492,996 B2 | 2/2009 | Kowalczyk et al. |
| 7,512,304 B2 | 3/2009 | Gronvall et al. |
| 7,520,678 B2 | 4/2009 | Khemakhem et al. |
| 7,539,387 B2 | 5/2009 | Mertesdorf et al. |
| 7,539,388 B2 | 5/2009 | Mertesdorf et al. |
| 7,542,645 B1 | 6/2009 | Hua et al. |
| 7,559,702 B2 | 7/2009 | Fujiwara et al. |
| 7,565,055 B2 | 7/2009 | Lu et al. |
| 7,568,845 B2 | 8/2009 | Caveney et al. |
| 7,572,065 B2 | 8/2009 | Lu et al. |
| 7,591,595 B2 | 9/2009 | Lu et al. |
| 7,614,797 B2 | 11/2009 | Lu et al. |
| 7,621,675 B1 | 11/2009 | Bradley |
| 7,627,222 B2 | 12/2009 | Reagan et al. |
| 7,628,545 B2 | 12/2009 | Cody et al. |
| 7,628,548 B2 | 12/2009 | Benjamin et al. |
| 7,646,958 B1 | 1/2010 | Reagan et al. |
| 7,653,282 B2 | 1/2010 | Blackwell, Jr. et al. |
| 7,654,747 B2 | 2/2010 | Theuerkorn et al. |
| 7,654,748 B2 | 2/2010 | Kuffel et al. |
| 7,658,549 B2 | 2/2010 | Elkins et al. |
| 7,661,995 B2 | 2/2010 | Nania et al. |
| 7,677,814 B2 | 3/2010 | Lu et al. |
| 7,680,388 B2 | 3/2010 | Reagan et al. |
| 7,708,476 B2 | 5/2010 | Liu |
| 7,709,733 B1 | 5/2010 | Plankell |
| 7,712,971 B2 | 5/2010 | Lee et al. |
| 7,722,262 B2 | 5/2010 | Caveney et al. |
| 7,726,998 B2 | 6/2010 | Siebens |
| 7,738,759 B2 | 6/2010 | Parikh et al. |
| 7,740,409 B2 | 6/2010 | Bolton et al. |
| 7,742,117 B2 | 6/2010 | Lee et al. |
| 7,742,670 B2 | 6/2010 | Benjamin et al. |
| 7,744,286 B2 | 6/2010 | Lu et al. |
| 7,744,288 B2 | 6/2010 | Lu et al. |
| 7,747,117 B2 | 6/2010 | Greenwood et al. |
| 7,751,666 B2 | 7/2010 | Parsons et al. |
| 7,753,596 B2 | 7/2010 | Cox |
| 7,762,726 B2 | 7/2010 | Lu et al. |
| 7,785,019 B2 | 8/2010 | Lewallen et al. |
| 7,805,044 B2 | 9/2010 | Reagan et al. |
| 7,806,599 B2 | 10/2010 | Margolin et al. |
| 7,820,090 B2 | 10/2010 | Morrow et al. |
| 7,844,158 B2 | 11/2010 | Gronvall et al. |
| 7,844,160 B2 | 11/2010 | Reagan et al. |
| 7,869,681 B2 | 1/2011 | Battey et al. |
| RE42,094 E | 2/2011 | Barnes et al. |
| 7,881,576 B2 | 2/2011 | Melton et al. |
| 7,889,961 B2 | 2/2011 | Cote et al. |
| 7,891,882 B2 | 2/2011 | Kuffel et al. |
| 7,903,923 B2 | 3/2011 | Gronvall et al. |
| 7,903,925 B2 | 3/2011 | Cooke et al. |
| 7,933,517 B2 | 4/2011 | Ye et al. |
| 7,938,670 B2 | 5/2011 | Nania et al. |
| 7,941,027 B2 | 5/2011 | Mertesdorf et al. |
| 7,959,361 B2 | 6/2011 | Lu et al. |
| 8,002,476 B2 | 8/2011 | Caveney et al. |
| 8,005,335 B2 | 8/2011 | Reagan et al. |
| 8,023,793 B2 | 9/2011 | Kowalczyk et al. |
| 8,025,445 B2 | 9/2011 | Rambow et al. |
| 8,041,178 B2 | 10/2011 | Lu et al. |
| 8,052,333 B2 | 11/2011 | Kuffel et al. |
| 8,055,167 B2 | 11/2011 | Park et al. |
| 8,083,418 B2 | 12/2011 | Fujiwara et al. |
| 8,111,966 B2 | 2/2012 | Holmberg et al. |
| 8,137,002 B2 | 3/2012 | Lu et al. |
| 8,147,147 B2 | 4/2012 | Khemakhem et al. |
| 8,157,454 B2 | 4/2012 | Ito et al. |
| 8,164,050 B2 | 4/2012 | Ford et al. |
| 8,202,008 B2 | 6/2012 | Lu et al. |
| 8,213,761 B2 | 7/2012 | Gronvall et al. |
| 8,218,935 B2 | 7/2012 | Reagan et al. |
| 8,224,145 B2 | 7/2012 | Reagan et al. |
| 8,229,263 B2 | 7/2012 | Parris et al. |

(56) References Cited

U.S. PATENT DOCUMENTS

| | | |
|---|---|---|
| 8,231,282 B2 | 7/2012 | Kuffel et al. |
| 8,238,706 B2 | 8/2012 | Kachmar |
| 8,238,709 B2 | 8/2012 | Solheid et al. |
| 8,249,450 B2 | 8/2012 | Conner |
| 8,256,971 B2 | 9/2012 | Caveney et al. |
| 8,267,596 B2 | 9/2012 | Theuerkorn |
| RE43,762 E | 10/2012 | Smith et al. |
| 8,301,003 B2 | 10/2012 | De et al. |
| 8,301,004 B2 | 10/2012 | Cooke et al. |
| 8,317,411 B2 | 11/2012 | Fujiwara et al. |
| 8,348,519 B2 | 1/2013 | Kuffel et al. |
| 8,363,999 B2 | 1/2013 | Mertesdorf et al. |
| 8,376,629 B2 | 2/2013 | Cline et al. |
| 8,376,632 B2 | 2/2013 | Blackburn et al. |
| 8,402,587 B2 | 3/2013 | Sugita et al. |
| 8,408,811 B2 | 4/2013 | De et al. |
| 8,414,196 B2 | 4/2013 | Lu et al. |
| 8,466,262 B2 | 6/2013 | Siadak et al. |
| 8,472,773 B2 | 6/2013 | De Jong |
| 8,480,312 B2 | 7/2013 | Smith et al. |
| 8,494,329 B2 | 7/2013 | Nhep et al. |
| 8,496,384 B2 | 7/2013 | Kuffel et al. |
| 8,506,173 B2 | 8/2013 | Lewallen et al. |
| 8,520,996 B2 | 8/2013 | Cowen et al. |
| 8,534,928 B2 | 9/2013 | Cooke et al. |
| 8,536,516 B2 | 9/2013 | Ford et al. |
| 8,556,522 B2 | 10/2013 | Cunningham |
| 8,573,855 B2 | 11/2013 | Nhep |
| 8,591,124 B2 | 11/2013 | Griffiths et al. |
| 8,622,627 B2 | 1/2014 | Elkins et al. |
| 8,622,634 B2 | 1/2014 | Arnold et al. |
| 8,635,733 B2 | 1/2014 | Bardzilowski |
| 8,662,760 B2 | 3/2014 | Cline et al. |
| 8,668,512 B2 | 3/2014 | Chang |
| 8,678,668 B2 | 3/2014 | Cooke et al. |
| 8,687,930 B2 | 4/2014 | McDowell et al. |
| 8,702,324 B2 | 4/2014 | Caveney et al. |
| 8,714,835 B2 | 5/2014 | Kuffel et al. |
| 8,727,638 B2 | 5/2014 | Lee et al. |
| 8,737,837 B2 | 5/2014 | Conner et al. |
| 8,755,663 B2 | 6/2014 | Makrides-Saravanos et al. |
| 8,758,046 B2 | 6/2014 | Pezzetti et al. |
| 8,770,861 B2 | 7/2014 | Smith et al. |
| 8,770,862 B2 | 7/2014 | Lu et al. |
| 8,837,894 B2 | 9/2014 | Holmberg et al. |
| 8,864,390 B2 | 10/2014 | Chen et al. |
| 8,870,469 B2 | 10/2014 | Kachmar |
| 8,879,883 B2 | 11/2014 | Parikh et al. |
| 8,882,364 B2 | 11/2014 | Busse et al. |
| 8,917,966 B2 | 12/2014 | Thompson et al. |
| 8,974,124 B2 | 3/2015 | Chang |
| 8,992,097 B2 | 3/2015 | Koreeda et al. |
| 8,998,502 B2 | 4/2015 | Benjamin et al. |
| 8,998,506 B2 | 4/2015 | Pepin et al. |
| 9,011,858 B2 | 4/2015 | Siadak et al. |
| 9,039,293 B2 | 5/2015 | Hill et al. |
| 9,075,205 B2 | 7/2015 | Pepe et al. |
| 9,146,364 B2 | 9/2015 | Chen et al. |
| 9,151,906 B2 | 10/2015 | Kobayashi et al. |
| 9,151,909 B2 | 10/2015 | Chen et al. |
| 9,158,074 B2 | 10/2015 | Anderson et al. |
| 9,158,075 B2 | 10/2015 | Benjamin et al. |
| 9,182,567 B2 | 11/2015 | Mullaney |
| 9,188,759 B2 | 11/2015 | Conner |
| 9,207,410 B2 | 12/2015 | Lee et al. |
| 9,207,421 B2 | 12/2015 | Conner |
| 9,213,150 B2 | 12/2015 | Matsui et al. |
| 9,223,106 B2 | 12/2015 | Coan et al. |
| 9,239,441 B2 | 1/2016 | Melton et al. |
| 9,268,102 B2 | 2/2016 | Daems et al. |
| 9,274,286 B2 | 3/2016 | Caveney et al. |
| 9,279,951 B2 | 3/2016 | McGranahan et al. |
| 9,285,550 B2 | 3/2016 | Nhep et al. |
| 9,297,974 B2 | 3/2016 | Valderrabano et al. |
| 9,297,976 B2 | 3/2016 | Hill et al. |
| 9,310,570 B2 | 4/2016 | Busse et al. |
| 9,316,791 B2 | 4/2016 | Durrant et al. |
| 9,322,998 B2 | 4/2016 | Miller |
| 9,360,640 B2 | 6/2016 | Ishigami et al. |
| 9,383,539 B2 | 7/2016 | Hill et al. |
| 9,400,364 B2 | 7/2016 | Hill et al. |
| 9,405,068 B2 | 8/2016 | Graham et al. |
| 9,417,403 B2 | 8/2016 | Mullaney et al. |
| 9,423,584 B2 | 8/2016 | Coan et al. |
| 9,435,969 B2 | 9/2016 | Lambourn et al. |
| 9,442,257 B2 | 9/2016 | Lu |
| 9,450,393 B2 | 9/2016 | Thompson et al. |
| 9,459,412 B2 | 10/2016 | Katoh |
| 9,482,819 B2 | 11/2016 | Li et al. |
| 9,482,829 B2 | 11/2016 | Lu et al. |
| 9,513,451 B2 | 12/2016 | Corbille et al. |
| 9,535,229 B2 | 1/2017 | Ott et al. |
| 9,541,711 B2 | 1/2017 | Raven et al. |
| 9,557,504 B2 | 1/2017 | Holmberg et al. |
| 9,684,138 B2 | 1/2017 | Lu |
| 9,581,775 B2 | 2/2017 | Kondo et al. |
| 9,588,304 B2 | 3/2017 | Durrant et al. |
| 9,612,407 B2 | 4/2017 | Kobayashi et al. |
| 9,618,704 B2 | 4/2017 | Dean et al. |
| 9,618,718 B2 | 4/2017 | Islam |
| 9,624,296 B2 | 4/2017 | Siadak et al. |
| 9,625,660 B2 | 4/2017 | Daems et al. |
| 9,638,871 B2 | 5/2017 | Bund et al. |
| 9,645,331 B1 | 5/2017 | Kim |
| 9,645,334 B2 | 5/2017 | Ishii et al. |
| 9,651,741 B2 | 5/2017 | Isenhour et al. |
| 9,664,862 B2 | 5/2017 | Lu et al. |
| 9,678,285 B2 | 6/2017 | Hill et al. |
| 9,678,293 B2 | 6/2017 | Coan et al. |
| 9,684,136 B2 | 6/2017 | Cline et al. |
| 9,696,500 B2 | 7/2017 | Barnette et al. |
| 9,711,868 B2 | 7/2017 | Scheucher |
| 9,720,193 B2 | 8/2017 | Nishimura |
| 9,733,436 B2 | 8/2017 | Van et al. |
| 9,739,951 B2 | 8/2017 | Busse et al. |
| 9,762,322 B1 | 9/2017 | Amundson |
| 9,766,416 B1 | 9/2017 | Kim |
| 9,772,457 B2 | 9/2017 | Hill et al. |
| 9,804,343 B2 | 10/2017 | Hill et al. |
| 9,810,855 B2 | 11/2017 | Cox et al. |
| 9,810,856 B2 | 11/2017 | Graham et al. |
| 9,829,658 B2 | 11/2017 | Nishimura |
| 9,829,668 B2 | 11/2017 | Coenegracht et al. |
| 9,851,522 B2 | 12/2017 | Reagan et al. |
| 9,857,540 B2 | 1/2018 | Ahmed et al. |
| 9,864,151 B2 | 1/2018 | Lu |
| 9,878,038 B2 | 1/2018 | Siadak et al. |
| 9,885,841 B2 | 2/2018 | Pepe |
| 9,891,391 B2 | 2/2018 | Watanabe |
| 9,905,933 B2 | 2/2018 | Scheucher |
| 9,910,236 B2 | 3/2018 | Cooke et al. |
| 9,921,375 B2 | 3/2018 | Compton et al. |
| 9,927,580 B2 | 3/2018 | Bretz et al. |
| 9,933,582 B1 | 4/2018 | Lin |
| 9,939,591 B2 | 4/2018 | Mullaney et al. |
| 9,964,713 B2 | 5/2018 | Barnette et al. |
| 9,964,715 B2 | 5/2018 | Lu |
| 9,977,194 B2 | 5/2018 | Waldron et al. |
| 9,977,198 B2 | 5/2018 | Bund et al. |
| 9,983,374 B2 | 5/2018 | Li et al. |
| 10,007,068 B2 | 6/2018 | Hill et al. |
| 10,031,302 B2 | 7/2018 | Ji et al. |
| 10,036,859 B2 | 7/2018 | Daems et al. |
| 10,038,946 B2 | 7/2018 | Smolorz |
| 10,042,136 B2 | 8/2018 | Reagan et al. |
| 10,061,090 B2 | 8/2018 | Coenegracht |
| 10,073,224 B2 | 9/2018 | Tong et al. |
| 10,094,986 B2 | 10/2018 | Barnette et al. |
| 10,101,538 B2 | 10/2018 | Lu et al. |
| 10,107,968 B2 | 10/2018 | Tong et al. |
| 10,109,927 B2 | 10/2018 | Scheucher |
| 10,114,176 B2 | 10/2018 | Gimblet et al. |
| 10,126,508 B2 | 11/2018 | Compton et al. |
| 10,180,541 B2 | 1/2019 | Coenegracht et al. |

(56) References Cited

U.S. PATENT DOCUMENTS

| | | | |
|---|---|---|---|
| 10,209,454 B2 | 2/2019 | Isenhour et al. |
| 10,215,930 B2 | 2/2019 | Mullaney et al. |
| 10,235,184 B2 | 3/2019 | Walker |
| 10,261,268 B2 | 4/2019 | Theuerkorn |
| 10,268,011 B2 | 4/2019 | Courchaine et al. |
| 10,288,820 B2 | 5/2019 | Coenegracht |
| 10,317,628 B2 | 6/2019 | Van et al. |
| 10,324,263 B2 | 6/2019 | Bund et al. |
| 10,338,323 B2 | 7/2019 | Lu et al. |
| 10,353,154 B2 | 7/2019 | Ott et al. |
| 10,353,156 B2 | 7/2019 | Hill et al. |
| 10,359,577 B2 | 7/2019 | Dannoux et al. |
| 10,371,914 B2 | 8/2019 | Coan et al. |
| 10,379,298 B2 | 8/2019 | Dannoux et al. |
| 10,386,584 B2 | 8/2019 | Rosson |
| 10,401,575 B2 | 9/2019 | Daily et al. |
| 10,401,578 B2 | 9/2019 | Coenegracht |
| 10,401,584 B2 | 9/2019 | Coan et al. |
| 10,409,007 B2 | 9/2019 | Kadar-Kallen et al. |
| 10,422,962 B2 | 9/2019 | Coenegracht |
| 10,422,970 B2 | 9/2019 | Holmberg et al. |
| 10,429,593 B2 | 10/2019 | Baca et al. |
| 10,429,594 B2 | 10/2019 | Dannoux et al. |
| 10,434,173 B2 | 10/2019 | Siadak et al. |
| 10,439,295 B2 | 10/2019 | Scheucher |
| 10,444,442 B2 | 10/2019 | Takano et al. |
| 10,451,811 B2 | 10/2019 | Coenegracht et al. |
| 10,451,817 B2 | 10/2019 | Lu |
| 10,451,830 B2 | 10/2019 | Szumacher et al. |
| 10,488,597 B2 | 11/2019 | Parikh et al. |
| 10,495,822 B2 | 12/2019 | Nhep |
| 10,502,916 B2 | 12/2019 | Coan et al. |
| 10,520,683 B2 | 12/2019 | Nhep |
| 10,539,745 B2 | 1/2020 | Kamada et al. |
| 10,578,821 B2 | 3/2020 | Ott et al. |
| 10,585,246 B2 | 3/2020 | Bretz et al. |
| 10,591,678 B2 | 3/2020 | Mullaney et al. |
| 10,605,998 B2 | 3/2020 | Rosson |
| 10,606,006 B2 | 3/2020 | Hill et al. |
| 10,613,278 B2 | 4/2020 | Kempeneers et al. |
| 10,620,388 B2 | 4/2020 | Isenhour et al. |
| 10,656,347 B2 | 5/2020 | Kato |
| 10,677,998 B2 | 6/2020 | Van et al. |
| 10,680,343 B2 | 6/2020 | Scheucher |
| 10,712,516 B2 | 7/2020 | Courchaine et al. |
| 10,739,534 B2 | 8/2020 | Murray et al. |
| 10,746,939 B2 | 8/2020 | Lu et al. |
| 10,761,274 B2 | 9/2020 | Pepe et al. |
| 10,782,487 B2 | 9/2020 | Lu |
| 10,802,236 B2 * | 10/2020 | Kowalczyk ............ G02B 6/445 |
| 10,830,967 B2 | 11/2020 | Pimentel et al. |
| 10,830,975 B2 | 11/2020 | Vaughn et al. |
| 10,852,498 B2 | 12/2020 | Hill et al. |
| 10,852,499 B2 | 12/2020 | Cooke et al. |
| 10,859,771 B2 | 12/2020 | Nhep |
| 10,859,781 B2 | 12/2020 | Hill et al. |
| 10,962,731 B2 | 3/2021 | Coenegracht |
| 10,976,500 B2 | 4/2021 | Ott et al. |
| 11,061,191 B2 | 7/2021 | Van Baelen et al. |
| 11,290,188 B2 | 3/2022 | Tuccio et al. |
| 2001/0002220 A1 | 5/2001 | Throckmorton et al. |
| 2001/0012428 A1 | 8/2001 | Nakajima et al. |
| 2002/0012502 A1 | 1/2002 | Farrar et al. |
| 2002/0064364 A1 | 5/2002 | Battey et al. |
| 2002/0076165 A1 | 6/2002 | Childers et al. |
| 2002/0079697 A1 | 6/2002 | Griffioen et al. |
| 2002/0081077 A1 | 6/2002 | Nault |
| 2002/0122634 A1 | 9/2002 | Miyake et al. |
| 2002/0131721 A1 | 9/2002 | Gaio et al. |
| 2002/0159745 A1 | 10/2002 | Howell et al. |
| 2002/0172477 A1 | 11/2002 | Quinn et al. |
| 2003/0016440 A1 | 1/2003 | Zeidan et al. |
| 2003/0031447 A1 | 2/2003 | Nault |
| 2003/0059181 A1 | 3/2003 | Jackman et al. |
| 2003/0063866 A1 | 4/2003 | Melton et al. |
| 2003/0080555 A1 | 5/2003 | Griffioen et al. |
| 2003/0086664 A1 | 5/2003 | Moisel et al. |
| 2003/0123813 A1 | 7/2003 | Ravasio et al. |
| 2003/0128936 A1 | 7/2003 | Fahrnbauer et al. |
| 2003/0165311 A1 | 9/2003 | Wagman et al. |
| 2003/0201117 A1 | 10/2003 | Sakabe et al. |
| 2003/0206705 A1 | 11/2003 | McAlpine et al. |
| 2003/0210875 A1 | 11/2003 | Wagner et al. |
| 2004/0052474 A1 | 3/2004 | Lampert et al. |
| 2004/0057676 A1 | 3/2004 | Doss et al. |
| 2004/0057681 A1 | 3/2004 | Quinn et al. |
| 2004/0072454 A1 | 4/2004 | Nakajima et al. |
| 2004/0076377 A1 | 4/2004 | Mizukami et al. |
| 2004/0076386 A1 | 4/2004 | Nechitailo |
| 2004/0086238 A1 | 5/2004 | Finona et al. |
| 2004/0096162 A1 | 5/2004 | Kocher et al. |
| 2004/0157499 A1 | 8/2004 | Nania et al. |
| 2004/0206542 A1 | 10/2004 | Gladd et al. |
| 2004/0240808 A1 | 12/2004 | Rhoney et al. |
| 2004/0247251 A1 | 12/2004 | Rubino et al. |
| 2004/0252954 A1 | 12/2004 | Ginocchio et al. |
| 2004/0262023 A1 | 12/2004 | Morrow et al. |
| 2005/0019031 A1 | 1/2005 | Ye et al. |
| 2005/0036744 A1 | 2/2005 | Caveney et al. |
| 2005/0036786 A1 | 2/2005 | Ramachandran et al. |
| 2005/0053342 A1 | 3/2005 | Melton et al. |
| 2005/0084215 A1 | 4/2005 | Grzegorzewska et al. |
| 2005/0105873 A1 | 5/2005 | Reagan et al. |
| 2005/0123422 A1 | 6/2005 | Lilie |
| 2005/0129379 A1 | 6/2005 | Reagan et al. |
| 2005/0163448 A1 | 7/2005 | Blackwell et al. |
| 2005/0175307 A1 | 8/2005 | Battey et al. |
| 2005/0180697 A1 | 8/2005 | De Marchi |
| 2005/0213890 A1 | 9/2005 | Barnes et al. |
| 2005/0213892 A1 | 9/2005 | Barnes et al. |
| 2005/0213899 A1 | 9/2005 | Hurley et al. |
| 2005/0213902 A1 | 9/2005 | Parsons |
| 2005/0213921 A1 | 9/2005 | Mertesdorf et al. |
| 2005/0226568 A1 | 10/2005 | Nakajima et al. |
| 2005/0232550 A1 | 10/2005 | Nakajima et al. |
| 2005/0232552 A1 | 10/2005 | Takahashi et al. |
| 2005/0232567 A1 | 10/2005 | Reagan et al. |
| 2005/0244108 A1 | 11/2005 | Billman et al. |
| 2005/0271344 A1 | 12/2005 | Grubish et al. |
| 2005/0281510 A1 | 12/2005 | Vo et al. |
| 2005/0281514 A1 | 12/2005 | Oki et al. |
| 2005/0286837 A1 | 12/2005 | Oki et al. |
| 2005/0286838 A1 | 12/2005 | Oki et al. |
| 2006/0002668 A1 | 1/2006 | Lail et al. |
| 2006/0008232 A1 | 1/2006 | Reagan et al. |
| 2006/0008233 A1 | 1/2006 | Reagan et al. |
| 2006/0008234 A1 | 1/2006 | Reagan et al. |
| 2006/0045428 A1 | 3/2006 | Theuerkorn et al. |
| 2006/0045430 A1 | 3/2006 | Theuerkorn et al. |
| 2006/0056769 A1 | 3/2006 | Khemakhem et al. |
| 2006/0056770 A1 | 3/2006 | Schmitz |
| 2006/0088247 A1 | 4/2006 | Tran et al. |
| 2006/0093278 A1 | 5/2006 | Elkins et al. |
| 2006/0093303 A1 | 5/2006 | Reagan et al. |
| 2006/0093304 A1 | 5/2006 | Battey et al. |
| 2006/0098932 A1 | 5/2006 | Battey et al. |
| 2006/0120672 A1 | 6/2006 | Cody et al. |
| 2006/0127016 A1 | 6/2006 | Baird et al. |
| 2006/0133748 A1 | 6/2006 | Seddon et al. |
| 2006/0133758 A1 | 6/2006 | Mullaney et al. |
| 2006/0133759 A1 | 6/2006 | Mullaney et al. |
| 2006/0147172 A1 | 7/2006 | Luther et al. |
| 2006/0153503 A1 | 7/2006 | Suzuki et al. |
| 2006/0153517 A1 | 7/2006 | Reagan et al. |
| 2006/0165352 A1 | 7/2006 | Caveney et al. |
| 2006/0171638 A1 | 8/2006 | Dye |
| 2006/0171640 A1 | 8/2006 | Dye |
| 2006/0210750 A1 | 9/2006 | Morrow et al. |
| 2006/0233506 A1 | 10/2006 | Noonan et al. |
| 2006/0257092 A1 | 11/2006 | Lu et al. |
| 2006/0269204 A1 | 11/2006 | Barth et al. |
| 2006/0269208 A1 | 11/2006 | Allen et al. |
| 2006/0280420 A1 | 12/2006 | Blackwell et al. |
| 2007/0031100 A1 | 2/2007 | Garcia et al. |

(56) References Cited

U.S. PATENT DOCUMENTS

| | | |
|---|---|---|
| 2007/0036483 A1 | 2/2007 | Shin et al. |
| 2007/0041732 A1 | 2/2007 | Oki et al. |
| 2007/0047897 A1 | 3/2007 | Cooke et al. |
| 2007/0110374 A1 | 5/2007 | Oki et al. |
| 2007/0116413 A1 | 5/2007 | Cox |
| 2007/0127872 A1 | 6/2007 | Caveney et al. |
| 2007/0140642 A1 | 6/2007 | Mertesdorf et al. |
| 2007/0160327 A1 | 7/2007 | Lewallen et al. |
| 2007/0189674 A1 | 8/2007 | Scheibenreif et al. |
| 2007/0237484 A1 | 10/2007 | Reagan et al. |
| 2007/0263961 A1 | 11/2007 | Khemakhem et al. |
| 2007/0286554 A1 | 12/2007 | Kuffel et al. |
| 2008/0019641 A1 | 1/2008 | Elkins et al. |
| 2008/0020532 A1 | 1/2008 | Monfray et al. |
| 2008/0044145 A1 | 2/2008 | Jenkins et al. |
| 2008/0069511 A1 | 3/2008 | Blackwell et al. |
| 2008/0080817 A1 | 4/2008 | Melton et al. |
| 2008/0112681 A1 | 5/2008 | Battey et al. |
| 2008/0131068 A1 | 6/2008 | Mertesdorf et al. |
| 2008/0138016 A1 | 6/2008 | Katagiyama et al. |
| 2008/0138025 A1 | 6/2008 | Reagan et al. |
| 2008/0166906 A1 | 7/2008 | Nania et al. |
| 2008/0175541 A1 | 7/2008 | Lu et al. |
| 2008/0175542 A1 | 7/2008 | Lu et al. |
| 2008/0175544 A1 | 7/2008 | Fujiwara et al. |
| 2008/0175548 A1 | 7/2008 | Knecht et al. |
| 2008/0226252 A1 | 9/2008 | Mertesdorf et al. |
| 2008/0232743 A1 | 9/2008 | Gronvall et al. |
| 2008/0260344 A1 | 10/2008 | Smith et al. |
| 2008/0260345 A1 | 10/2008 | Mertesdorf et al. |
| 2008/0264664 A1 | 10/2008 | Dinh et al. |
| 2008/0273837 A1 | 11/2008 | Margolin et al. |
| 2009/0003772 A1 | 1/2009 | Lu et al. |
| 2009/0034923 A1 | 2/2009 | Miller et al. |
| 2009/0041411 A1 | 2/2009 | Melton et al. |
| 2009/0060421 A1 | 3/2009 | Parikh et al. |
| 2009/0060423 A1 | 3/2009 | Melton et al. |
| 2009/0067791 A1 | 3/2009 | Greenwood et al. |
| 2009/0067849 A1 | 3/2009 | Oki et al. |
| 2009/0074363 A1 | 3/2009 | Parsons et al. |
| 2009/0074369 A1 | 3/2009 | Bolton et al. |
| 2009/0123115 A1 | 5/2009 | Gronvall et al. |
| 2009/0129729 A1 | 5/2009 | Caveney et al. |
| 2009/0148101 A1 | 6/2009 | Lu et al. |
| 2009/0148102 A1 | 6/2009 | Lu et al. |
| 2009/0148103 A1 | 6/2009 | Lu et al. |
| 2009/0148104 A1 | 6/2009 | Lu et al. |
| 2009/0148118 A1 | 6/2009 | Gronvall et al. |
| 2009/0148120 A1 | 6/2009 | Reagan et al. |
| 2009/0156041 A1 | 6/2009 | Radle |
| 2009/0162016 A1 | 6/2009 | Lu et al. |
| 2009/0185835 A1 | 7/2009 | Park et al. |
| 2009/0190895 A1 | 7/2009 | Reagan et al. |
| 2009/0238531 A1 | 9/2009 | Holmberg et al. |
| 2009/0245737 A1 | 10/2009 | Fujiwara et al. |
| 2009/0245743 A1 | 10/2009 | Cote et al. |
| 2009/0263097 A1 | 10/2009 | Solheid et al. |
| 2009/0297112 A1 | 12/2009 | Mertesdorf et al. |
| 2009/0317039 A1 | 12/2009 | Blazer et al. |
| 2009/0317045 A1 | 12/2009 | Reagan et al. |
| 2010/0008909 A1 | 1/2010 | Siadak et al. |
| 2010/0014813 A1 | 1/2010 | Ito et al. |
| 2010/0014824 A1 | 1/2010 | Lu et al. |
| 2010/0014867 A1 | 1/2010 | Ramanitra et al. |
| 2010/0015834 A1 | 1/2010 | Siebens |
| 2010/0021254 A1 | 1/2010 | Jenkins et al. |
| 2010/0034502 A1 | 2/2010 | Lu et al. |
| 2010/0040331 A1 | 2/2010 | Khemakhem et al. |
| 2010/0040338 A1 | 2/2010 | Sek |
| 2010/0061685 A1 | 3/2010 | Kowalczyk et al. |
| 2010/0074578 A1 | 3/2010 | Imaizumi et al. |
| 2010/0080516 A1 | 4/2010 | Coleman et al. |
| 2010/0086260 A1 | 4/2010 | Parikh et al. |
| 2010/0086267 A1 | 4/2010 | Cooke et al. |
| 2010/0092129 A1 | 4/2010 | Conner |
| 2010/0092133 A1 | 4/2010 | Conner |
| 2010/0092136 A1 | 4/2010 | Nhep |
| 2010/0092146 A1 | 4/2010 | Conner et al. |
| 2010/0092169 A1 | 4/2010 | Conner et al. |
| 2010/0092171 A1 | 4/2010 | Conner |
| 2010/0129034 A1 | 5/2010 | Kuffel et al. |
| 2010/0144183 A1 | 6/2010 | Nania et al. |
| 2010/0172616 A1 | 7/2010 | Lu et al. |
| 2010/0197222 A1 | 8/2010 | Scheucher |
| 2010/0215321 A1 | 8/2010 | Jenkins |
| 2010/0220962 A1 | 9/2010 | Caveney et al. |
| 2010/0226615 A1 | 9/2010 | Reagan et al. |
| 2010/0232753 A1 | 9/2010 | Parris et al. |
| 2010/0247053 A1 | 9/2010 | Cowen et al. |
| 2010/0266242 A1 | 10/2010 | Lu et al. |
| 2010/0266244 A1 | 10/2010 | Lu et al. |
| 2010/0266245 A1 | 10/2010 | Sabo |
| 2010/0272399 A1 | 10/2010 | Griffiths et al. |
| 2010/0284662 A1 | 11/2010 | Reagan et al. |
| 2010/0290741 A1 | 11/2010 | Lu et al. |
| 2010/0303426 A1 | 12/2010 | Davis |
| 2010/0303427 A1 | 12/2010 | Rambow et al. |
| 2010/0310213 A1 | 12/2010 | Lewallen et al. |
| 2010/0322563 A1 | 12/2010 | Melton et al. |
| 2010/0329625 A1 | 12/2010 | Reagan et al. |
| 2011/0019964 A1 | 1/2011 | Nhep et al. |
| 2011/0047731 A1 | 3/2011 | Sugita et al. |
| 2011/0067452 A1 | 3/2011 | Gronvall et al. |
| 2011/0069932 A1 | 3/2011 | Overton et al. |
| 2011/0108719 A1 | 5/2011 | Ford et al. |
| 2011/0116749 A1 | 5/2011 | Kuffel et al. |
| 2011/0123166 A1 | 5/2011 | Reagan et al. |
| 2011/0129186 A1 | 6/2011 | Lewallen et al. |
| 2011/0164854 A1 | 7/2011 | Desard et al. |
| 2011/0262099 A1 | 10/2011 | Castonguay et al. |
| 2011/0262100 A1 | 10/2011 | Reagan et al. |
| 2011/0299814 A1 | 12/2011 | Nakagawa |
| 2011/0305421 A1 | 12/2011 | Caveney et al. |
| 2012/0008909 A1 | 1/2012 | Mertesdorf et al. |
| 2012/0045179 A1 | 2/2012 | Theuerkorn |
| 2012/0063724 A1 | 3/2012 | Kuffel et al. |
| 2012/0063729 A1 | 3/2012 | Fujiwara et al. |
| 2012/0106912 A1 | 5/2012 | McGranahan et al. |
| 2012/0106913 A1 | 5/2012 | Makrides-Saravanos et al. |
| 2012/0134629 A1 | 5/2012 | Lu et al. |
| 2012/0183268 A1 | 7/2012 | De Montmorillon et al. |
| 2012/0213478 A1 | 8/2012 | Chen et al. |
| 2012/0251060 A1 | 10/2012 | Hurley |
| 2012/0251063 A1 | 10/2012 | Reagan et al. |
| 2012/0252244 A1 | 10/2012 | Elkins, II et al. |
| 2012/0275749 A1 | 11/2012 | Kuffel et al. |
| 2012/0321256 A1 | 12/2012 | Caveney et al. |
| 2013/0004122 A1 | 1/2013 | Kingsbury |
| 2013/0020480 A1 | 1/2013 | Ford et al. |
| 2013/0034333 A1 | 2/2013 | Holmberg et al. |
| 2013/0064506 A1 | 3/2013 | Eberle, Jr. et al. |
| 2013/0094821 A1 | 4/2013 | Logan |
| 2013/0109213 A1 | 5/2013 | Chang |
| 2013/0114930 A1 | 5/2013 | Smith et al. |
| 2013/0136402 A1 | 5/2013 | Kuffel et al. |
| 2013/0170834 A1 | 7/2013 | Cho et al. |
| 2013/0209099 A1 | 8/2013 | Reagan et al. |
| 2013/0236139 A1 | 9/2013 | Chen et al. |
| 2013/0266562 A1 | 10/2013 | Siadak et al. |
| 2013/0315538 A1 | 11/2013 | Kuffel et al. |
| 2014/0016902 A1* | 1/2014 | Pepe .............. G02B 6/3895 385/76 |
| 2014/0056561 A1 | 2/2014 | Lu et al. |
| 2014/0079356 A1 | 3/2014 | Pepin et al. |
| 2014/0133804 A1 | 5/2014 | Lu et al. |
| 2014/0133806 A1 | 5/2014 | Hill et al. |
| 2014/0133807 A1 | 5/2014 | Katoh |
| 2014/0133808 A1 | 5/2014 | Hill et al. |
| 2014/0153876 A1 | 6/2014 | Dendas et al. |
| 2014/0153878 A1 | 6/2014 | Mullaney |
| 2014/0161397 A1 | 6/2014 | Gallegos et al. |
| 2014/0205257 A1 | 7/2014 | Durrant et al. |
| 2014/0219609 A1 | 8/2014 | Nielson et al. |
| 2014/0219622 A1 | 8/2014 | Coan et al. |

(56) References Cited

U.S. PATENT DOCUMENTS

| | | |
|---|---|---|
| 2014/0233896 A1 | 8/2014 | Ishigami et al. |
| 2014/0241670 A1 | 8/2014 | Barnette et al. |
| 2014/0241671 A1 | 8/2014 | Koreeda et al. |
| 2014/0241689 A1 | 8/2014 | Bradley et al. |
| 2014/0254987 A1 | 9/2014 | Caveney et al. |
| 2014/0294395 A1 | 10/2014 | Waldron et al. |
| 2014/0314379 A1 | 10/2014 | Lu et al. |
| 2014/0328559 A1 | 11/2014 | Kobayashi et al. |
| 2014/0341511 A1 | 11/2014 | Daems et al. |
| 2014/0348467 A1 | 11/2014 | Cote et al. |
| 2014/0355936 A1 | 12/2014 | Bund et al. |
| 2015/0003787 A1 | 1/2015 | Chen et al. |
| 2015/0003788 A1 | 1/2015 | Chen et al. |
| 2015/0036982 A1 | 2/2015 | Nhep et al. |
| 2015/0110451 A1 | 4/2015 | Blazer et al. |
| 2015/0153532 A1 | 6/2015 | Holmberg et al. |
| 2015/0168657 A1 | 6/2015 | Islam |
| 2015/0183869 A1 | 7/2015 | Siadak et al. |
| 2015/0185423 A1 | 7/2015 | Matsui et al. |
| 2015/0253527 A1 | 9/2015 | Hill et al. |
| 2015/0253528 A1 | 9/2015 | Corbille et al. |
| 2015/0268423 A1 | 9/2015 | Burkholder et al. |
| 2015/0268434 A1 | 9/2015 | Barnette, Jr. et al. |
| 2015/0270626 A1* | 9/2015 | Bishop ............ H01R 4/4836 439/858 |
| 2015/0293310 A1 | 10/2015 | Kanno |
| 2015/0309274 A1 | 10/2015 | Hurley et al. |
| 2015/0316727 A1 | 11/2015 | Kondo et al. |
| 2015/0346435 A1 | 12/2015 | Kato |
| 2015/0346436 A1 | 12/2015 | Pepe et al. |
| 2016/0015885 A1* | 1/2016 | Pananen ............ A61M 39/12 604/111 |
| 2016/0041346 A1 | 2/2016 | Barnette et al. |
| 2016/0062053 A1 | 3/2016 | Mullaney |
| 2016/0085032 A1 | 3/2016 | Lu et al. |
| 2016/0109671 A1 | 4/2016 | Coan et al. |
| 2016/0116686 A1 | 4/2016 | Durrant et al. |
| 2016/0126667 A1 | 5/2016 | Droesbeke et al. |
| 2016/0131851 A1 | 5/2016 | Theuerkorn |
| 2016/0131857 A1 | 5/2016 | Pimentel et al. |
| 2016/0139346 A1 | 5/2016 | Bund et al. |
| 2016/0154184 A1 | 6/2016 | Bund et al. |
| 2016/0161682 A1 | 6/2016 | Nishimura |
| 2016/0161688 A1 | 6/2016 | Nishimura |
| 2016/0161689 A1 | 6/2016 | Nishimura |
| 2016/0187590 A1 | 6/2016 | Lu |
| 2016/0202431 A1 | 7/2016 | Hill et al. |
| 2016/0209599 A1 | 7/2016 | Van Baelen et al. |
| 2016/0209602 A1 | 7/2016 | Theuerkorn |
| 2016/0216468 A1 | 7/2016 | Gimblet et al. |
| 2016/0238810 A1 | 8/2016 | Hubbard et al. |
| 2016/0246019 A1 | 8/2016 | Ishii et al. |
| 2016/0259133 A1 | 9/2016 | Kobayashi et al. |
| 2016/0259134 A1 | 9/2016 | Daems et al. |
| 2016/0306122 A1 | 10/2016 | Tong et al. |
| 2016/0327754 A1 | 11/2016 | Hill et al. |
| 2017/0023758 A1 | 1/2017 | Reagan et al. |
| 2017/0045699 A1 | 2/2017 | Coan et al. |
| 2017/0052325 A1 | 2/2017 | Mullaney et al. |
| 2017/0059784 A1 | 3/2017 | Gniadek et al. |
| 2017/0123163 A1 | 5/2017 | Lu et al. |
| 2017/0123165 A1 | 5/2017 | Barnette et al. |
| 2017/0131509 A1 | 5/2017 | Xiao et al. |
| 2017/0139158 A1 | 5/2017 | Coenegracht |
| 2017/0168248 A1 | 6/2017 | Hayauchi et al. |
| 2017/0168256 A1 | 6/2017 | Reagan et al. |
| 2017/0170596 A1 | 6/2017 | Goossens et al. |
| 2017/0176252 A1 | 6/2017 | Marple et al. |
| 2017/0176690 A1 | 6/2017 | Bretz et al. |
| 2017/0182160 A1 | 6/2017 | Siadak et al. |
| 2017/0219782 A1 | 8/2017 | Nishimura |
| 2017/0235067 A1 | 8/2017 | Holmberg et al. |
| 2017/0238822 A1 | 8/2017 | Young et al. |
| 2017/0254961 A1 | 9/2017 | Kamada et al. |
| 2017/0254962 A1* | 9/2017 | Mueller-Schlomka ............ G02B 6/3874 |
| 2017/0261696 A1 | 9/2017 | Compton et al. |
| 2017/0261698 A1 | 9/2017 | Compton et al. |
| 2017/0261699 A1 | 9/2017 | Compton et al. |
| 2017/0285275 A1 | 10/2017 | Hill et al. |
| 2017/0288315 A1 | 10/2017 | Scheucher |
| 2017/0293091 A1 | 10/2017 | Lu et al. |
| 2017/0336587 A1 | 11/2017 | Coan et al. |
| 2017/0343741 A1 | 11/2017 | Coenegracht et al. |
| 2017/0343745 A1 | 11/2017 | Rosson |
| 2017/0351037 A1 | 12/2017 | Watanabe et al. |
| 2018/0031774 A1 | 2/2018 | Van et al. |
| 2018/0079569 A1* | 3/2018 | Simpson ............ B65D 55/145 |
| 2018/0081127 A1 | 3/2018 | Coenegracht |
| 2018/0143386 A1 | 5/2018 | Coan et al. |
| 2018/0151960 A1 | 5/2018 | Scheucher |
| 2018/0180831 A1 | 6/2018 | Blazer et al. |
| 2018/0224610 A1 | 8/2018 | Pimentel et al. |
| 2018/0239094 A1 | 8/2018 | Barnette et al. |
| 2018/0246283 A1 | 8/2018 | Pepe et al. |
| 2018/0259721 A1 | 9/2018 | Bund et al. |
| 2018/0329149 A1 | 11/2018 | Mullaney et al. |
| 2018/0372962 A1 | 12/2018 | Isenhour et al. |
| 2019/0004251 A1 | 1/2019 | Dannoux et al. |
| 2019/0004255 A1 | 1/2019 | Dannoux et al. |
| 2019/0004256 A1 | 1/2019 | Rosson |
| 2019/0004258 A1 | 1/2019 | Dannoux et al. |
| 2019/0011641 A1 | 1/2019 | Isenhour et al. |
| 2019/0018210 A1 | 1/2019 | Coan et al. |
| 2019/0033532 A1 | 1/2019 | Gimblet et al. |
| 2019/0038743 A1 | 2/2019 | Siadak et al. |
| 2019/0041584 A1 | 2/2019 | Coenegracht et al. |
| 2019/0041585 A1 | 2/2019 | Bretz et al. |
| 2019/0041595 A1 | 2/2019 | Reagan et al. |
| 2019/0058259 A1 | 2/2019 | Scheucher |
| 2019/0107677 A1 | 4/2019 | Coenegracht et al. |
| 2019/0147202 A1 | 5/2019 | Harney |
| 2019/0162910 A1 | 5/2019 | Gurreri |
| 2019/0162914 A1 | 5/2019 | Baca et al. |
| 2019/0170961 A1 | 6/2019 | Coenegracht et al. |
| 2019/0187396 A1 | 6/2019 | Finnegan et al. |
| 2019/0235177 A1 | 8/2019 | Lu et al. |
| 2019/0250338 A1 | 8/2019 | Mullaney et al. |
| 2019/0271817 A1 | 9/2019 | Coenegracht |
| 2019/0324217 A1 | 10/2019 | Lu et al. |
| 2019/0339460 A1 | 11/2019 | Dannoux et al. |
| 2019/0339461 A1 | 11/2019 | Dannoux et al. |
| 2019/0369336 A1 | 12/2019 | Van et al. |
| 2019/0369345 A1 | 12/2019 | Reagan et al. |
| 2019/0374637 A1 | 12/2019 | Siadak et al. |
| 2020/0012051 A1 | 1/2020 | Coenegracht et al. |
| 2020/0036101 A1 | 1/2020 | Scheucher |
| 2020/0049922 A1 | 2/2020 | Rosson |
| 2020/0057205 A1 | 2/2020 | Dannoux et al. |
| 2020/0057222 A1 | 2/2020 | Dannoux et al. |
| 2020/0057223 A1 | 2/2020 | Dannoux et al. |
| 2020/0057224 A1 | 2/2020 | Dannoux et al. |
| 2020/0057723 A1 | 2/2020 | Chirca et al. |
| 2020/0096705 A1 | 3/2020 | Rosson |
| 2020/0096709 A1 | 3/2020 | Rosson |
| 2020/0096710 A1 | 3/2020 | Rosson |
| 2020/0103599 A1 | 4/2020 | Rosson |
| 2020/0103608 A1 | 4/2020 | Johnson et al. |
| 2020/0110229 A1 | 4/2020 | Dannoux et al. |
| 2020/0110234 A1 | 4/2020 | Holmberg et al. |
| 2020/0116949 A1 | 4/2020 | Rosson |
| 2020/0116952 A1 | 4/2020 | Rosson |
| 2020/0116953 A1 | 4/2020 | Rosson |
| 2020/0116954 A1 | 4/2020 | Rosson |
| 2020/0116958 A1 | 4/2020 | Dannoux et al. |
| 2020/0116962 A1 | 4/2020 | Dannoux et al. |
| 2020/0124805 A1 | 4/2020 | Rosson et al. |
| 2020/0124812 A1 | 4/2020 | Dannoux et al. |
| 2020/0132939 A1 | 4/2020 | Coenegracht et al. |
| 2020/0192042 A1 | 6/2020 | Coan et al. |
| 2020/0209492 A1 | 7/2020 | Rosson |
| 2020/0218017 A1 | 7/2020 | Coenegracht |
| 2020/0225422 A1 | 7/2020 | Van et al. |

(56) References Cited

U.S. PATENT DOCUMENTS

| | | |
|---|---|---|
| 2020/0225424 A1 | 7/2020 | Coenegracht |
| 2020/0241211 A1 | 7/2020 | Shonkwiler et al. |
| 2020/0348476 A1 | 11/2020 | Hill et al. |
| 2020/0371306 A1 | 11/2020 | Mosier et al. |
| 2020/0393629 A1 | 12/2020 | Hill et al. |
| 2021/0318499 A1 | 10/2021 | Cote et al. |

FOREIGN PATENT DOCUMENTS

| | | |
|---|---|---|
| CN | 1071012 A | 4/1993 |
| CN | 1213783 A | 4/1999 |
| CN | 1114839 C | 7/2003 |
| CN | 1646962 A | 7/2005 |
| CN | 1833188 A | 9/2006 |
| CN | 1922523 A | 2/2007 |
| CN | 1985205 A | 6/2007 |
| CN | 101084461 A | 12/2007 |
| CN | 101111790 A | 1/2008 |
| CN | 101195453 A | 6/2008 |
| CN | 201404194 Y | 2/2010 |
| CN | 201408274 Y | 2/2010 |
| CN | 201522561 U | 7/2010 |
| CN | 101806939 A | 8/2010 |
| CN | 101846773 A | 9/2010 |
| CN | 101866034 A | 10/2010 |
| CN | 101939680 A | 1/2011 |
| CN | 201704194 U | 1/2011 |
| CN | 102141655 A | 8/2011 |
| CN | 102346281 A | 2/2012 |
| CN | 202282523 U | 6/2012 |
| CN | 203224645 U | 10/2013 |
| CN | 103713362 A | 4/2014 |
| CN | 104064903 A | 9/2014 |
| CN | 104280830 A | 1/2015 |
| CN | 104603656 A | 5/2015 |
| CN | 105467529 A | 4/2016 |
| CN | 105492946 A | 4/2016 |
| CN | 106716205 A | 5/2017 |
| CN | 106873086 A | 6/2017 |
| CN | 110954996 A | 4/2020 |
| EP | 0026553 A1 | 4/1981 |
| EP | 0244791 A2 | 11/1987 |
| EP | 0547788 A1 | 6/1993 |
| EP | 0782025 A1 | 7/1997 |
| EP | 0856751 A1 | 8/1998 |
| EP | 957381 A1 | 11/1999 |
| EP | 1243957 A2 | 9/2002 |
| EP | 1391762 A1 | 2/2004 |
| EP | 1431786 A2 | 6/2004 |
| EP | 1438622 A2 | 7/2004 |
| EP | 1678537 A1 | 7/2006 |
| EP | 1759231 A1 | 3/2007 |
| EP | 1810062 A1 | 7/2007 |
| EP | 2069845 A2 | 6/2009 |
| EP | 2149063 A1 | 2/2010 |
| EP | 2150847 A1 | 2/2010 |
| EP | 2193395 A1 | 6/2010 |
| EP | 2255233 A1 | 12/2010 |
| EP | 2333597 A2 | 6/2011 |
| EP | 2362253 A1 | 8/2011 |
| EP | 2401641 A1 | 1/2012 |
| EP | 2609458 A1 | 7/2013 |
| EP | 2622395 A1 | 8/2013 |
| EP | 2734879 A1 | 5/2014 |
| EP | 2815259 A1 | 12/2014 |
| EP | 2817667 A1 | 12/2014 |
| EP | 2992372 A1 | 3/2016 |
| EP | 3022596 A1 | 5/2016 |
| EP | 3064973 A2 | 9/2016 |
| EP | 3101740 A1 | 12/2016 |
| EP | 3245545 A1 | 11/2017 |
| EP | 3265859 A1 | 1/2018 |
| EP | 3336992 A1 | 6/2018 |
| EP | 3362830 A1 | 8/2018 |
| EP | 3427096 A1 | 1/2019 |
| EP | 3443395 A1 | 2/2019 |
| EP | 3535614 A1 | 9/2019 |
| EP | 3537197 A1 | 9/2019 |
| EP | 3646074 A1 | 5/2020 |
| EP | 3646079 A1 | 5/2020 |
| FR | 2485754 A1 | 12/1981 |
| JP | 61-145509 A | 7/1986 |
| JP | 63089421 A | 4/1988 |
| JP | 63078908 U | 5/1988 |
| JP | 03-063615 A | 3/1991 |
| JP | 03207223 A | 9/1991 |
| JP | 05-297246 A | 11/1993 |
| JP | 06-320111 A | 11/1994 |
| JP | 07318758 A | 12/1995 |
| JP | 08292331 A | 11/1996 |
| JP | 09-135526 A | 5/1997 |
| JP | 09-325249 A | 12/1997 |
| JP | 10-339826 A | 12/1998 |
| JP | 11064682 A | 3/1999 |
| JP | 11-281861 A | 10/1999 |
| JP | 11326693 A | 11/1999 |
| JP | 2001290051 A | 10/2001 |
| JP | 2003121699 A | 4/2003 |
| JP | 2003177279 A | 6/2003 |
| JP | 2005031544 A | 2/2005 |
| JP | 2005077591 A | 3/2005 |
| JP | 2005-520987 A | 7/2005 |
| JP | 2006023502 A | 1/2006 |
| JP | 2006-259631 A | 9/2006 |
| JP | 2006337637 A | 12/2006 |
| JP | 2007078740 A | 3/2007 |
| JP | 2007121859 A | 5/2007 |
| JP | 2009265208 A | 11/2009 |
| JP | 2010152084 A | 7/2010 |
| JP | 2011033698 A | 2/2011 |
| JP | 2013156580 A | 8/2013 |
| JP | 2014085474 A | 5/2014 |
| JP | 05537852 B2 | 7/2014 |
| JP | 05558328 B2 | 7/2014 |
| JP | 2014134746 A | 7/2014 |
| JP | 3207233 U | 11/2016 |
| KR | 1020130081087 A | 7/2013 |
| TW | 222688 B | 4/1994 |
| WO | 01/92927 A2 | 12/2001 |
| WO | 03/36358 A2 | 5/2003 |
| WO | 2004/061509 A1 | 7/2004 |
| WO | 2005/045494 A1 | 5/2005 |
| WO | 2006/009597 A1 | 1/2006 |
| WO | 2006/052420 A1 | 5/2006 |
| WO | 2006113726 A1 | 10/2006 |
| WO | 2008/027201 A2 | 3/2008 |
| WO | 2008/150408 A1 | 12/2008 |
| WO | 2008/150423 A1 | 12/2008 |
| WO | 2009/042066 A1 | 4/2009 |
| WO | 2009/113819 A1 | 9/2009 |
| WO | 2009/117060 A1 | 9/2009 |
| WO | 2009/154990 A2 | 12/2009 |
| WO | 2010/092009 A1 | 8/2010 |
| WO | 2010/099141 A1 | 9/2010 |
| WO | 2011/044090 A2 | 4/2011 |
| WO | 2011/047111 A1 | 4/2011 |
| WO | 2012/027313 A1 | 3/2012 |
| WO | 2012037727 A1 | 3/2012 |
| WO | 2012/044741 A1 | 4/2012 |
| WO | 2012163052 A1 | 12/2012 |
| WO | 2013/016042 A1 | 1/2013 |
| WO | 2013/055714 A1 | 4/2013 |
| WO | 2013/083729 A2 | 6/2013 |
| WO | 2013/122752 A1 | 8/2013 |
| WO | 2013/126488 A1 | 8/2013 |
| WO | 2014151259 A1 | 9/2014 |
| WO | 2014167447 A1 | 10/2014 |
| WO | 2014/179411 A1 | 11/2014 |
| WO | 2014197894 A1 | 12/2014 |
| WO | 2015/047508 A1 | 4/2015 |
| WO | 2015144883 A1 | 10/2015 |
| WO | 2015/197588 A1 | 12/2015 |
| WO | 2016/059320 A1 | 4/2016 |
| WO | 2016/073862 A2 | 5/2016 |

(56) References Cited

FOREIGN PATENT DOCUMENTS

| | | |
|---|---|---|
| WO | 2016095213 A1 | 6/2016 |
| WO | 2016100078 A1 | 6/2016 |
| WO | 2016/115288 A1 | 7/2016 |
| WO | 2016156610 A1 | 10/2016 |
| WO | 2016168389 A1 | 10/2016 |
| WO | 2017/063107 A1 | 4/2017 |
| WO | 2017/146722 A1 | 8/2017 |
| WO | 2017/155754 A1 | 9/2017 |
| WO | 2017/178920 A1 | 10/2017 |
| WO | 2018/083561 A1 | 5/2018 |
| WO | 2018/175123 A1 | 9/2018 |
| WO | 2018/204864 A1 | 11/2018 |
| WO | 2019005190 A2 | 1/2019 |
| WO | 2019005191 A1 | 1/2019 |
| WO | 2019005192 A1 | 1/2019 |
| WO | 2019005193 A1 | 1/2019 |
| WO | 2019005194 A1 | 1/2019 |
| WO | 2019005195 A1 | 1/2019 |
| WO | 2019005196 A1 | 1/2019 |
| WO | 2019005197 A1 | 1/2019 |
| WO | 2019005198 A1 | 1/2019 |
| WO | 2019005199 A1 | 1/2019 |
| WO | 2019005200 A1 | 1/2019 |
| WO | 2019005201 A1 | 1/2019 |
| WO | 2019005202 A1 | 1/2019 |
| WO | 2019005203 A1 | 1/2019 |
| WO | 2019005204 A1 | 1/2019 |
| WO | WO-2019005204 A1 * | 1/2019 ............ G02B 6/381 |
| WO | 2019/036339 A1 | 2/2019 |
| WO | 2019/126333 A1 | 6/2019 |
| WO | 2019/195652 A1 | 10/2019 |
| WO | 2020/101850 A1 | 5/2020 |

OTHER PUBLICATIONS

Coaxum, L., et al., U.S. Appl. No. 62/341,947, "Fiber Optic Multiport Having Different Types of Ports for Multi-Use," filed May 26, 2016.

International Search Report and Written Opinion PCT/US2017/063938 dated May 14, 2018.

International Search Report and Written Opinion PCT/US2017/063953 dated May 14, 2018.

International Search Report and Written Opinion PCT/US2017/063991 dated May 14, 2018.

International Search Report and Written Opinion PCT/US2017/064027 dated Oct. 9, 2018.

International Search Report and Written Opinion PCT/US2017/064063 dated May 15, 2018.

International Search Report and Written Opinion PCT/US2017/064071 dated May 14, 2018.

International Search Report and Written Opinion PCT/US2017/064072 dated May 14, 2018.

International Search Report and Written Opinion PCT/US2017/064077 dated Feb. 26, 2018.

International Search Report and Written Opinion PCT/US2017/064084 dated Feb. 26, 2018.

International Search Report and Written Opinion PCT/US2017/064087 dated Feb. 26, 2018.

International Search Report and Written Opinion PCT/US2017/064092 dated Feb. 23, 2018.

International Search Report and Written Opinion PCT/US2017/064093 dated Feb. 26, 2018.

International Search Report and Written Opinion PCT/US2017/064095 dated Feb. 23, 2018.

International Search Report and Written Opinion PCT/US2017/064096 dated Feb. 26, 2018.

International Search Report and Written Opinion PCT/US2018/039019 dated Sep. 18, 2018.

International Search Report and Written Opinion PCT/US2018/039490 dated Oct. 4, 2018.

International Search Report and Written Opinion PCT/US2018/039494 dated Oct. 11, 2018.

International Search Report and Written Opinion PCT/US2018/040011 dated Oct. 5, 2018.

International Search Report and Written Opinion PCT/US2018/040104 dated Oct. 9, 2018.

International Search Report and Written Opinion PCT/US2018/040126 dated Oct. 9, 2018.

International Search Report and Written Opinion PCT/US2018/040130 dated Sep. 18, 2018.

Notice of Allowance Received for U.S. Appl. No. 16/018,997 dated Oct. 4, 2018.

Office Action Pertaining to U.S. Appl. No. 16/018,918 dated Sep. 28, 2018.

Office Action Pertaining to U.S. Appl. No. 16/018,988 dated Oct. 31, 2018.

Office Action Pertaining to U.S. Appl. No. 16/109,008 dated Oct. 31, 2018.

Faulkner et al. "Optical networks for local lopp applications," J. Lightwave Technol.0733-8724 7(11), 17411751 (1989).

Ramanitra et al. "Optical access network using a self-latching variable splitter remotely powered through an optical fiber link," Optical Engineering 46(4) p. 45007-1-9, Apr. 2007.

Ratnam et al. "Burst switching using variable optical splitter based switches with wavelength conversion," ICIIS 2017—Poeceedings Jan. 2018, pp. 1-6.

Wang et al. "Opto-VLSI-based dynamic optical splitter," Electron. Lett.0013-5194 10.1049/el:20046715 40(22), 14451446 (2004).

Xiao et al. "1×N wavelength selective adaptive optical power splitter for wavelength-division-multiplexed passive optical networks," Optics & Laser Technology 68, pp. 160-164, May 2015.

Chinese Patent Application No. 201780093746.3, Office Action dated Oct. 9, 2021, 7 pages English Translation Only, Chinese Patent Office.

CoolShirt fittings, https://www.amazon.com/Cool-Shirt-5014-0001-Release-Connectors/dp/B01LXBXYJ9, Sep. 23, 2016 (Year: 2016).

Liu et al., "Variable optical power splitters create new apps", Retrieved from: https://www.lightwaveonline.com/fttx/pon-systems/article/16648432/variable-optical-power-splitters-create-new-apps, 2005, 14 pages.

* cited by examiner

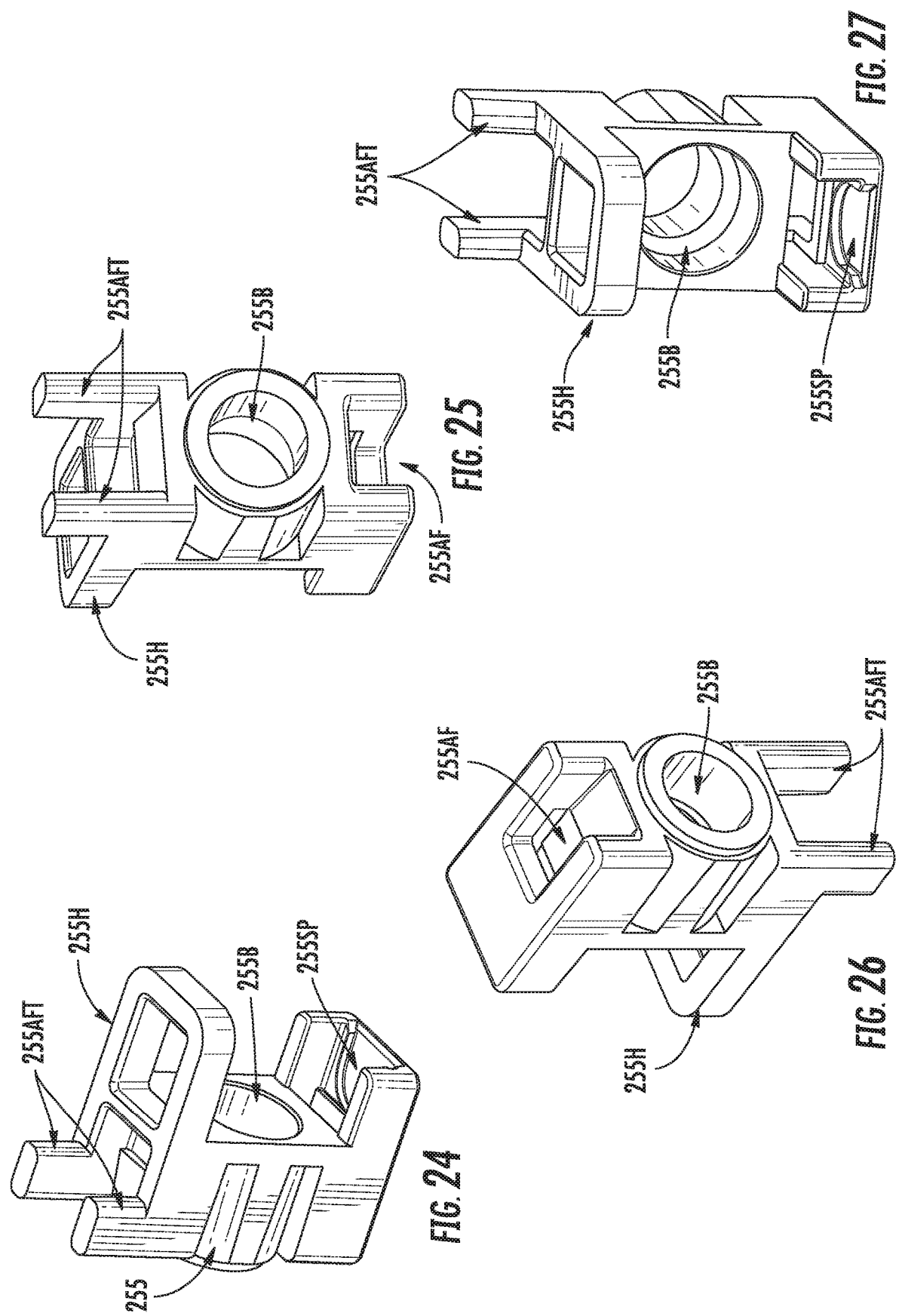

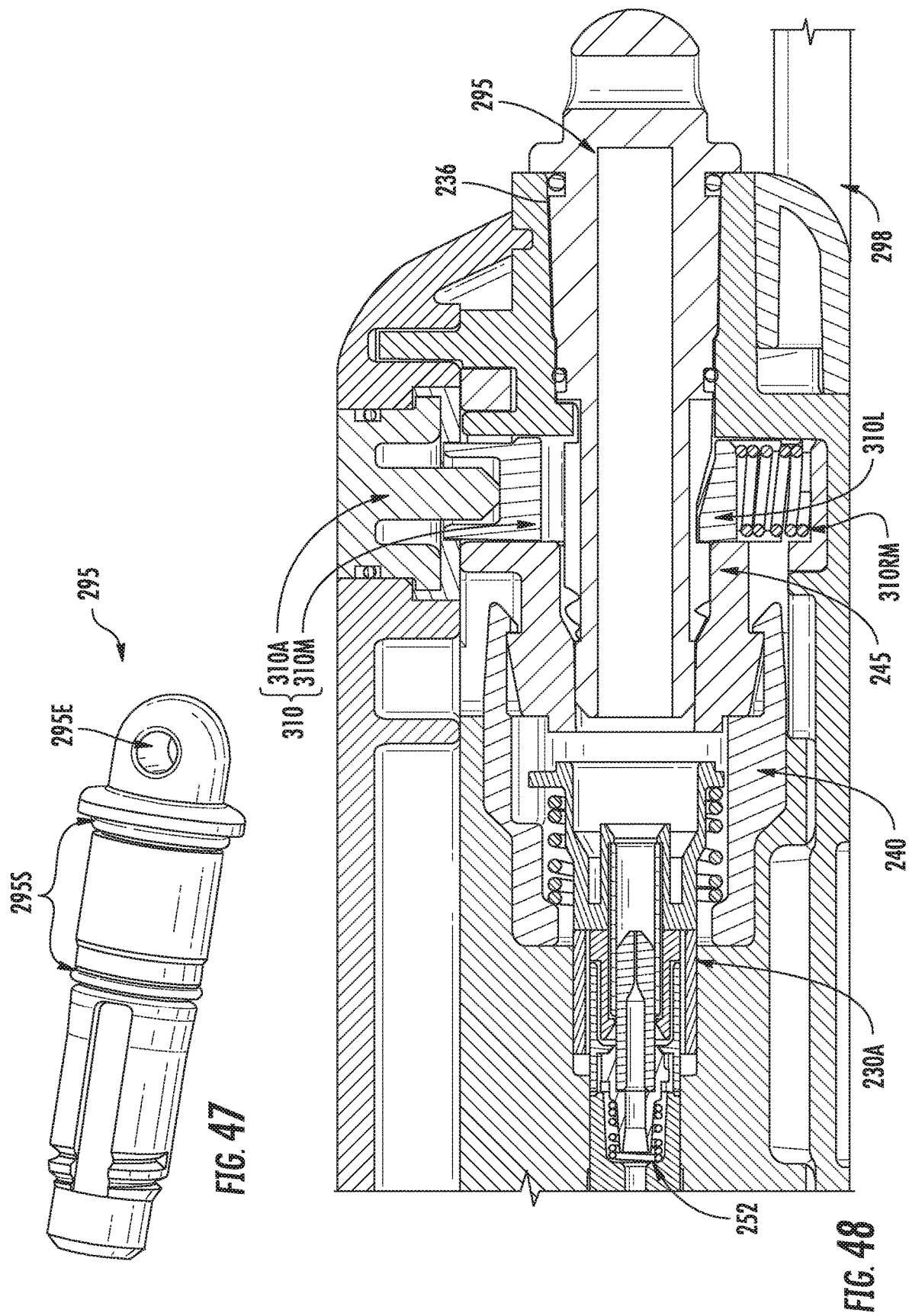

MULTIPORTS AND OTHER DEVICES HAVING OPTICAL CONNECTION PORTS WITH SECURING FEATURES AND METHODS OF MAKING THE SAME

CROSS-REFERENCE TO RELATED APPLICATIONS

This application is a continuation of International Application No. PCT/US2018/040104 filed Jun. 28, 2018, which claims the benefit of priority to U.S. Application Nos. 62/526,011 filed on Jun. 28, 2017; 62/526,018 filed on Jun. 28, 2017; 62/526,195, filed on Jun. 28, 2017; Ser. No. 16/018,918 filed on Jun. 26, 2018; U.S. patent application Ser. No. 16/018,988 filed on Jun. 26, 2018. U.S. application Ser. No. 16/018,997 filed on Jun. 26, 2018; U.S. application Ser. No. 16/019,008 filed Jun. 26, 2018; U.S. application Ser. No. 16/015,583 filed Jun. 22, 2018; and U.S. application Ser. No. 16/015,588 filed on Jun. 22, 2018, the content of which is relied upon and incorporated herein by reference in entirety.

This application also claims the benefit of priority under 35 USC § 365 of International Patent Application Serial Nos. PCT/US2017/063862 filed on Nov. 30, 2017; PCT/US2017/063938 filed on Nov. 30, 2017; PCT/US2017/063953 filed on Nov. 30, 2017; PCT/US2017/063991 filed on Nov. 30, 2017; PCT/US2017/064027 filed on Nov. 30, 2017; PCT/US2017/064071 filed on Nov. 30, 2017; PCT/US2017/064063 filed on Nov. 30, 2017; PCT/US2017/064072 filed on Nov. 30, 2017; PCT/US2017/064092 filed on Nov. 30, 2017; PCT/US2017/064095 filed on Nov. 30, 2017; PCT/US2018/039484 filed on Jun. 26, 2018; PCT/US2018/039485 filed on Jun. 26, 2018; PCT/US2018/039490 filed on Jun. 26, 2018; PCT/US2018/039494 filed on Jun. 26, 2018; PCT/US2018/039019 filed on Jun. 22, 2018; PCT/US2018/039020 filed on Jun. 22, 2018; all designating the United States of America, and the content of which is relied upon and incorporated herein by reference in its entirety.

FIELD

The disclosure is directed to devices providing at least one optical connection port along with methods for making the same. More specifically, the disclosure is directed to devices such as multiports comprising a keyed-connection port and a securing feature associated with the connection port for securing an optical connector along with methods of making the same.

BACKGROUND

Optical fiber is increasingly being used for a variety of applications, including but not limited to broadband voice, video, and data transmission. As bandwidth demands increase optical fiber is migrating deeper into communication networks such as in fiber to the premises applications such as FTTx, 5G and the like. As optical fiber extended deeper into communication networks the need for making robust optical connections in outdoor applications in a quick and easy manner was apparent. To address this need for making quick, reliable, and robust optical connections in communication networks hardened fiber optic connectors such as the OptiTap® plug connector were developed.

Multiports were also developed for making an optical connections with hardened connectors such as the OptiTap. Prior art multiports have a plurality of receptacles mounted through a wall of the housing for protecting an indoor connector inside the housing that makes an optical connection to the external hardened connector of the branch or drop cable.

Illustratively, FIG. 1 shows a conventional fiber optic multiport 1 having an input fiber optic cable 4 carrying one or more optical fibers to indoor-type connectors inside a housing 3. The multiport 1 receives the optical fibers into housing 3 and distributes the optical fibers to receptacles 7 for connection with a hardened connector. The receptacles 7 are separate assemblies attached through a wall of housing 3 of the multiport 1. The receptacles 7 allow mating with hardened connectors attached to drop or branching cables (not shown) such as drop cables for "fiber-to-the-home" applications. During use, optical signals pass through the branch cables, to and from the fiber optic cable 4 by way of the optical connections at the receptacles 7 of multiport 1. Fiber optic cable 4 may also be terminated with a fiber optic connector 5. Multiports 1 allowed quick and easy deployment for optical networks.

Although, the housing 3 of the prior art multiport 1 is rugged and weatherable for outdoor deployments, the housings 3 of multiport 1 are relatively bulky for mounting multiple receptacles 7 for the hardened connector on the housing 3. Receptacles 7 allow an optical connection between the hardened connector such as the OptiTap male plug connector on the branch cable with a non-hardened connector such as the SC connector disposed within the housing 3, which provides a suitable transition from an outdoor space to a protected space inside the housing 3.

Receptacle 7 for the OptiTap connector is described in further detail in U.S. Pat. No. 6,579,014. As depicted in U.S. Pat. No. 6,579,014, the receptacle includes a receptacle housing and an adapter sleeve disposed therein. Thus, the receptacles for the hardened connector are large and bulky and require a great deal of surface array when arranged in an array on the housing 3 such as shown with multiport 1. Further, conventional hardened connectors use a separate threaded or bayonet coupling that requires rotation about the longitudinal axis of the connector and room for grabbing and rotating the coupling by hand when mounted in an array on the housing 3.

Consequently, the housing 3 of the multiport 1 is excessively bulky. For example, the multiport 1 may be too boxy and inflexible to effectively operate in smaller storage spaces, such as the underground pits or vaults that may already be crowded. Furthermore, having all of the receptacles 7 on the housing 3, as shown in FIG. 1, requires sufficient room for the drop or branch cables attached to the hardened connectors attached to the multiport 1. While pits can be widened and larger storage containers can be used, such solutions tend to be costly and time-consuming. Network operators may desire other deployment applications for multiports 1 such as aerial, in a pedestal or mounted on a façade of a building that are not ideal for the prior art multiports 1 for numerous reasons such as congested poles or spaces or for aesthetic concerns.

Other multiports designs have been commercialized to address the drawbacks of the prior art multiports depicted in FIG. 1. By way of explanation, US 2015/0268434 discloses multiports 1' having one or more connection ports 9 positioned on the end of extensions 8 that project from the housing of the multiport 1' such as depicted in FIG. 2. Connection ports 9 of multiport 1' are configured for mating directly with a hardened connector (not shown) such as an OptiTap without the need to protect the receptacle 7 within a housing like the prior art multiport 1 of FIG. 1.

Although, these types of multiport designs such as shown in FIG. 2 and disclosed in US 2015/0268434 allow the device to have smaller footprints for the housing 3', these designs still have concerns such as the space consumed by the relatively large ports 9 and associated space requirements of optical connections between the ports and hardened connector of the drop cables along with organizational challenges. Simply stated, the ports 9 on the extensions 8 of the multiport 1' and the optical connections between ports 9 and hardened connector occupy significant space at a location a short distance away from the multiport housing 3' such as within a buried vault or disposed on a pole. In other words, a cluster of optical ports 9 of multiport 1' are bulky or occupy limited space. The conventional hardened connectors used with multiport 1' also use a separate threaded or bayonet coupling that requires rotation about the longitudinal axis of the connector along with sufficient space for grabbing and rotating the coupling means by hand. Further, there are aesthetic concerns with the prior art multiports 1' as well.

Consequently, there exists an unresolved need for multiports that allow flexibility for the network operators to quickly and easily make optical connections in their optical network while also addressing concerns related to limited space, organization, or aesthetics.

SUMMARY

The disclosure is directed to devices comprising at least one connection port and a securing feature associated with the connection port. Devices that may use the concepts disclosed herein include multiports, closures or wireless devices. Methods of making the devices are also disclosed. The devices can have any suitable construction such as disclosed herein such a connection port that is keyed for inhibiting a non-compliant connector from being inserted and potentially causing damage to the device.

One aspect of the disclosure is directed to devices or multiports comprising a shell, at least one connection port, and at least one securing feature. The at least one connection port is disposed on the multiport with the at least one connection port comprising an optical connector opening extending from an outer surface of the multiport to a cavity of the multiport and defining a connection port passageway. The at least one securing feature is associated with the connection port passageway, and at least one securing feature resilient member for biasing a portion of the at least one securing feature.

Another aspect of the disclosure is directed to devices or multiports comprising a shell, at least one connection port, at least one securing feature, and at least one securing feature resilient member for biasing a portion of the at least one securing feature. The at least one connection port comprising an optical connector opening extending from an outer surface of the multiport to a cavity of the multiport and defining a connection port passageway. At least one modular adapter sub-assembly disposed within the shell. The at least one securing feature is associated with the connection port passageway, and at least one securing feature resilient member for biasing a portion of the at least one securing feature.

Still another aspect of the disclosure is directed to devices or multiports comprising a shell, at least one connection port, at least one modular adapter sub-assembly disposed within the shell, and at least one securing feature. The at least one connection port comprising an optical connector opening extending from an outer surface of the multiport to a cavity of the multiport and defining a connection port passageway. At least one modular adapter sub-assembly disposed within the shell. The at least one securing feature capable of translating being associated with the connection port passageway, where a portion of the at least one securing feature is part of the modular adapter sub-assembly.

Yet another aspect of the disclosure is directed to devices or multiports comprising a shell, at least one connection port, modular adapter sub-assembly disposed within the shell, and at least one securing feature. The at least one connection port comprising an optical connector opening extending from an outer surface of the multiport to a cavity of the multiport and defining a connection port passageway. The at least one securing feature capable of translating being associated with the connection port passageway, and a portion of the at least one securing feature comprises a bore.

A further aspect of the disclosure is directed to devices or multiports comprising a shell, at least one connection port, at least one modular adapter sub-assembly disposed within the shell, and at least one securing feature. The at least one connection port comprising an optical connector opening extending from an outer surface of the multiport to a cavity of the multiport and defining a connection port passageway. The at least one securing feature capable of translating being associated with the connection port passageway, and a portion of the at least one securing feature comprises a bore, where the at least one securing feature wherein the at least one securing feature translates from a retain position to an open position as a suitable fiber optic connector is inserted into the at least one connection port.

Still another aspect of the disclosure is directed to devices or multiports comprising a shell, at least one connection port, at least one modular adapter sub-assembly disposed within the shell, and at least one securing feature. The at least one connection port comprising an optical connector opening extending from an outer surface of the multiport to a cavity of the multiport and defining a connection port passageway. The at least one securing feature capable of translating being associated with the connection port passageway, and the securing feature comprises an actuator and a securing member, and the at least one securing member comprises a bore and a locking feature, and wherein the at least one securing feature translates from a retain position to an open position as a suitable fiber optic connector is inserted into the at least one connection port.

Other aspects of the disclosure are directed to devices or multiports comprising a shell, at least one connection port, a securing feature passageway, at least one securing feature, and at least one modular adapter sub-assembly disposed within the shell. The at least one connection port comprising an optical connector opening extending from an outer surface of the multiport to a cavity of the multiport and defining a connection port passageway. The at least one securing feature capable of translating being associated with the connection port passageway, and the at least one securing feature comprises a locking member and an actuator, and the actuator is capable of translating within a portion of the at least one securing feature passageway, and where at least one securing feature translates from a retain position to an open position as a suitable fiber optic connector is inserted into the at least one connection port. The securing member being a part of the modular adapter sub-assembly.

A still further aspect of the disclosure is directed to a wireless device comprising a shell, at least one connection port, at least one securing feature. The at least one connection port is disposed on the wireless device, the at least one connection port comprising an optical connector opening extending from an outer surface of the wireless device into a cavity of the wireless device and defining a connection port passageway. The at least one securing feature capable of translating being associated with the connection port passageway, and at least one securing feature resilient member for biasing a portion of the at least one securing feature. The at least one securing feature may comprises a locking member and an actuator or be formed as a single component as desired. The connection port of the wireless device may also comprise other features, structures or components as disclosed herein.

Other aspects of the disclosure are directed to methods of making the devices described herein. One method of making devices comprising an optical connection port comprises the steps of installing at least one securing feature into the device so that the at least one securing feature is associated with a respective connection port. The securing feature may translate between an open position and a retain position, and at least one securing feature resilient member is positioned for biasing a portion of the at least one securing feature to a retain position. The method may further comprise a locking feature on the securing feature. Any suitable locking feature may be used, and in one embodiment the locking feature comprises a ramp with a ledge.

Methods of making the device may further comprise the securing feature (310) translating from a retain position (RP) to an open position (OP) as a suitable fiber optic connector (10) is inserted into the at least one connection port (236). Still other methods may further comprise the securing feature 310 being capable of moving to a retain position RP automatically when a suitable fiber optic connector is fully-inserted into a connector port passageway (233). Yet further methods may comprise translating the at least one securing feature 310 the open position OP from a normally-biased retain position RP.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

BRIEF DESCRIPTION OF THE FIGURES

FIG. 24-27 are various perspective views showing the details of the adapter body of the modular adapter sub-assembly of FIGS. 9-12;

FIGS. 47 and 48 depict views of a dust cap for the connection ports of the devices disclosed;

DETAILED DESCRIPTION

Figure 1:
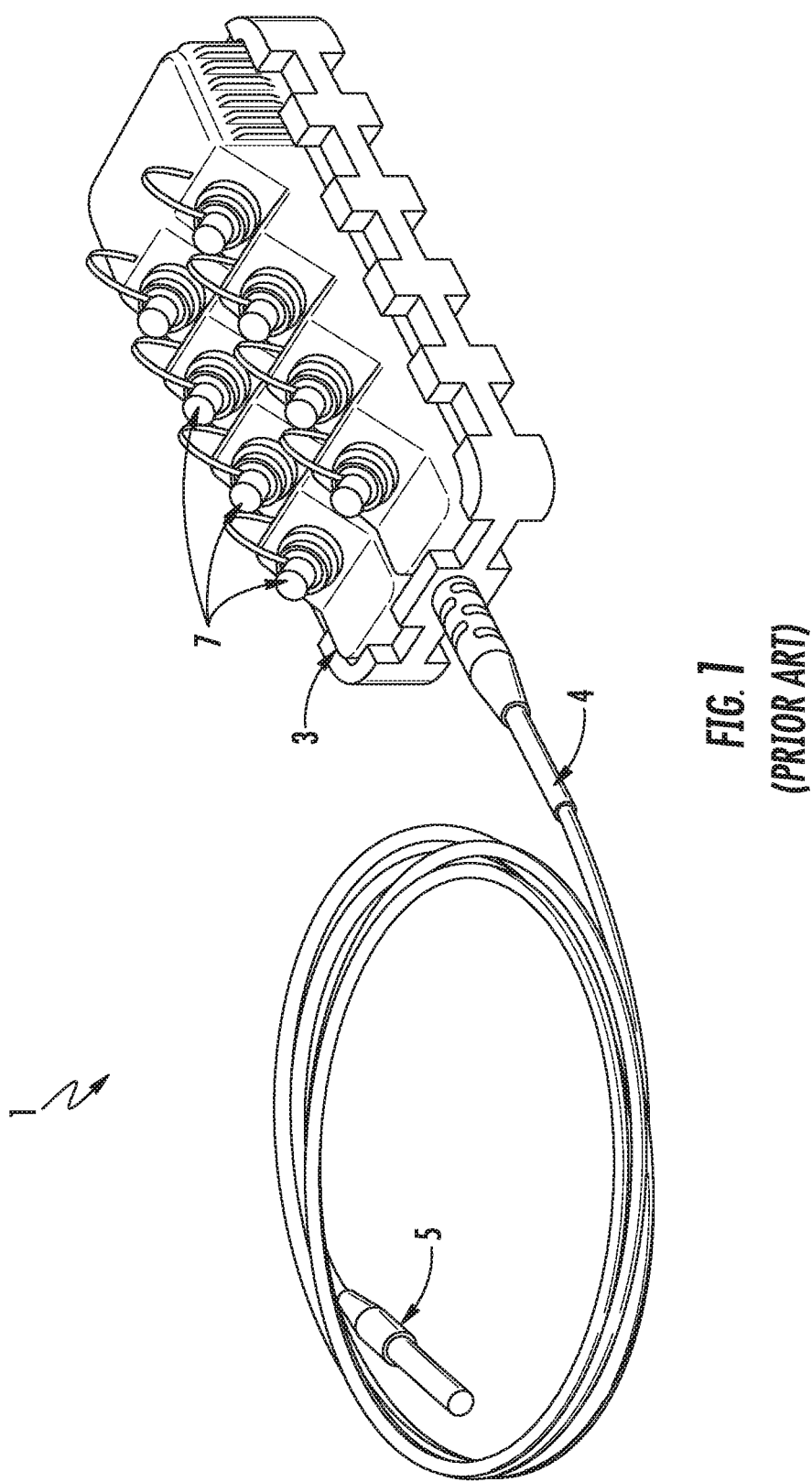
FIGS. 1 and 2 are prior art multiports.

Reference will now be made in detail to the embodiments of the disclosure, examples of which are illustrated in the accompanying drawings. Whenever possible, like reference numbers will be used to refer to like components or parts.

The concepts for the devices disclosed herein are suitable for providing at least one optical connection to the device for indoor, outdoor or other environments as desired. Generally speaking, the devices disclosed and explained in the exemplary embodiments are multiports, but the concepts disclosed may be used with any suitable device as appropriate. As used herein, the term "multiport" means any device comprising at least one connection port for making an optical connection and a securing feature associated with the at least one connection port. By way of example, the multiport may be any suitable device having at least one optical connection such as a passive device like an optical closure (hereinafter "closure") or an active device such as a wireless device having electronics for transmitting or receiving a signal.

The concepts disclosed advantageously allow compact form-factors for devices such as multiports comprising at least one connection port and a securing feature associated with the connection port. The concepts are scalable to any suitable count of connection ports on a device in a variety of arrangements or constructions. The securing features disclosed herein for devices engage directly with a portion of connector without conventional structures like prior art devices that require the turning of a coupling nut, bayonet or the like. As used herein, "securing feature" excludes threads and features that cooperate with bayonets on a connector. Thus, the devices disclosed may allow connection ports to be closely spaced together and may result in small devices since the room needed for turning a threaded coupling nut or bayonet is not necessary. The compact form-factors may allow the placement of the devices in tight spaces in indoor, outdoor, buried, aerial, industrial or other applications while providing at least one connection port that is advantageous for a robust and reliable optical connection in a removable and replaceable manner. The disclosed devices may also be aesthetically pleasing and provide organization for the optical connections in manner that the prior art multiports cannot provide.

The devices disclosed are simple and elegant in their designs. The devices disclosed comprise at least one connection port and a securing feature associated with the connection port that is suitable for retaining an external fiber optic connector received by the connection port. The connection port may include a keying portion that cooperates with a key on a complimentary external fiber optic connector to inhibit damage to the connection port by inhibiting the insertion of a non-compliant connector. The keying portion may also aid the user during blind insertion of the connector into the connection port of the device to determine the correct rotational orientation with respect to the connection port when a line of sight is not possible or practical for alignment.

Unlike prior art multiports, the concepts disclosed advantageously allow the quick and easy connection and retention by inserting the fiber optic connectors directly into the connection port of the device without the need or space considerations for turning a threaded coupling nut or bayonet for retaining the external fiber optic connector. Generally speaking, the securing features disclosed for use with devices herein may comprise one or more components with at least one component translating for releasing or securing the external fiber optic connector to the device. As used herein, the term "securing feature" excludes threaded portions or features for securing a bayonet disposed on a connector.

Since the connector footprint used with the devices disclosed does not require the bulkiness of a coupling nut or bayonet, the fiber optic connectors used with the devices disclosed herein may be significantly smaller than conventional connectors used with prior art multiports. Moreover, the present concepts for connection ports on devices allows an increased density of connection ports per volume of the shell or increased port width density since there is no need for accessing and turning the coupling nut or bayonets by hand for securing a fiber optic connector like the prior art multiports.

The devices disclosed comprise a securing feature for directly engaging with a suitable portion of a connector housing of the external fiber optic connector or the like for securing an optical connection with the device. Different variations of the concepts are discussed in further detail below. The structure for securing the fiber optic connectors in the devices disclosed allows much smaller footprints for both the devices and the fiber optic connectors along with a quick-connect feature. Devices may also have a dense spacing of connection ports if desired. The devices disclosed advantageously allow a relatively dense and organized array of connection ports in a relatively small form-factor while still being rugged for demanding environments. As optical networks increase densifications and space is at a premium, the robust and small-form factors for devices such as multiports, closures and wireless devices disclosed herein becomes increasingly desirable for network operators.

The concepts disclosed herein are suitable for optical distribution networks such as for Fiber-to-the-Home and 5G applications, but are equally applicable to other optical applications as well including indoor, automotive, industrial, wireless, or other suitable applications. Additionally, the concepts disclosed may be used with any suitable fiber optic connector footprint that cooperates with the securing feature of the device. Various designs, constructions, or features for devices are disclosed in more detail as discussed herein and may be modified or varied as desired.

The devices disclosed may locate the at least one connection port 236 in different portions or components of the device as desired using the disclosed concepts. The concepts are shown and described with a device 200 having 4-connection ports that are optically connected to an input port arranged in an array on one end of the device, but other configuration are possible such as connection ports or input ports on both ends, an express port, a pass-through port or the like. FIGS. 3-32 show the construction and features for a first explanatory multiport, and FIGS. 33-47 show the construction of a second explanatory multiport 200 similar to the first multiport 200. Although, these concepts are described with respect to multiports the concepts may be used with any other suitable devices such as wireless devices (FIG. 49), closures (FIG. 50) or other suitable devices.

Figure 3:
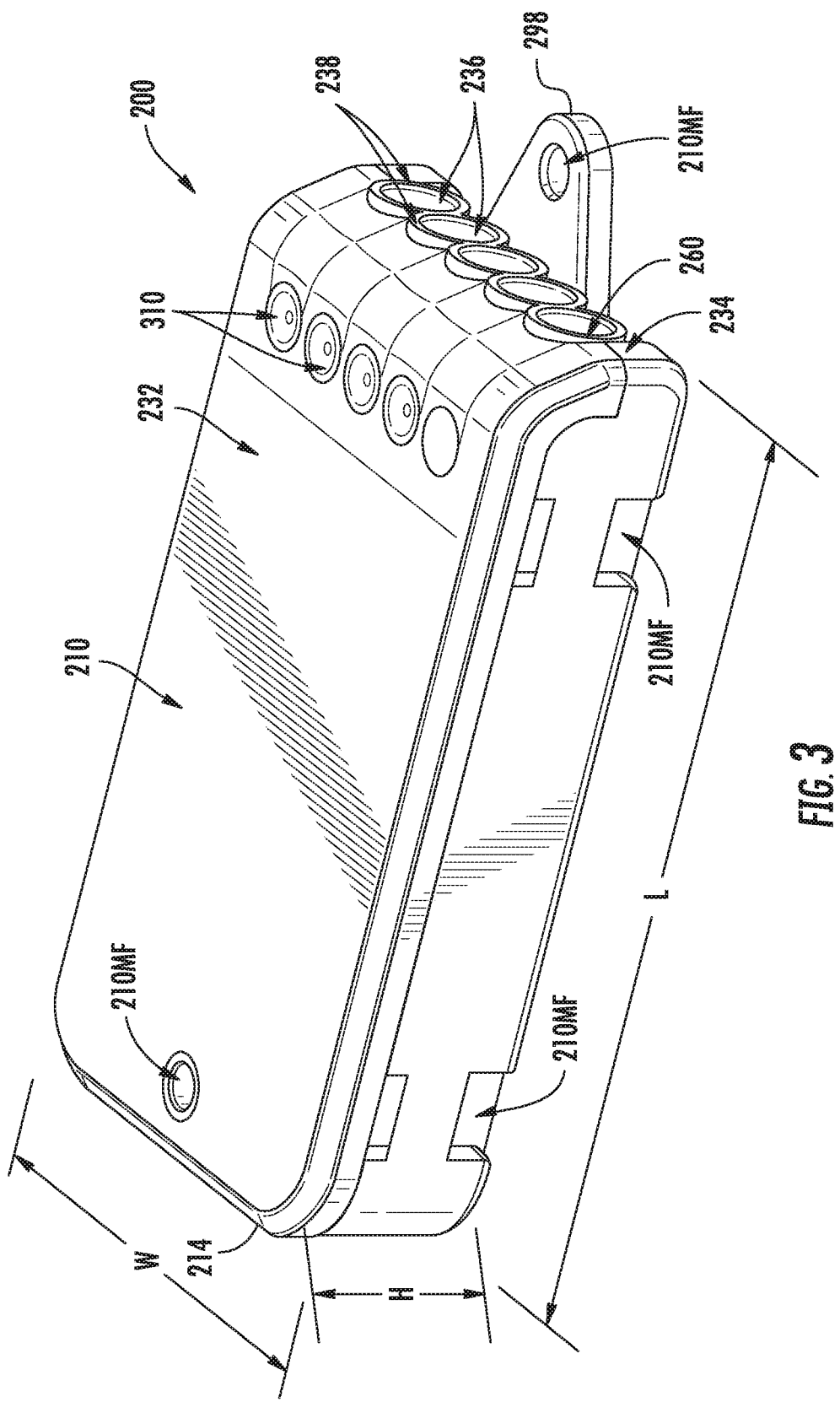
FIGS. 3 and 4 respectively are top and bottom perspectives view of an assembled device such as an explanatory multiport comprising at least one connection port defined by a respective optical connector opening disposed in the shell of the multiport along with a securing feature associated with the connection port passageway.
Figure 4:
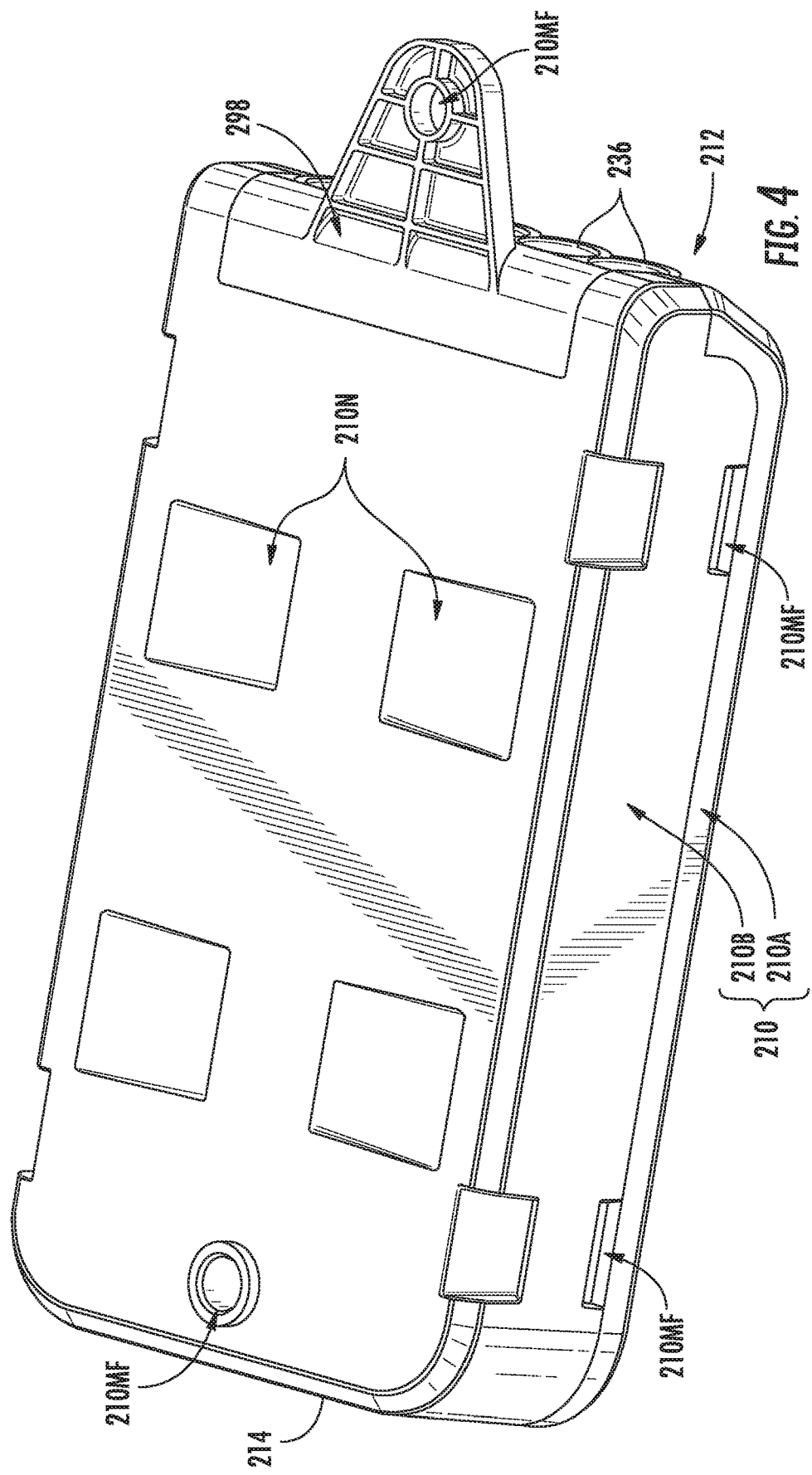

FIGS. 3 and 4 respectively depict top and bottom perspective views of the first explanatory multiport 200 comprising at least one connection port 236. The Generally speaking, devices such as multiport 200 comprise a shell 210 comprising a body 232 and one or more connection ports 236 disposed on a first end or portion 212 of multiport 200. The connection ports 236 or input port 260 are configured for receiving and retaining suitable external fiber optic connectors 10 (FIG. 39) for making optical connections with the multiport 200.

Connection ports 236 each comprises a respective optical connector opening 238 extending from an outer surface 234 of the multiport 200 into a cavity 216 of the multiport 200 and defining a portion of a connection port passageway 233. By way of explanation, at least one connection port 236 is molded as a portion of shell 210. At least one securing feature 310 is associated with the connection port passageway 233 for cooperating with the external fiber optic connector 10. The securing feature 310 may translate for releasing or securing the external fiber optic connector 10. Multiport 200 of FIGS. 3 and 4 also comprises an input port 260 that is similar to the connection ports 236. As shown, the connection ports 236 or input port 260 may comprise a marking indicia such as an embossed number or text, but other marking indicia are also possible. For instance, the marking indicia may be on the securing feature 310 such as text or the securing features may be color-coded to indicate fiber count, input or output for the associated connection port or input port.

The concepts disclosed use a securing feature resilient member 310RM for biasing a portion of the securing feature 310 as discussed herein. Multiports 200 disclosed use one or more modular adapter sub-assemblies 310SA (FIGS. 9-12) disposed within a shell for a scalable form-factor for manufacturing similar devices with different port counts. The shell comprises one or more connection ports and device comprises one or more respective securing features 310 cooperating with the connection ports for providing quick and easy optical connectivity with a robust and reliable design that is intuitive to use.

Optical connections to the devices are made by inserting one or more suitable external fiber optic connectors into respective connection port passageways 233 as desired. Specifically, the connection port passageway 233 is configured for receiving a suitable external fiber optic connector (hereinafter connector) of a fiber optic cable assembly (hereinafter cable assembly). Connection port passageway 233 is associated with a securing feature 310 for retaining (e.g., securing) the connector in the multiport 200 for making an optical connection. The securing feature 310 advantageously allows the user to make a quick and easy optical connection at the connection port 236 of multiport 200. The securing feature 310 may also operate for providing a connector release feature when actuated.

Specifically, the connector may be retained within the respective connection port 236 of the device by pushing and fully-seating the connector within the connection port 236. To release the connector from the respective connection port 236, the securing feature 310 is actuated by pushing inward and releasing the securing feature 310 from the locking feature 20L on the external connector housing 20 (FIG. 39) and allowing the connector to be removed from the connection port 236. Stated another way, the at least one securing feature 310 is capable of releasing the connector when a portion of the securing feature 310 translates within a portion of a securing feature passageway 245. The full insertion and automatic retention of the connector may advantageously allow one-handed installation of the connector by merely pushing the connector into the connection port 236. The devices disclosed accomplish this connector retention feature upon full-insertion by biasing the securing feature to a retain position. However, other modes of operation for retaining and releasing the connector are possible according to the concepts disclosed. For instance, the securing feature 310 may be designed to require actuation for inserting the connector; however, this may require a two-handed operation.

Securing feature 310 may be designed for holding a minimum pull-out force for the connector. In some embodiments, the pull-out force may be selected to release the connector before damage is done to the device or the connector. By way of example, the securing feature 310 associated with the connection port 236 may require a pull-out force of about 50 pounds (about 220N) before the connector would release. Likewise, the securing feature 310 may provide a side pull-out force for connector for inhibiting damage as well. By way of example, the securing feature 310 associated with the connection port 236 may provide a side pull-out force of about 25 pounds (about 1110N) before the connector would release. Of course, other pull-out forces such as 75 pounds (about 330N) or 100 (about 440N) pounds are possible along with other side pull-out forces.

FIGS. 3 and 4 depict that shell 210 is formed by a first portion 210A and a second portion 210B, but other constructions are possible for shell 210 using the concept disclosed. Multiport 200 or devices may comprise mounting features that are integrally formed in the shell 210 or that are separate components attached to shell 210 for mounting the device as depicted in FIGS. 3 and 4. By way of example, shell 210 depicts mounting features 210MF disposed near first and second ends 212, 214 of shell 210. Mounting feature 210MF adjacent the first end 212 of multiport 200 is a mounting tab 298 attached to shell 210, and the mounting feature 210MF adjacent the second end 214 is a through hole with a support 210S. Details of mounting tab will be discuss in further detail with respect to FIG. 15 and, and details of support 210S will be discussed in further detail with respect to FIG. 8. However, mounting features 210MF may be disposed at any suitable location on the shell 210 or connection port insert 230. For instance, multiport 200 also depicts a plurality of mounting features 210MF integrally-formed on shell 210 and configured as passageways disposed on the lateral sides. Thus, the user may simply use a fastener such as a zip-tie threaded thru these lateral passageways for mounting the multiport 200 to a wall or pole as desired. Shell 210 may also include one or more notches 210N on the bottom side for aiding in securing the device to a round pole or the like as shown in FIG. 4.

Figure 5:
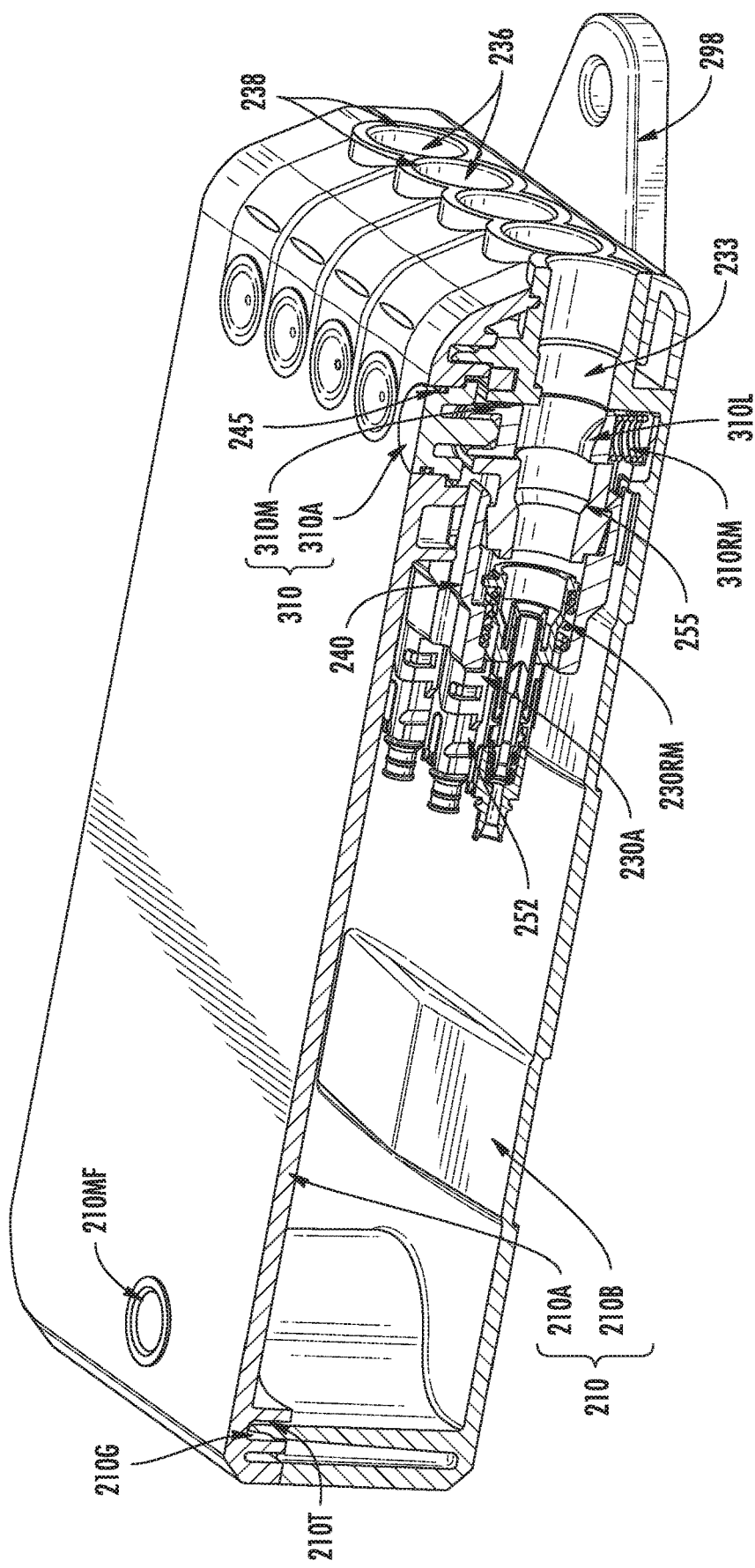
FIG. 5 depicts a longitudinal sectional view of the multiport of FIGS. 3 and 4 through the connection port for showing the internal construction of the multiport with the rear (internal) connector shown and the optical fibers removed for clarity.
Figure 6:
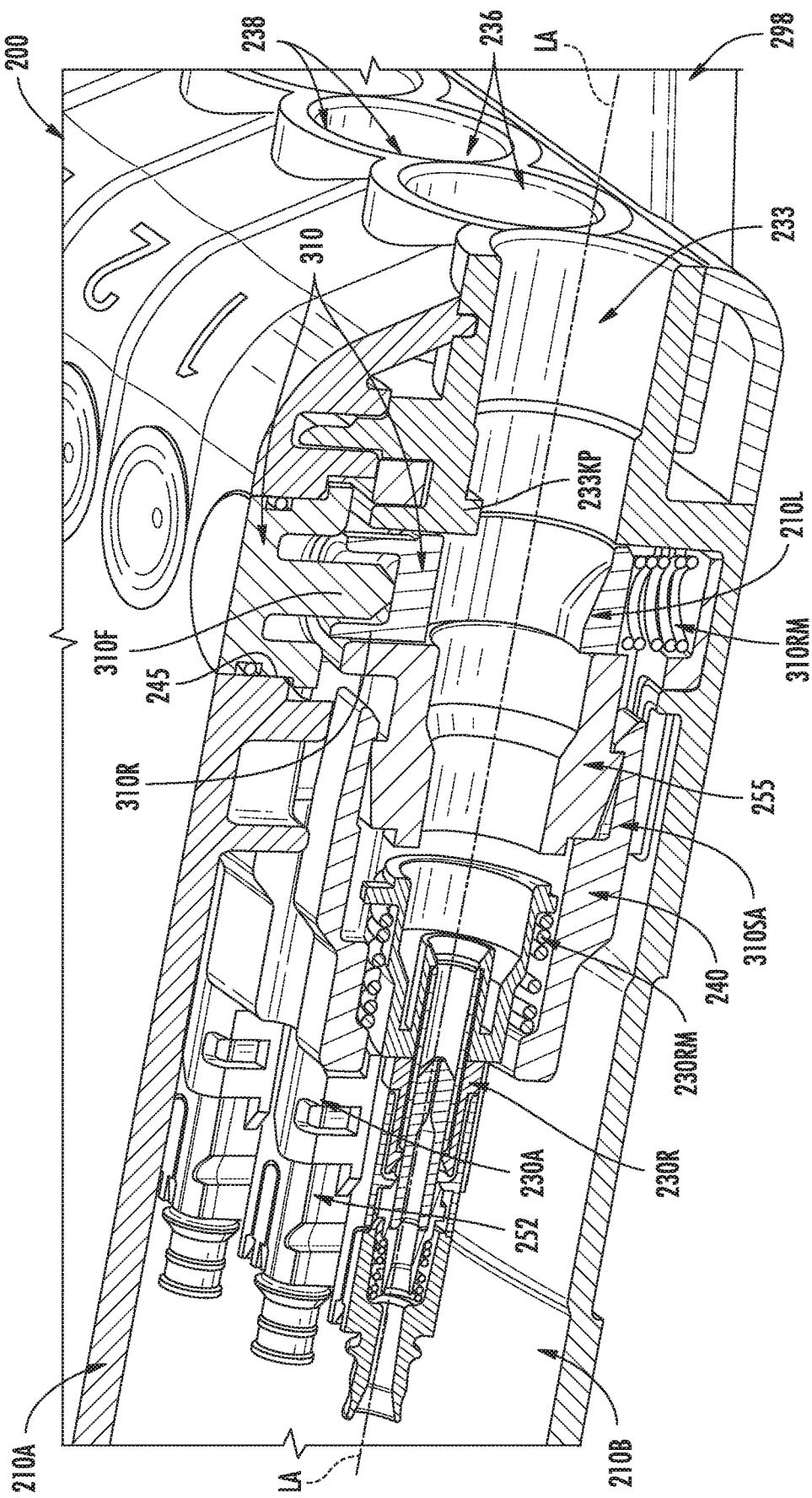
FIGS. 6 and 7 are detailed sectional views of the multiport of FIGS. 3 and 4 through the connection port for showing the internal construction of the multiport with the rear (internal) connectors shown and the optical fibers removed for clarity.
Figure 7:
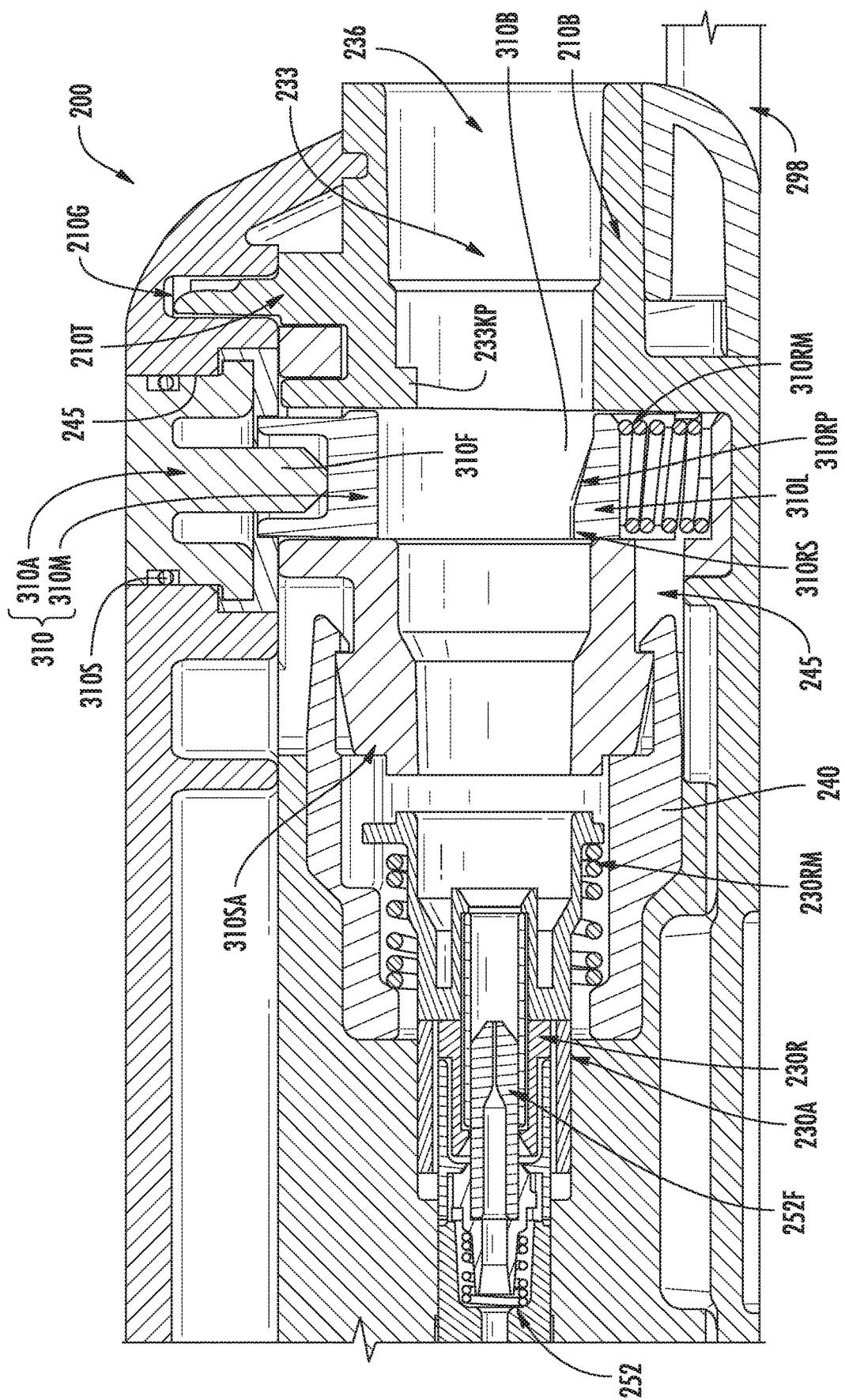
Figure 8:
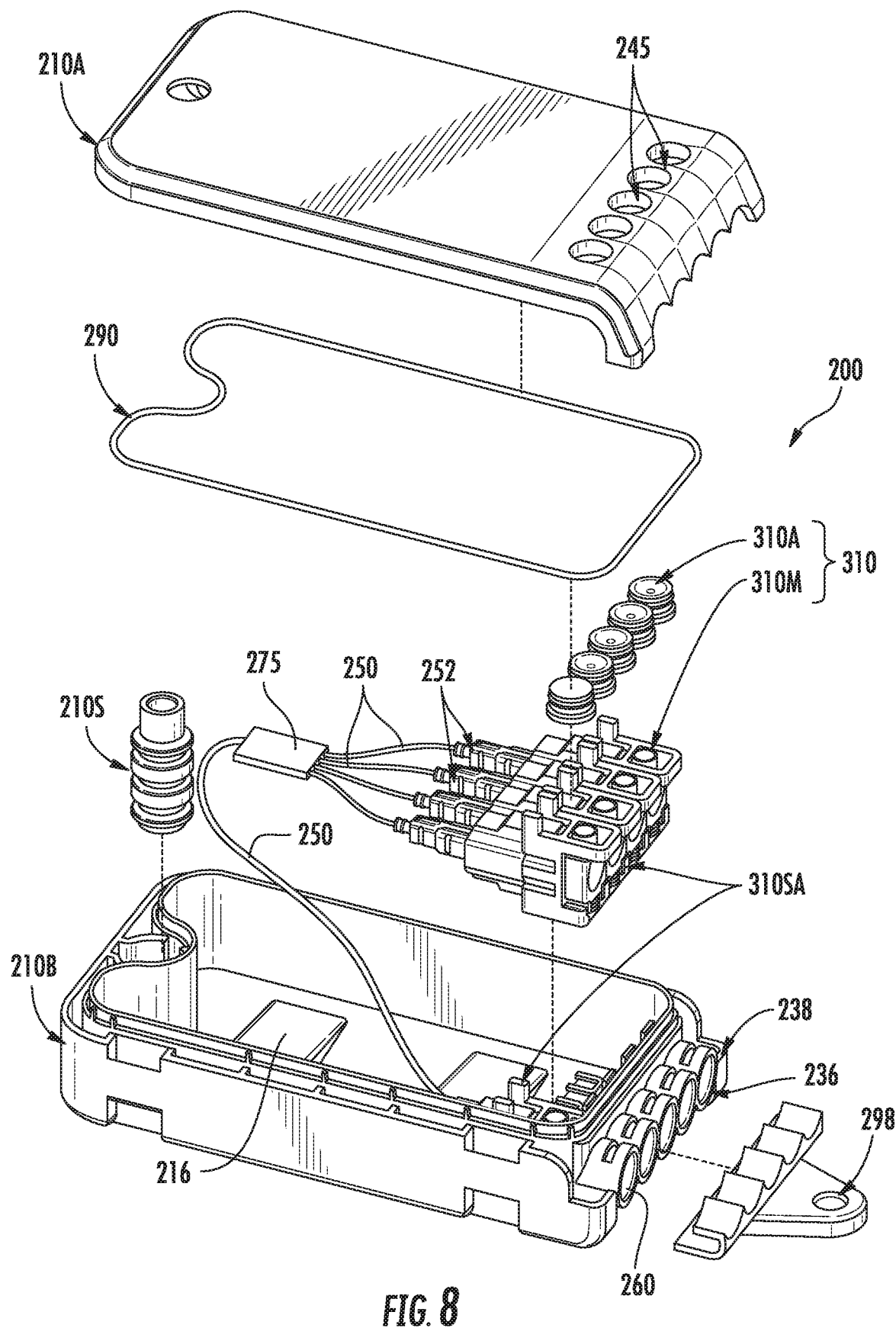
FIG. 8 is a partially exploded view of the multiport of FIGS. 3 and 4 with the optical fibers assembly comprising an optical splitter.

FIGS. 5-7 depict various cross-sections through a connection port passageway 233 showing the internal construction of multiport 200, and FIG. 8 is a partially exploded view of multiport 200 showing the optical fibers 250 that optically connect the connection ports 236 with the input port 260 inside the device. As depicted in FIG. 8, multiport 200 comprises a shell 210 comprising at least one connection port 236, and a modular adapter sub-assembly 310SA as discussed in further detail herein FIGS. 5-7 depicts the multiport 200 comprising at least one connection port 236 extending from an outer surface 234 of the multiport 200 into a cavity 216 of the multiport 200 and defining a connection port passageway 233. Multiport 200 also comprises at least one securing feature 310 associated with the connection port passageway 233. Multiport 200 also comprises at least one securing feature passageway 245 for receiving a portion of the securing feature 310. As depicted, the securing feature passageways 245 extend from the outer surface 234 of multiport 200 to cooperate with the respective connection port passageways 233 of the multiport 200. Multiport 200 also comprises a plurality of adapters 230A for receiving respective rear connectors 252 in alignment with the respective connection port 236 for making the optical connection with the external fiber optic connector.

The securing features 310 disclosed herein may take many different constructions or configurations as desired such as being formed as a single component or a plurality of components. Securing features 310 may be biased by a resilient member 230 RM. Furthermore, the securing features 310 or portions of securing features 310 may be constructed as a portion of a modular adapter sub-assemblies 310SA such as shown in FIGS. 9-12 for easy assembly of the multiport 200. Moreover, the modular sub-assemblies 230SA advantageously allow the mating components for each connection port 236 to move or "float" independently of other mating components relative to the shell 210 for the other connection ports for preserving optical performance. "Float" means that the adapter 230A can have slight movement in the X-Y plane for alignment, and may be inhibited from over-traveling in the Z-direction along the axis of connector insertion so that suitable alignment may be made between mating connectors, which may include a biasing spring for allowing some displacement of the adapter 230A with a suitable restoring force provided by the spring.

Generally speaking, the devices disclosed comprise at least one connection port 236 defined by an optical connector opening 238 extending into a cavity 216 of the device 200, 500, 700 along with a securing feature 310 associated with the connection port 236.

As best shown in FIGS. 6 and 7, securing feature 310 is biased to a retain position. Specifically, the securing feature 310 is biased in an upward direction using a securing feature resilient member 310RM. More specifically, securing feature resilient member 310RM is disposed beneath securing feature 310 for biasing to a normally retain position for the securing feature 310 where the locking feature 310L is disposed in the connection port passageway 233.

As best depicted in FIGS. 6 and 7, a portion of actuator 310A is disposed within a portion of the securing feature passageway 245 and cooperates with the securing member 310M of the respective securing feature. Consequently, a portion of securing feature 310 (i.e., the actuator 310A) is capable of translating within a portion of the securing feature passageway 245. Actuator 310A comprises a finger 310F for seating within a rim 310R of securing member 310M for transferring forces to the same. As depicted, a sealing feature 310S is disposed on the securing feature 310. Sealing feature 310S provides a seal between a portion of the securing feature 310 and the securing feature passageway 245 to inhibit dirt, dust and debris from entering the device. As shown, the sealing feature 310S is disposed within a groove of actuator 310A.

In this embodiment, the securing feature 310 comprises a bore 310B that is aligned with the least one connection port passageway 233 when assembled as best shown in FIG. 7. Bore 310B is sized for receiving a suitable connector therethrough for securing the same for optical connectivity. Bores or openings through the securing feature 310 may have any suitable shape or geometry for cooperating with its respective connector. As used herein, the bore may have any suitable shape desired including features on the surface of the bore for engaging with a connector. Bore 310B is disposed on the securing member 310M in this embodiment.

In some embodiments, a portion of the securing feature 310 is capable of moving to an open position when inserting a suitable connector 10 into the connection port passageway 233. When the connector 10 is fully-inserted into the connector port passageway 233, the securing feature 310 such as the securing member 310M is capable of moving to the retain position automatically. Consequently, the connector 10 is secured within the connection port 236 by securing feature 310 without turning a coupling nut or a bayonet like the prior art multiports. Stated another way, the securing feature 310 translates from the retain position to an open position as a suitable connector 10 is inserted into the connection port 236. The securing feature passageway 245 is arranged transversely to a longitudinal axis LA of the multiport 200, but other arrangements are possible. Other securing features may operate in a similar manner, but use an opening instead of a bore that receives the connector therethrough.

Figure 39:
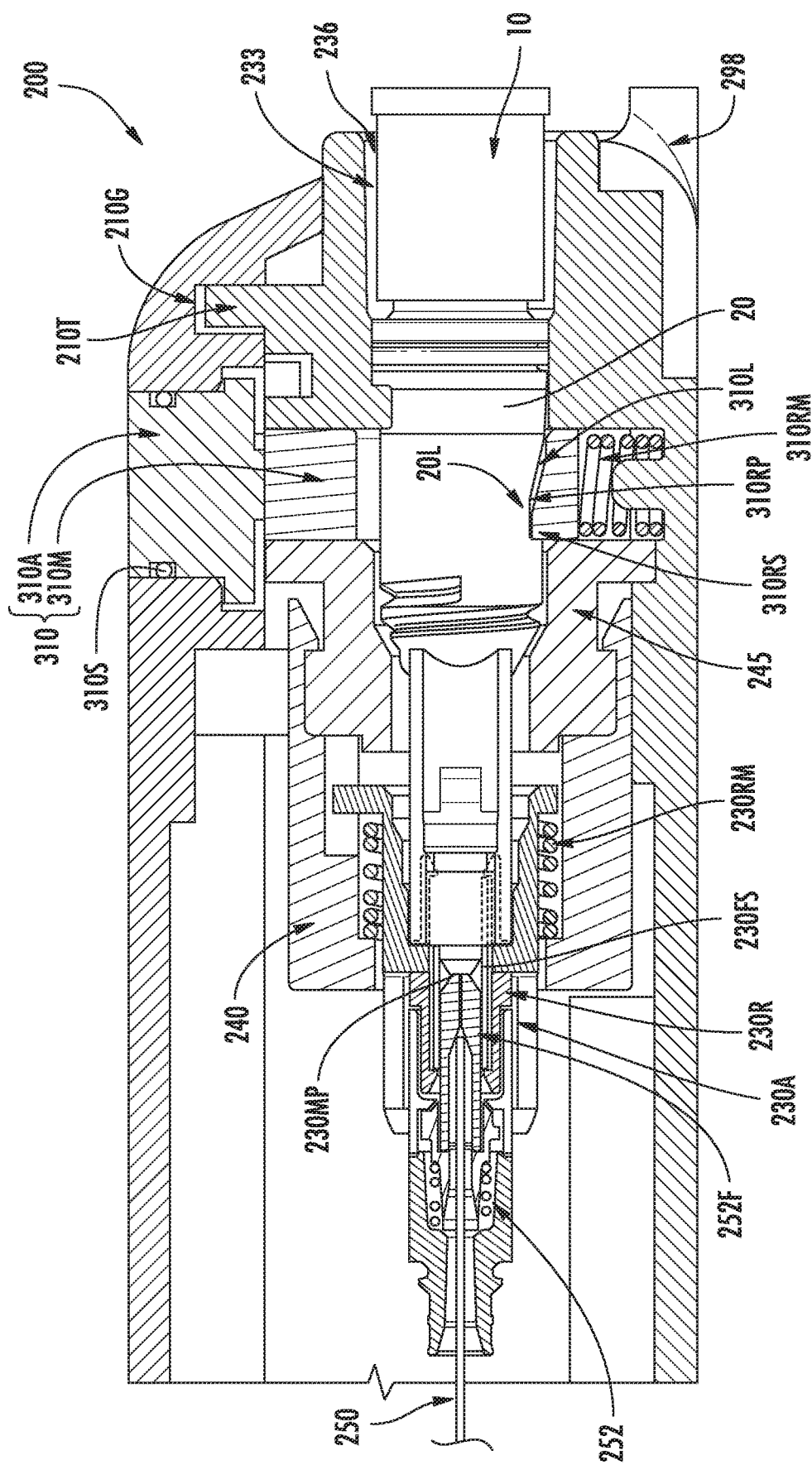
FIG. 39 is a detailed sectional view of the multiport of FIG. 33 through the connection port for showing the internal construction of the multiport with a fiber optic connector retained using the securing feature.

FIGS. 6 and 7 depict securing feature 310 comprising a locking feature 310L. Locking feature 310L cooperates with a portion of the connector 10 when it is fully-inserted into the connection port 236 for securing the same. As best shown in FIG. 39, the connector housing 20 of connector 10 may have a cooperating geometry that engages the locking feature 310L of securing feature 310. In this embodiment, locking feature 310L comprises a ramp 310RP. The ramp is integrally formed at a portion of the bore 310B with the ramp angling up when looking into the connection port 236. The ramp allows the connector to push and translate the securing feature 310 downward against the securing feature resilient member 310RM as the connector is inserted in the connection port 236 as shown. Ramp may have any suitable geometry. Once the locking feature 310L of the securing feature 310 is aligned with the cooperating geometry of the locking feature 20L of connector, then a portion of the securing feature 310 translates so that the locking feature 310L engages the locking feature of connector.

Locking feature 310L comprises a retention surface 310RS. In this embodiment, the back-side of the ramp of locking feature 310L forms a ledge that cooperates with complimentary geometry on the connector housing of connector. However, retention surface 310RS may have different surfaces or edges that cooperate for securing connector for creating the desired mechanical retention. For instance, the retention surface 310RS may be canted or have a vertical wall for tailoring the pull-out force for the connection port 236. However, other geometries are possible for the retention surface 310RS. Additionally, the connection port 236 has a sealing location at a connection port passageway sealing surface with the connector that is located closer to the optical connector opening 238 at the outer surface 234 than the securing feature 310 or locking feature 310L. In other words, connection port 236 has connection port passageway sealing surface for the connector disposed at a distance from the optical connector opening 238 and the locking feature 310L and securing feature 310 are disposed at a distance further into the connection port passageway 233 than distance where the connector sealing occurs.

Generally speaking, the connection port passageways 233 may be configured for the specific connector intended to be received in the connection port 236. Likewise, the connection port passageways 233 should be configured for receiving the specific rear connector 252 for mating and making an optical connection with the connector 10.

The device 200 also comprises at least one adapter 230A aligned with the respective connection port 236 or connection port passageway 233. Adapter 230A and other components are a portion of the modular sub-assembly 310SA as depicted in FIGS. 9-12. Adapter 230A is suitable for securing a rear connector 252 thereto for aligning the rear connector 252 with the connection port 236. One or more optical fibers 250 (FIG. 8) may be routed from the connection port 236 toward an input connection port 260 of the multiport 200. For instance, the rear connector 252 may terminate the optical fiber 250 for optical connection at connection port 236 and route the optical fiber 250 for optical communication with the input connection port 260.

A plurality of rear connectors 252 are aligned with the respective connector port passageways 233 within the cavity 216 of the multiport 200. The rear connectors 252 are associated with one or more of the plurality of optical fibers 250. Each of the respective rear connectors 252 aligns and attaches to a structure such as the adapter 230A or other structure related to the connection port passageway 233 in a suitable matter. The plurality of rear connectors 252 may comprise a suitable rear connector ferrule 252F as desired and rear connectors 252 may take any suitable form from a simple ferrule that attaches to a standard connector type inserted into an adapter. By way of example, rear connectors 252 may comprise a resilient member for biasing the rear connector ferrule 252F or not. Additionally, rear connectors 252 may further comprise a keying feature.

The rear connectors 252 shown in FIGS. 5-7 have a SC footprint, but other connectors are possible. If SC connectors are used as the rear connector 252 they have a keying feature 252K that cooperates with the keying feature of adapter 230A. Additionally, adapters 230A comprise a retention feature (not numbered) for seating the adapters 230A in the device adjacent to the connection port passageway 233.

Figure 15:
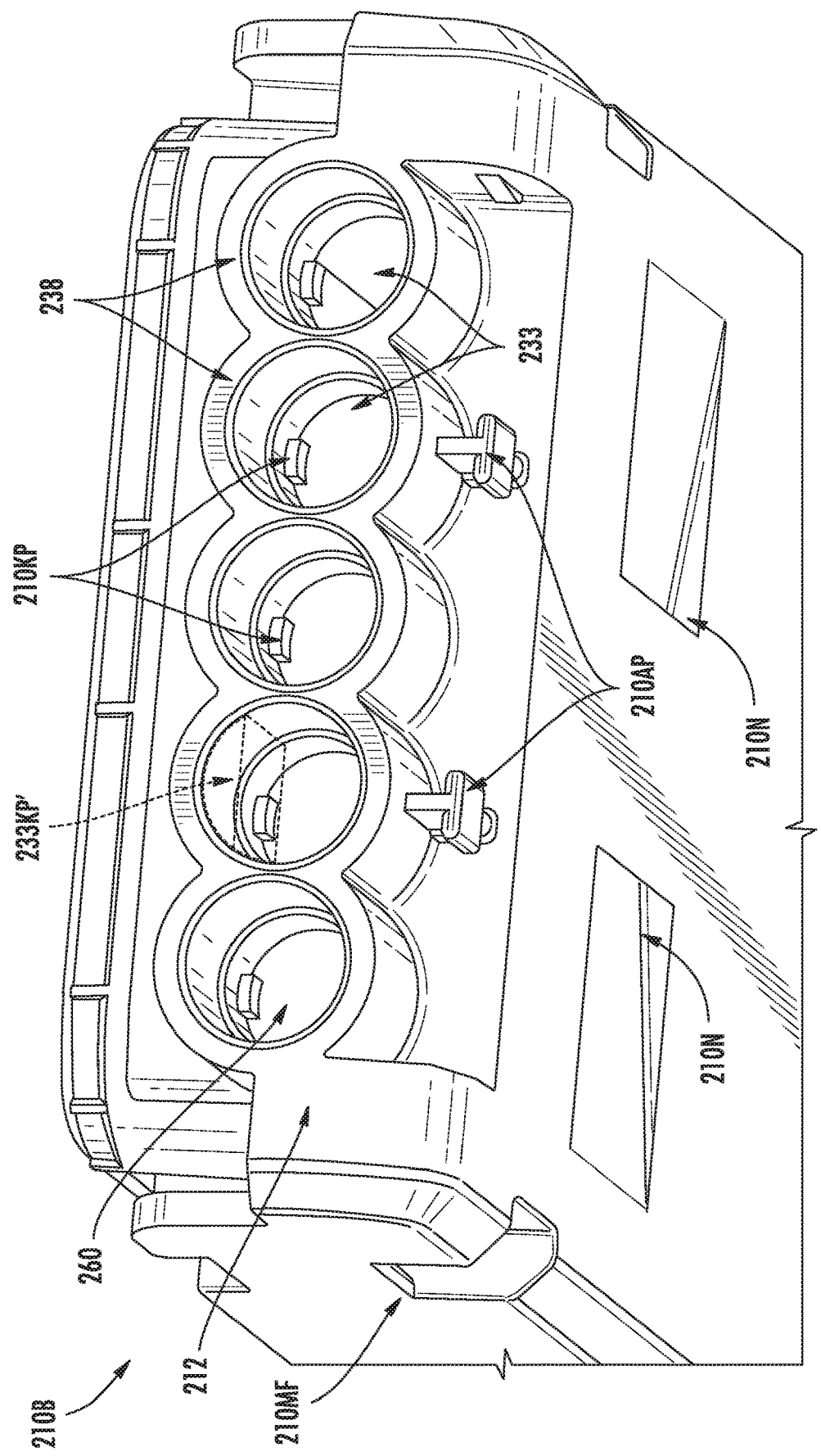
FIG. 15 is a front perspective view of the second portion of the shell depicted in FIGS. 13 and 14.
Figure 16:
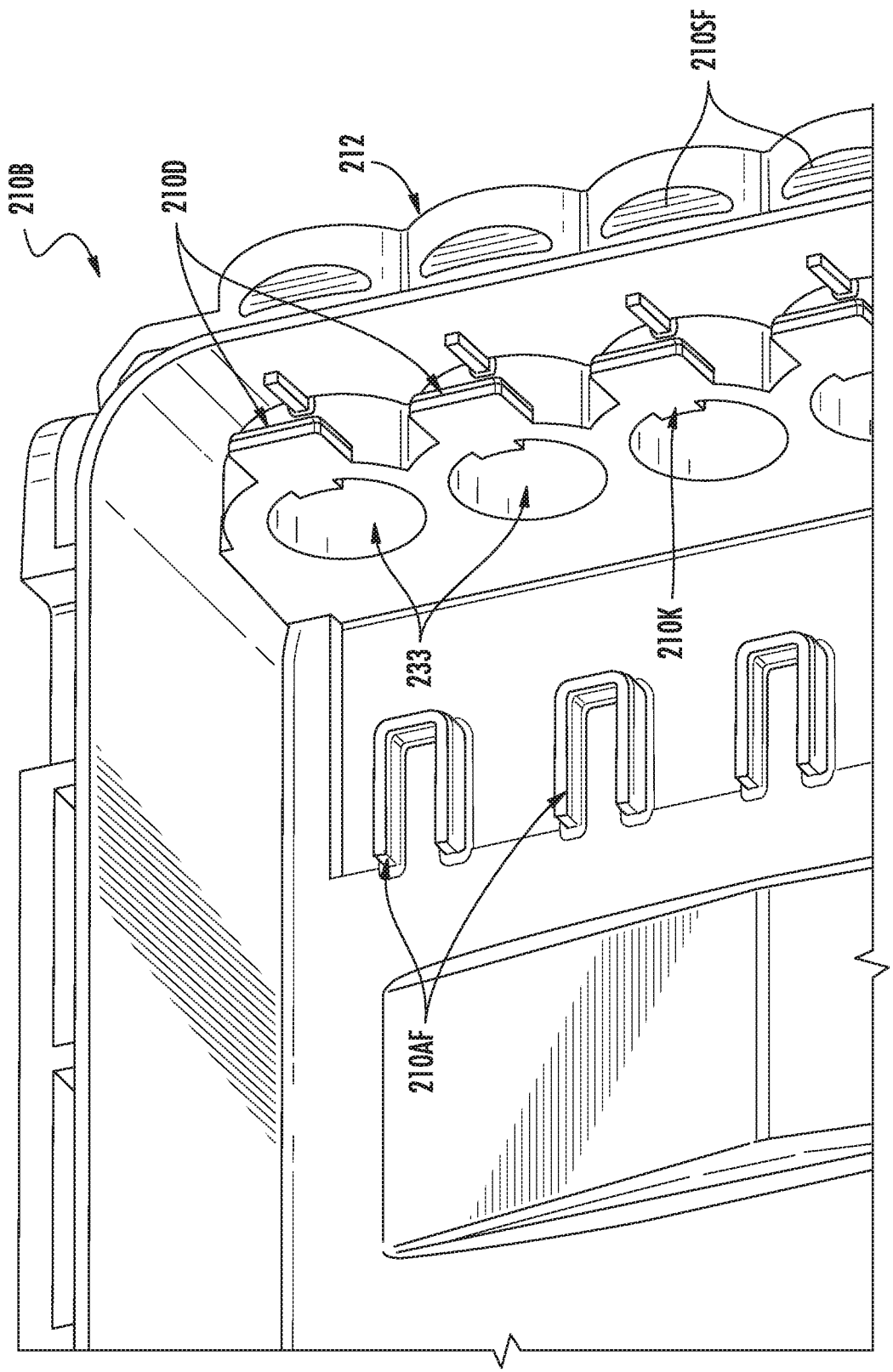
FIG. 16 is a detailed perspective view of the second portion of shell showing the mounting features for modular adapter sub-assembly of FIGS. 9 and 10.

As best shown in FIGS. 7 and 15, the connection port passageway 233 may comprises a keying portion 233KP disposed forward of the securing feature 310 in connection port passageway. As shown, the keying portion 233KP is an additive keying portion to the primitive geometric round shape of the connection port passageway 233 such as a male key that is disposed forward of the securing feature in the connection port passageway 233. However, the concepts for the connection ports 236 of devices may be modified for different connector designs.

Adapters 230A are secured to an adapter body 255 using retainer 240. Adapters 230A may be biased using a resilient member 230RM as shown. Rear connectors 252 may take any suitable form and be aligned for mating with the connector secured with the connection ports 236 in any suitable manner. Adapters 230A may comprise latch arms for securing respective rear connectors therein.

Multiport 200 may have the input connection port 260 disposed in any suitable location. As used herein, "input connection port" is the location where external optical fibers are received or enter the device, and the input connection port does not require the ability to make an optical connection as discussed below. By way of explanation, multiport 200 may have the input connection port 260 disposed in an outboard position of the array of connection ports 236, on another side of the multiport, or disposed in a medial portion of array of connection ports 236 as desired.

FIG. 8 shows a partially exploded view of multiport 200 of FIGS. 3 and 4. Multiport 200 comprises a shell 200, at least one connection port 236, and a plurality of modular adapter sub-assemblies 310SA. Multiport 200 has one or more optical fibers 250 routed from the one or more connection ports 236 toward an input connection port 260 in a suitable fashion inside cavity 216 as depicted. In this embodiment, the rear connectors 252 are attached to optical fibers 250 that are routing through an optical splitter 275 (hereinafter "splitter(s)") for optical communication with the optical fiber 250 in optical communication with the input port 260. As shown, the modular adapter sub-assembly 310SA for the input connection port 260 is disposed in second portion 210B of shell 210.

Optical fibers 250 are routed from one or more of the plurality of connection ports 236 toward an input connection port 260 for optical communication within the multiport 200. Consequently, the input connection port 260 receives one or more optical fibers and then routes the optical signals as desired such as passing the signal through 1:1 distribution, routing through an optical splitter or passing optical fibers through the multiport. Splitters 275 such as shown in FIG. 8 allow a single optical signal to be split into multiple signals such as 1×N split, but other splitter arrangements are possible such as a 2×N split. For instance, a single optical fiber may feed input connection port 260 and use a 1×8 splitter within the multiport 200 to allow eight connector ports 236 for outputs on the multiport 200. The input connection port 260 may be configured in a suitable manner with any of the multiports 200 disclosed herein as appropriate such as a single-fiber or multi-fiber port. Likewise, the connection ports 236 may be configured as a single-fiber port or multi-fiber port. For the sake of simplicity and clarity in the drawings, all of the optical fiber pathways may not be illustrated or portions of the optical fiber pathways may be removed in places so that other details of the design are visible.

Additionally, the multiports or shells 210 may comprise at least one support 210S or fiber guide for providing crush support for the multiport and resulting in a robust structure. As depicted in FIG. 8, multiport 200 may comprise a support 210S configured as a support insert that fits into shell 210. Support 210S has a bore therethrough and may act as a mounting feature for the use to a fastener to mount the multiport 200. Consequently, the support 210S carries the majority of any crushing forces that may be applied by the fastener and inhibits damage to the shell 210. Support 210S may also be located and attached to the shell at a location outside of the sealing interface between the first portion 210A and the second portion 210B of shell 210.

FIG. 7 also depicts a detailed sectional view of the interlocking features between the first portion 210A and the second portion 210B of the shell 210. Specifically, portions of the multiport may have a tongue 210T and groove 210G construction for alignment or sealing of the device.

Any of the multiports 200 disclosed herein may optionally be weatherproof by appropriately sealing seams of the shell 210 using any suitable means such as gaskets, O-rings, adhesive, sealant, welding, overmolding or the like. To this end, multiport 200 or devices may also comprise a sealing element 290 disposed between the first portion 210A and the second portion 210B of the shell 210. The sealing element 290 may cooperate with shell 210 geometry such as respective grooves 210G or tongues 210T in the shell 210. Grooves or tongue may extend about the perimeter of the shell 210.

By way of explanation, grooves 210G may receive one or more appropriately sized O-rings or gaskets 290A for weatherproofing multiport 200, but an adhesive or other material may be used in the groove 210G. By way of example, the O-rings are suitably sized for creating a seal between the portions of the shell 210. By way of example, suitable O-rings may be a compression O-ring for maintaining a weatherproof seal. Other embodiments may use an adhesive or suitable welding of the materials for sealing the device. If welding such as ultra-sonic or induction welding of the shell is used a special sealing element 290 may be used as known in the art. If the multiport 200 is intended for indoor applications, then the weatherproofing may not be required.

As shown in FIG. 8, multiport 200 comprises a single input optical fiber of the input connection port 260 is routed to a 1:4 splitter 275 and then each one of the individual optical fibers 250 from the splitter is routed to each of the respective rear connector 252 of the four connection ports 236 for optical connection and communication within the multiport. Input connection port 260 may be configured in any suitable configuration for the multiports disclosed as desired for the given application. Examples of input connection ports 260 include being configured as a single-fiber input connection, a multi-fiber input connector, a tether input that may be a stubbed cable or terminated with a connector or even one of the connection ports 236 may function as an pass-through connection port as desired.

By way of explanation for multi-fiber ports, two or more optical fibers 250 may be routed from one or more of the plurality of connection ports 236 of the multiport 200 disclosed herein. For instance, two optical fibers may be routed from each of the four connection ports 236 of multiport 200 toward the input connection port 260 with or without a splitter such as single-fiber input connection port 260 using a 1:8 splitter or by using an eight-fiber connection at the input connection port 260 for a 1:1 fiber distribution. To make identification of the connection ports or input connection port(s) easier for the user, a marking indicia may be used such as text or color-coding of the multiport, color codes on the actuator 310A, or marking the input tether (e.g. an orange or green polymer) or the like.

Figure 40A:
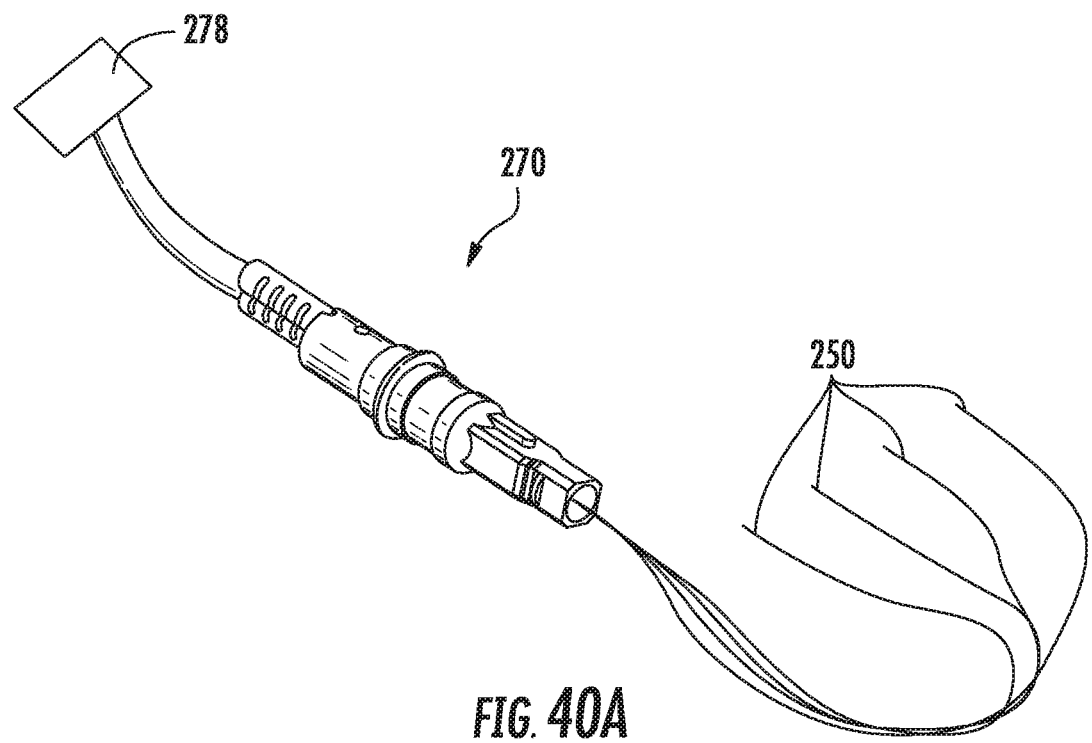
FIGS. 40A and 40B depict perspective views of a input tether and the input tether as part of the multiports disclosed.
Figure 40B:
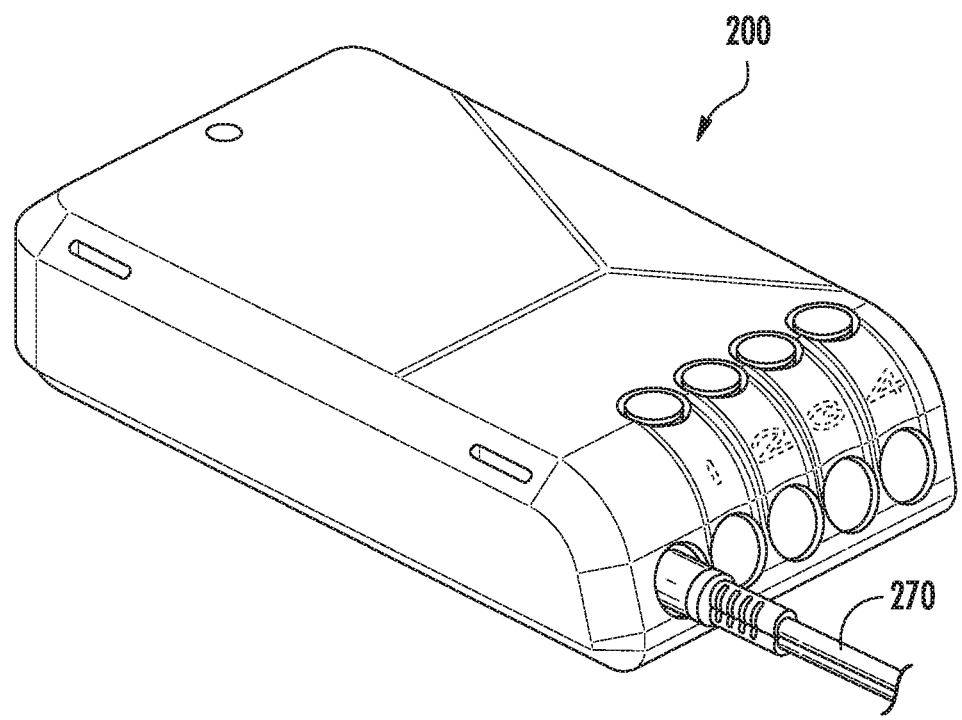

Other configurations are possible besides an input connection port 260 that receives a connector 10. Instead of using a input connection port that receives a connector 10, multiports 200 may be configured for receiving an input tether 270 attached to the multiport at the input connection port 260 such as represented in FIGS. 40A and 40B.

FIGS. 9-12 show modular adapter sub-assembly 310SA used in the multiport of FIGS. 3 and 4. Modular adapter sub-assemblies 310SA enable quick and easy assembly of multiports 200 in a scalable manner. Moreover, the modular sub-assemblies 230SA advantageously allow the mating components (i.e., the adapters 230A) corresponding to each connection port 236 to move or "float" independently of other the other modular adapter sub-assemblies 310SA relative to the shell 210 for preserving optical performance.

Figure 9:
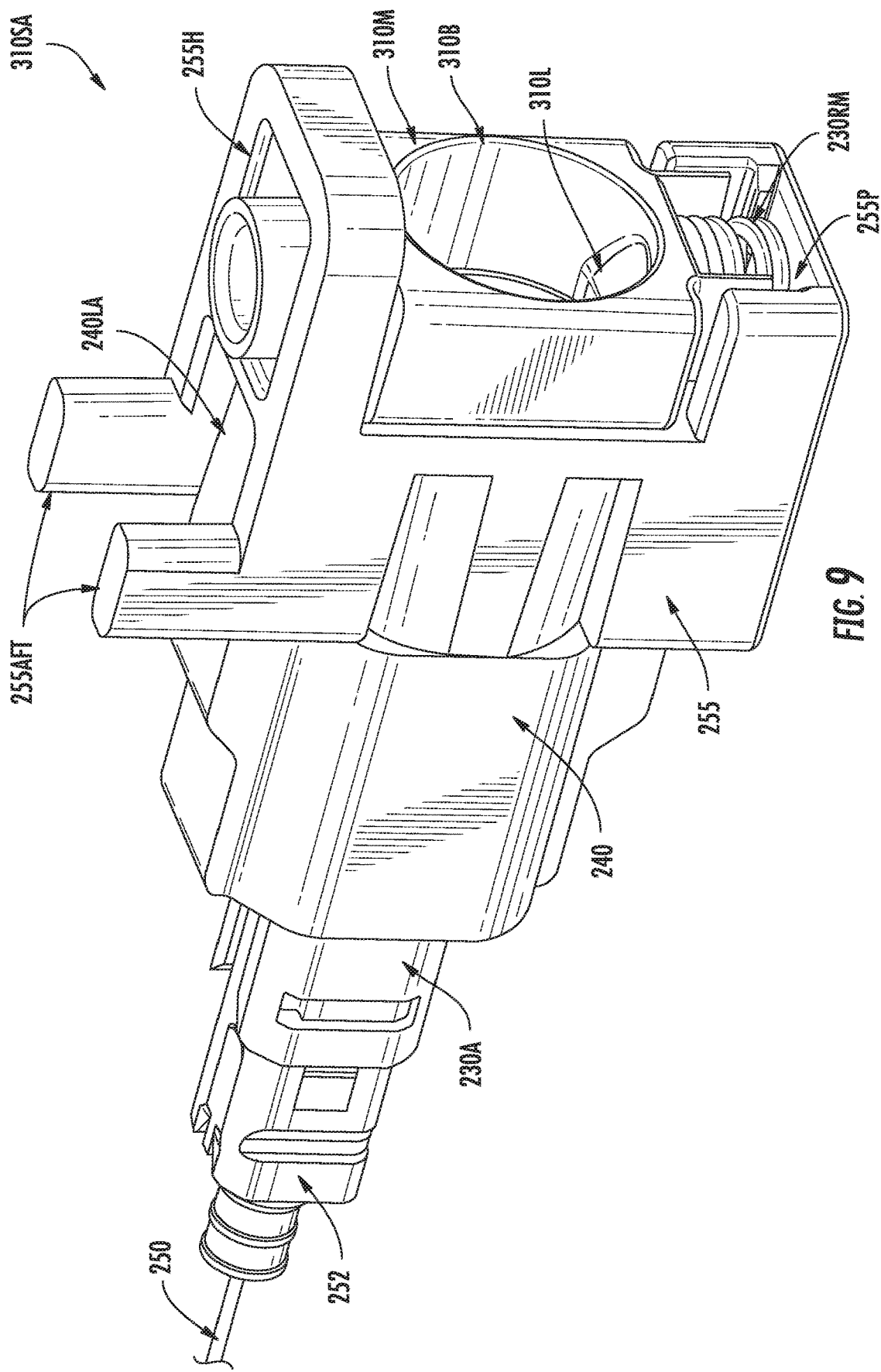
FIGS. 9 and 10 respectively are assembled front and rear perspective views of the modular adapter sub-assembly comprising an adapter and a portion of the securing feature for cooperation with one connection port of the device of FIGS. 3 and 4 with the rear connector attached.
Figure 10:
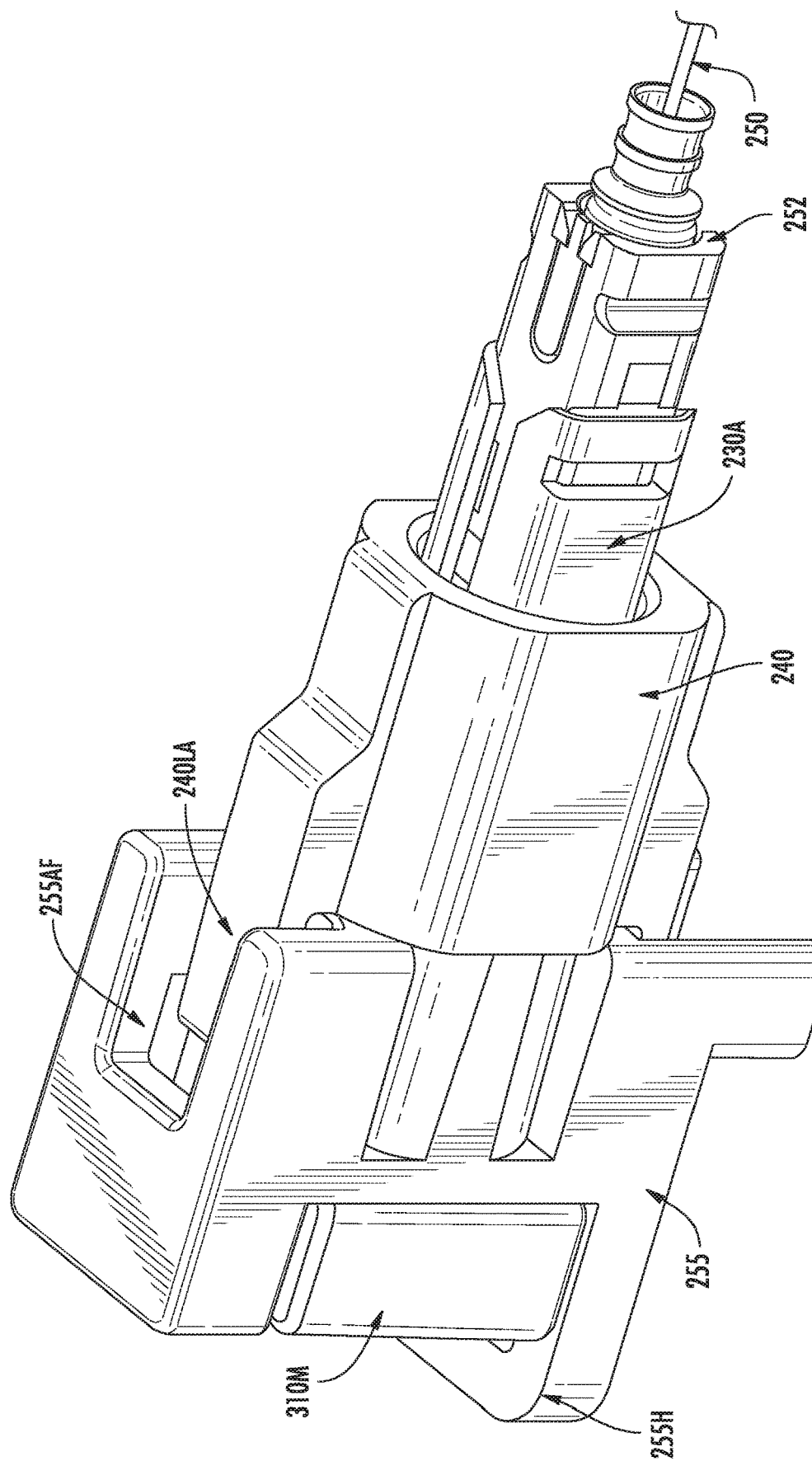
Figure 11:
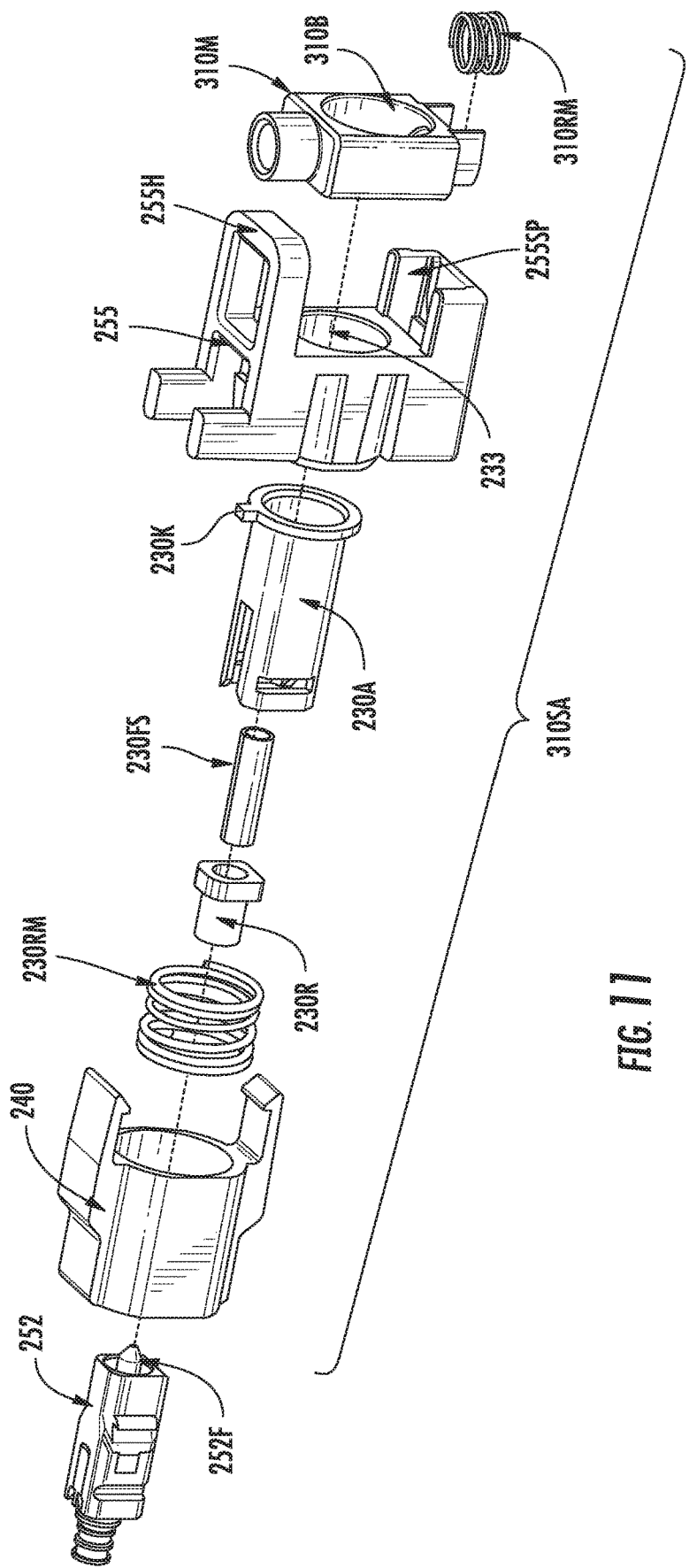
FIG. 11 is an exploded view of the modular adapter sub-assembly of FIGS. 9 and 10 along with the rear connector.
Figure 12:
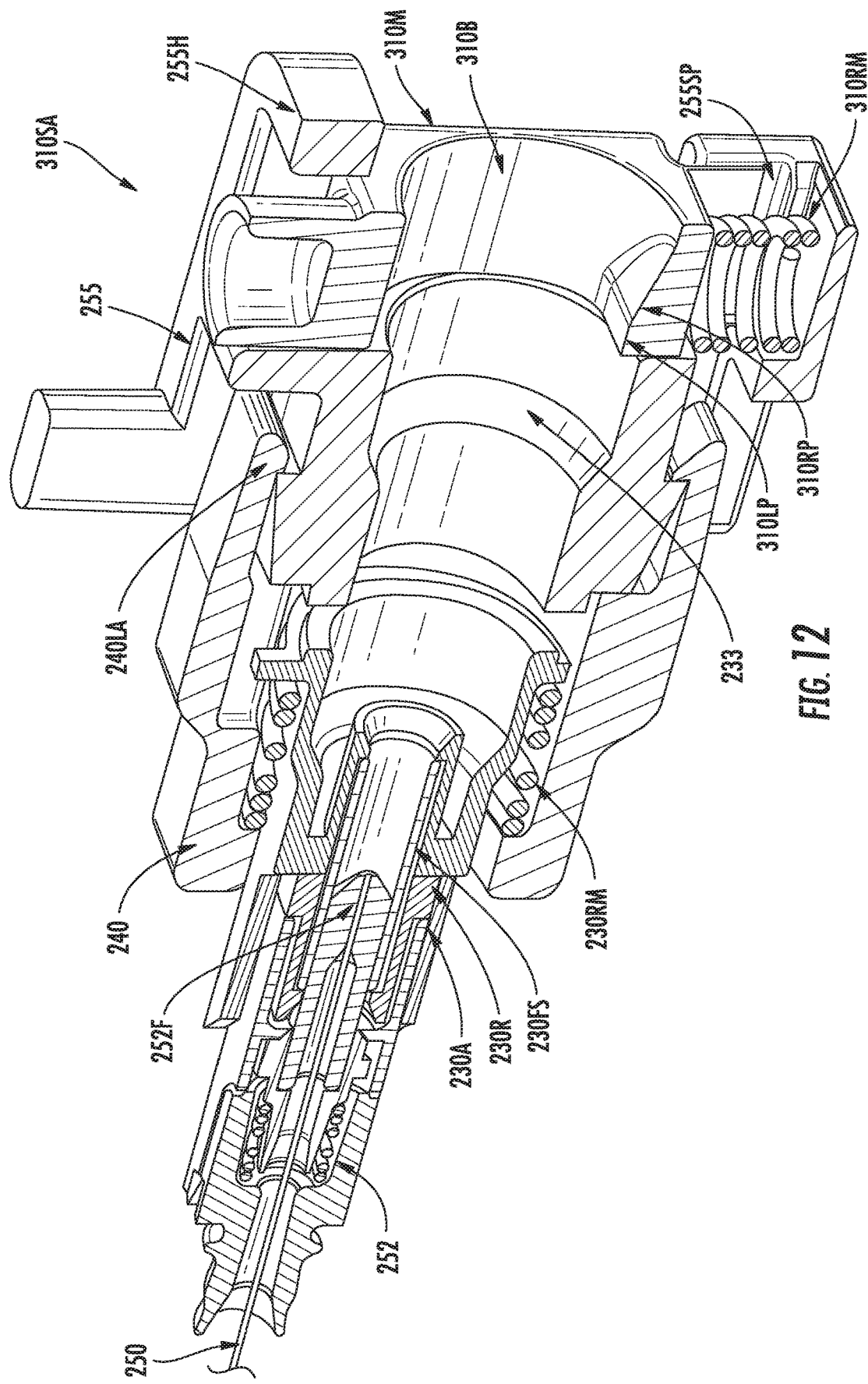
FIG. 12 is a longitudinal sectional view of the modular adapter sub-assembly of FIGS. 9 and 10 with the rear connector attached.
Figure 13:
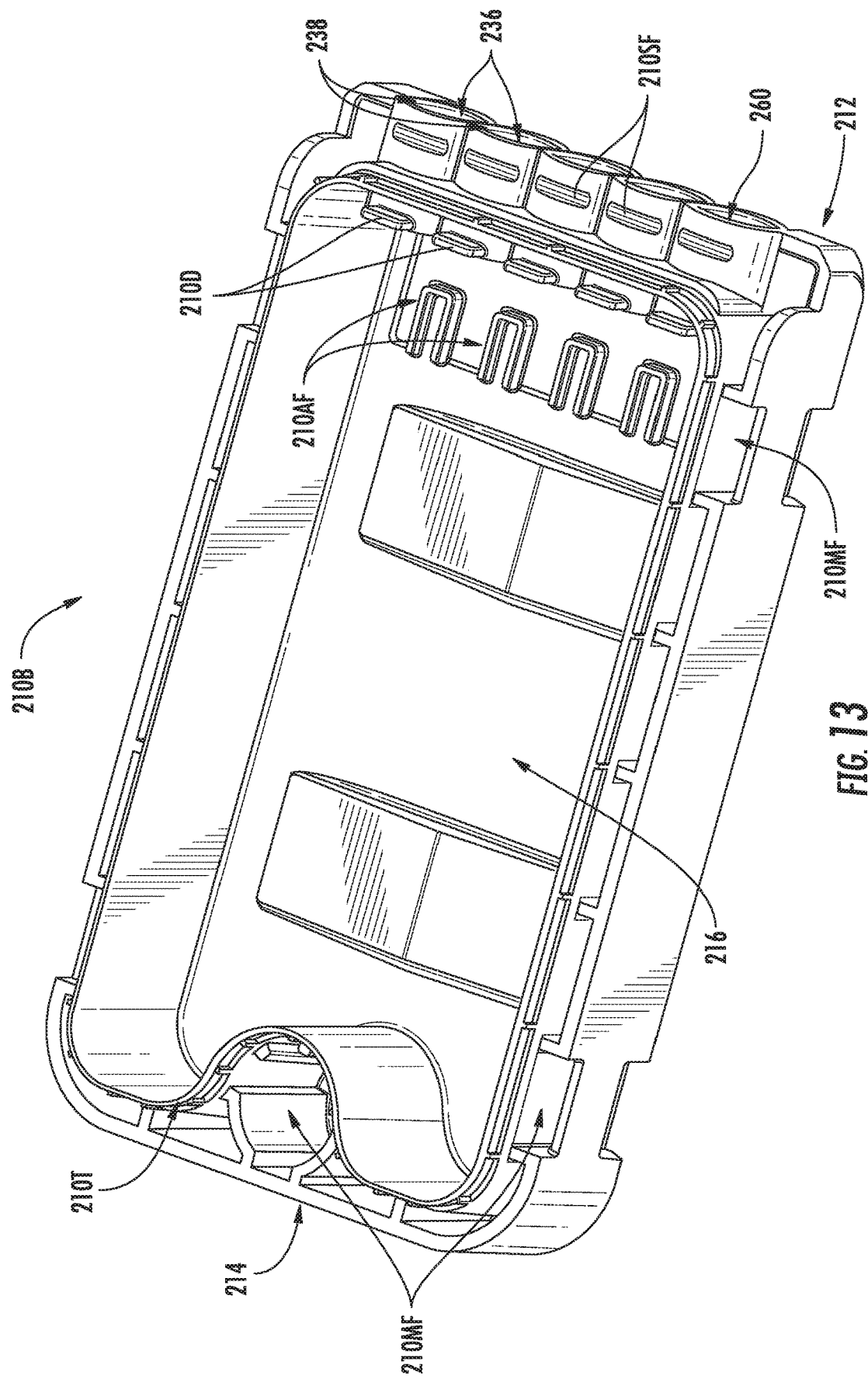
FIGS. 13 and 14 are top perspective views from different directions of a second portion of the shell of the multiport of FIGS. 3 and 4.
Figure 14:
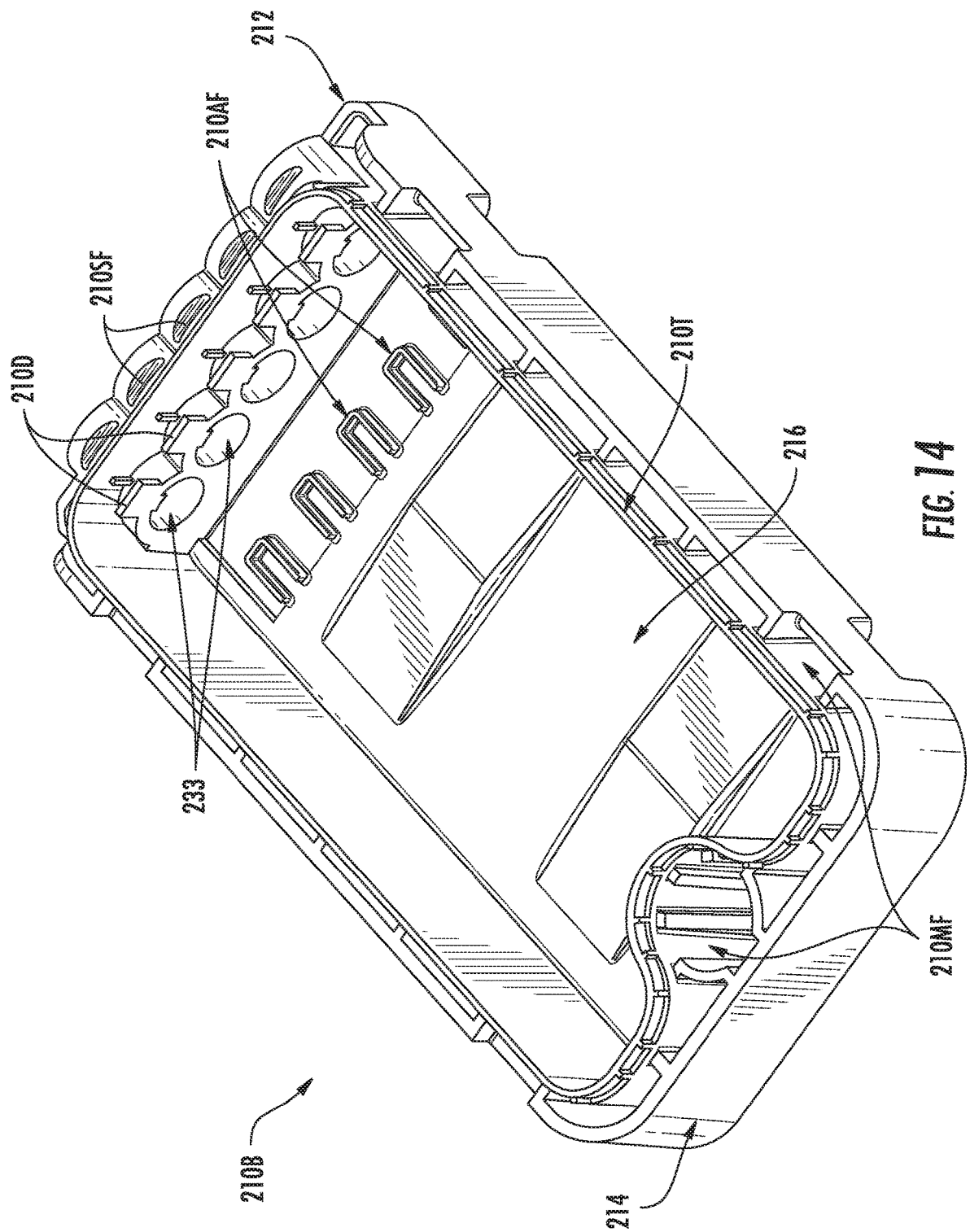

FIGS. 9 and 10 respectively show front and rear perspective views of modular adapter sub-assemblies 310SA with a rear connector 252 attached to the adapter 230A. FIG. 11 depicts an exploded view of the modular adapter sub-assemblies 310SA and shows that the rear connector 252 is not a portion of modular adapter sub-assembly 310SA, and FIG. 12 is a cross-sectional view of the modular adapter sub-assembly 310SA. Modular adapter sub-assemblies 310SA comprises an adapter 230A aligned with the at least one connection port 236 when assembled. Adapter 230 may be biased by a resilient member 230RM. The adapter (230A) may be secured to the adapter body 255 using retainer 240. FIGS. 21-32 show details of select components of the modular adapter sub-assembly 310SA.

As best shown in FIG. 11, modular adapter sub-assembly 310SA comprises a portion of securing feature 310 and a securing feature resilient member 310RM. Specifically, modular adapter sub-assembly 310SA comprises securing member 310M. However, other embodiments could comprise an actuator 310A or have a single securing feature 310 as part of the assembly. Securing member 310M is inserted into a front end of an adapter body 255 along with securing feature resilient member 310RM. Specifically, the rim 310R of securing member 310M is inserted into a hoop 255H of adapter body 255 and standoffs 310SO are disposed in a portion of the resilient member pocket 255SP at the bottom of the adapter body 255. Securing feature resilient member 310RM is disposed in the resilient member pocket 255SP for biasing the securing member 310M to a retain position as shown in FIG. 12. This construction advantageously keeps the assembly intact using the securing feature resilient member 310RM. Standoffs 310SO of adapter body 255 may also act as stops to limit the translation of the securing member 310.

In this embodiment, modular adapter sub-assembly 310SA may comprises an adapter body 255, securing member 310M, securing feature resilient member 310RM, a ferrule sleeve 230FS, a ferrule sleeve retainer 230R, resilient member 230RM, a retainer along with the adapter 230A. Adapter body 255 has a portion of the connection port passageway 233 disposed therein.

As best depicted in FIGS. 11 and 12, the is resilient member 230RM is disposed over a barrel of adapter 230A and seated on the flange of adapter 230A as depicted, then retainer 240 can be attached to adapter body 255 using latch arms 240LA to secure the same. Ferrule sleeve retainer 230R and ferrule sleeve 230FS are aligned for assembly into the adapter 230A for assembly as shown in FIG. 11 and seated using the ferrule sleeve retainer 230R. Of course, other variations of the modular adapter sub-assembly 310SA are possible.

FIGS. 13-16 depict detailed views of the second portion 210B of shell 210 with the internal components removed for showing the internal construction of the multiport 200 of FIGS. 3 and 4. Shells 210 may have any suitable shape, design or configuration as desired. Second portion 210B cooperates with first portion 210A to form shell 210. Second portion 210B comprises a plurality of connection ports 236 and input connection port 260. Second portion 210B provides a portion of cavity 216 of multiport 200, and the internal bottom surface of second portion 210B comprises a plurality of alignment features 210AF for aligning the modular adapter sub-assembly 310SA with the respective connection ports 236. Alignment features 210AF have a U-shape and cooperate with the alignment features 255AF on the bottom of adapter body 255. Second portion 210B also includes a plurality of studs 210D on top of the respective connection ports 236 within cavity 216 for seating the hoop 255H of the adapter body 255 for assembly. Second portion 210B may also include a plurality of guide features 210SF for aligning the first portion 210A with the second portion 210B of the shell 210.

FIG. 15 is a front perspective view of second portion 210B showing other features. As shown, the keying portion 233KP is an additive keying portion to the primitive geometric round shape of the connection port passageway 233 such as a male key that is disposed forward of the securing feature in the connection port passageway 233. However, the concepts for the connection ports 236 of devices may be modified for different connector designs. For instance, the keying portion 233KP may be defined as a walled-portion across part of the connection port passageway 233 as represented by the dashed line 233KP' shown in one of the connection ports 236. Thus, the connection port with keying portion 233KP' would be able to properly receive an external fiber optic connector having a portion with a proper D-shaped portion.

FIG. 15 also depicts alignment protrusions 210AP on the front end 212 of second portion 210B of shell 210. Alignment protrusions 210AP cooperate with mounting tab 298 for aligning and attaching the same to the shell 210 of the multiport 200. In other embodiments, the mounting tab could be integrally formed with the shell 210, but that requires a more complex molding process.

Figure 17:
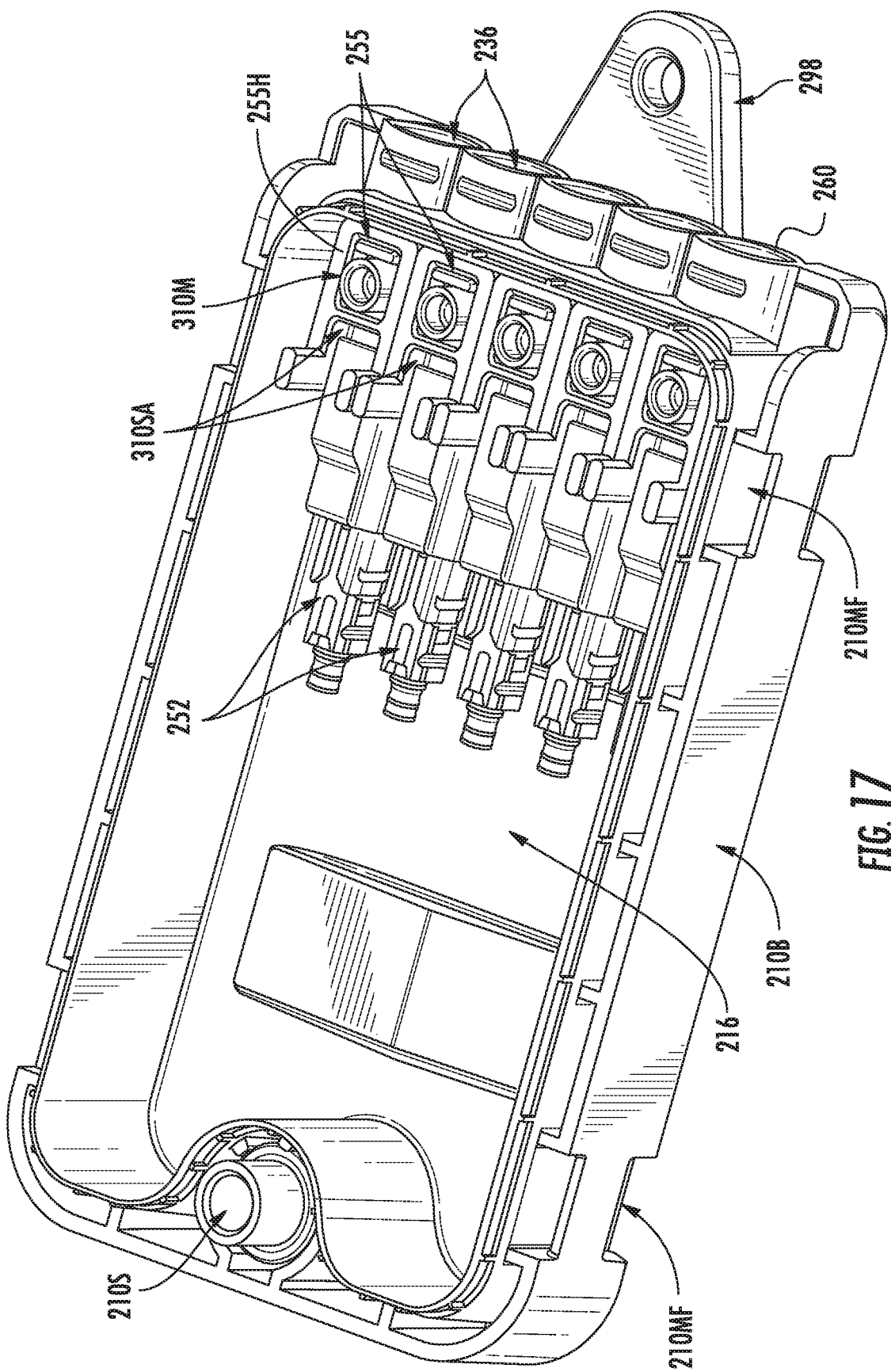
FIG. 17 is a top perspective view of the modular adapter sub-assemblies loaded into the second portion of the shell with the optical fibers removed for clarity.

FIG. 17 depicts the assembly of modular sub-assemblies 310SA into the second portion 210B of shell 200. As shown, modular adapter sub-assemblies 310AS are aligned and installed onto the U-shaped alignment features 210AF of the second portion 210B of shell 210 as discussed. FIG. 26 shows a representation of the alignment features 210AF of the second portion 210B of shell 210 cooperating with the alignment features 255AF on the bottom of adapter body 255 in another embodiment. FIG. 17 also shows the hoops 255H of the adapter bodies 255 disposed about the plurality of studs 210D on top of the respective connection ports 236 within cavity 216 for aligning the modular adapter sub-assembly 310SA within the second portion 210B of shell 210 for aligning the connection port passageway 233 of the adapter body 255 with the connection port passageway 233 of the shell 210. FIG. 17 also shows the support 210S placed into the respective bore of the second portion 210B of the shell. As depicted, support 210S is located outside of the sealing interface of the second portion 210B of shell 210.

Figure 18:
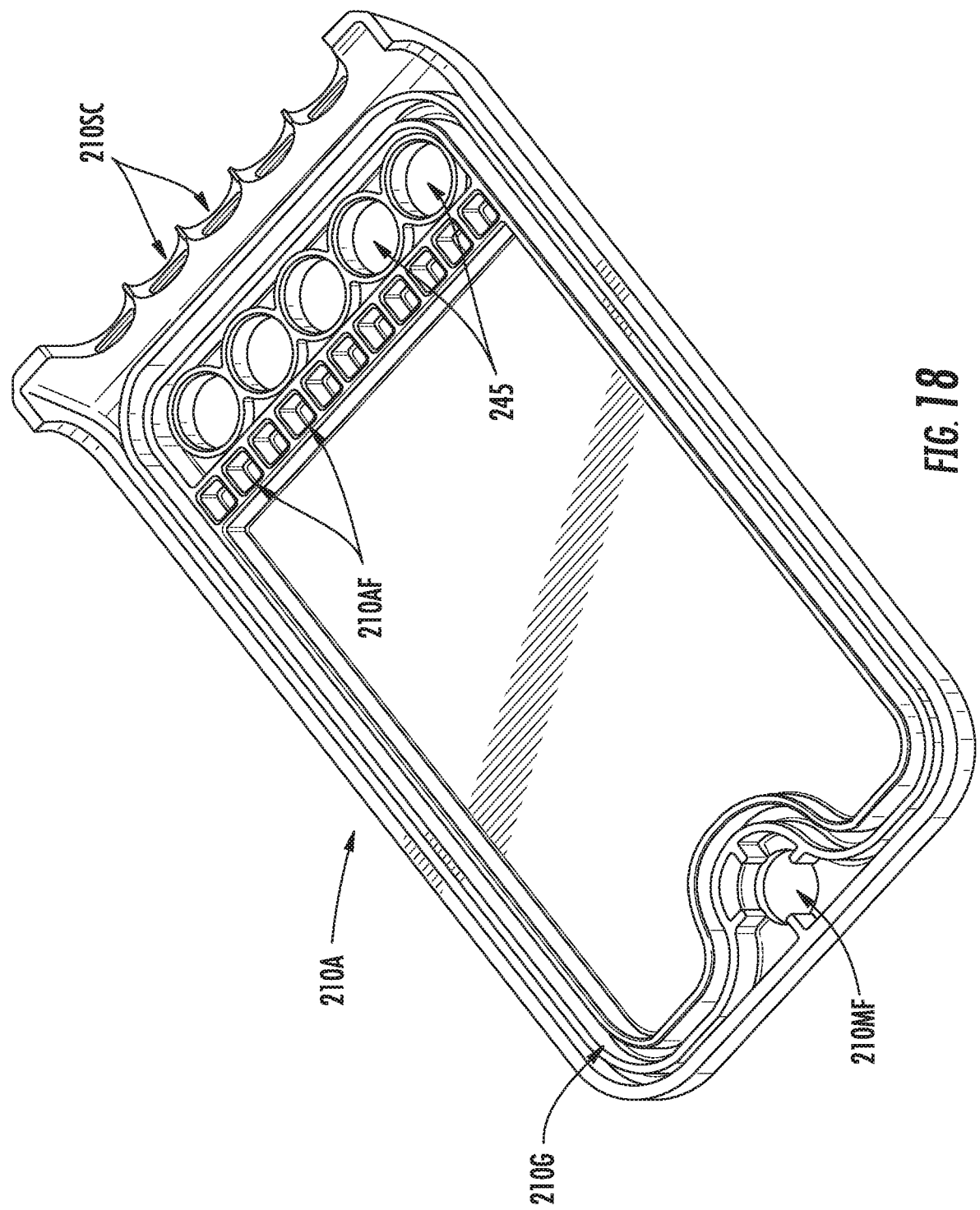
FIG. 18 is an inside perspective view of the first portion of the shell.

FIG. 18 depicts an inside surface of the first portion 210A of shell 200. As shown, first portion 210A comprises a profile that conforms to the profile of the second portion 210B of shell 210. By way of explanation, first portion 210A comprises a plurality of scallops 210SC for cooperating with the connection ports 236 on the second portion 210B of shell 210. First portion 210A also comprise a sealing perimeter that cooperates with the sealing perimeter of the second portion 210B of shell 210. First portion 210A also comprises alignment features 210AF sized and shaped for cooperating with the alignment features 255AFT on the top of adapter body 255 for securing the same when the multiport is assembled. The respective alignment features 210AF,255AF only allow assembly of the modular adapter sub-assemblies 310AS into the shell 210 in one orientation for the correct orientation of the locking feature 310L with respect to the connection port 236.

Multiport may include a fiber tray or fiber guide/supports that are discrete components that may attach to the shell 210; however, fiber guides may be integrated with the shell if desired. Shell may also 210 comprise one or more fiber guides for organizing and routing optical fibers 250. The fiber tray inhibits damage to optical fibers and may also provide a location for the mounting of other components such as splitters, electronics or the like if desired. Fiber guides may also act as support 210S for providing crush strength to the shell 210 if they have a suitable length.

Figure 19:
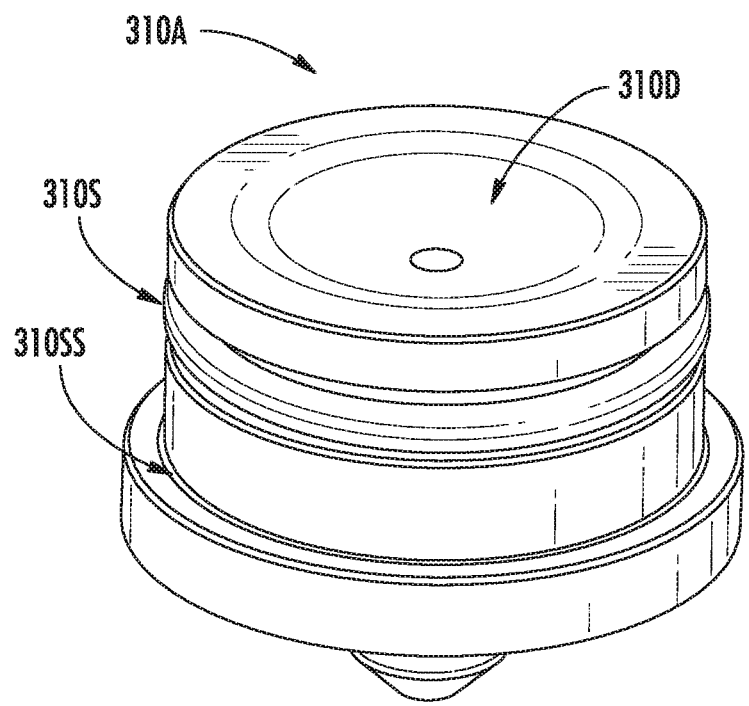
FIGS. 19 and 20 depict perspective views showing the details of the actuator of the securing feature of the multiport of FIGS. 3 and 4 that cooperates with the securing member of FIGS. 21-23.
Figure 20:
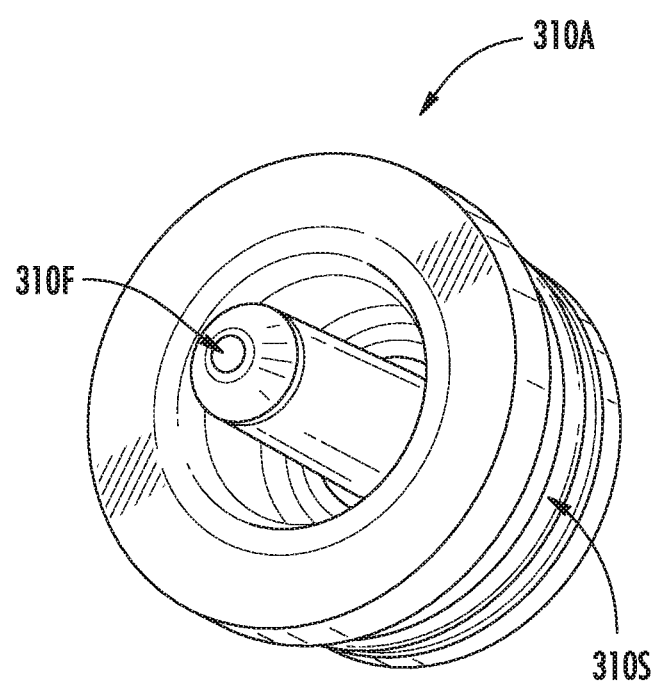

FIGS. 19 and 20 show detailed perspective view of actuator 310A. Actuator 310A may include a sealing member 310S for keeping dirt, debris and the like out of portions of the multiport 200. Sealing member 310S is sized for the retention groove 310RG in the securing feature 310 and the securing feature passageway 245 for sealing. Actuator 310A may also comprise a stop surface 310SS for inhibiting overtravel of the securing feature 310 of inhibit the actuator from being removed from the multiport 200 when assembled. In this embodiment, the stop surface 310SS. Actuator 310A may also include a dimple 310D or other feature for inhibiting inadvertent activation/translation of the securing feature 310 or allowing a tactical feel for the user. Actuator 310A comprises a finger 310F for seating within a rim 310R of securing member 310M for transferring forces to the same.

Actuator 310A may also be a different color or have a marking indicia for identifying the port type. For instance, the actuator 310A may be colored red for connection ports 236 and the actuator 310A for the input connection port 260 may be colored black. Other color or marking indicia schemes may be used for pass-through ports, multi-fiber ports or ports for split signals.

Figure 23:
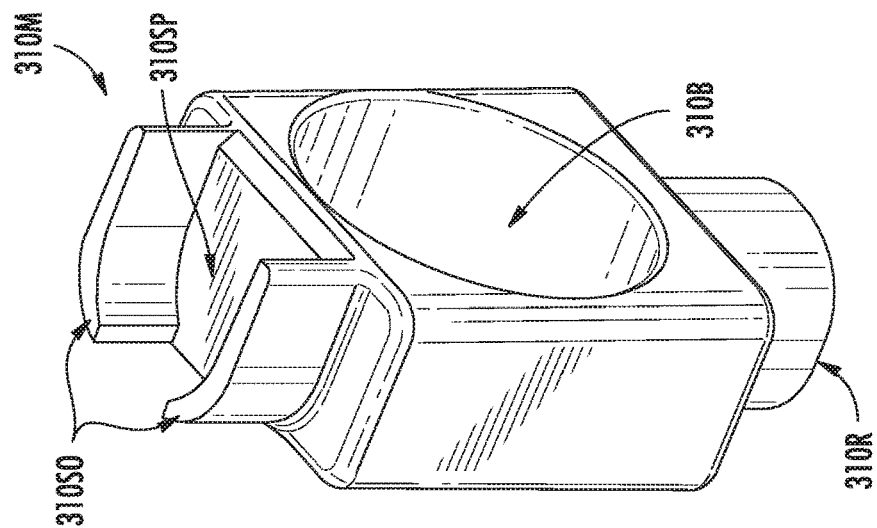
FIGS. 21-23 are various perspective views showing the details of the securing member of the securing feature of the multiport of FIGS. 3 and 4 that cooperates with the actuator of FIGS. 19 and 20.
Figure 22:
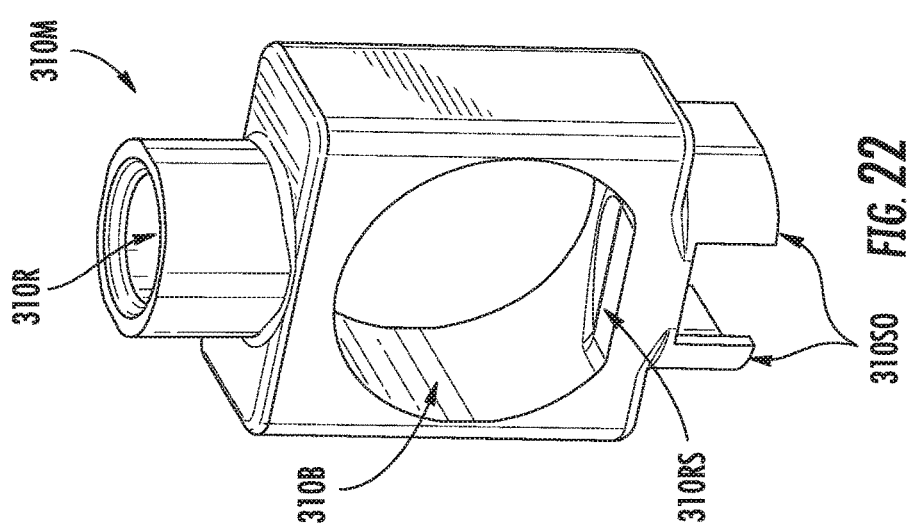
Figure 21:
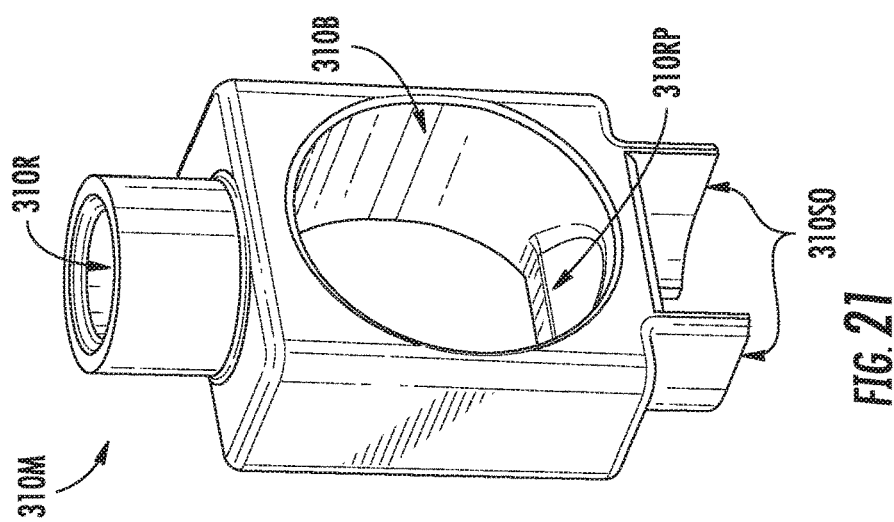

FIGS. 21-32 show details of select components of the modular adapter sub-assembly 310SA. FIGS. 21-23 show various perspective detailed views of securing member 310M. Securing member 310M comprises a locking feature 310L. Locking feature 310L is configured for engaging with a suitable locking portion 20L on the housing 20 of connector 10. In this embodiment, securing feature 310 comprise a bore 310B that is respectively aligned with the respective connector port passageway 233 as shown in FIG. 8 when assembled. The bore 310B is sized for receiving a portion of connector 10 therethrough as shown in FIG. 39.

As depicted in this embodiment, locking feature 310L is disposed within bore 310B of securing member 310M. As shown, locking feature 310L is configured as ramp 310RP that runs to a short flat portion, then to a ledge for creating the retention surface 310RS for engaging and retaining the connector 10 once it is fully-inserted into the connector port passageway 233 of the connection port 236. Consequently, the securing feature 310 is capable of moving to an open position (OP) when inserting a suitable connector 10 into the connector port passageway 233 since the connector housing 20 engages the ramp 310RP pushing the securing feature downward during insertion.

Securing member 310M may also comprises standoffs 310 as best shown in FIG. 23. Standoffs 310 cooperate with the resilient member pocket 255SP of the adapter body 255 for keeping the bore 310B in the proper rotational orientation within the respective to the adapter body 255. Specifically, standoffs 310 have curved shapes that only allow the securing member 310M to fully-seat into the adapter body 255 when oriented in the proper orientation.

FIG. 24-27 are various perspective views showing the details of the adapter body 255 of the modular adapter sub-assembly 310SA. Adapter body 255 comprises an adapter body bore 255B that comprises a portion of the connection port passageway 233 when assembled. As discussed, adapter body 255 comprises alignment features 255AF on the bottom of adapter body 255 that cooperate with the shell 210 to align and seat the same in the shell 210. Adapter body 255 also comprises hoop 255H. Hoop 255H captures the ring 255R at the top of the securing member 310M when assembled, and also seats the adapter body 255 in the second portion 210B of shell 210 during assembly. Adapter body 255 also comprises alignment features 255AFT on the top of adapter body 255 for securing the same in the first portion 210A of the shell 210 when the multiport 200 is assembled. Adapter body 255 also comprise resilient member pocket 255SP at the bottom of the adapter body 255 for capturing the securing feature resilient member 310RM as depicted in FIG. 12.

Figure 28:
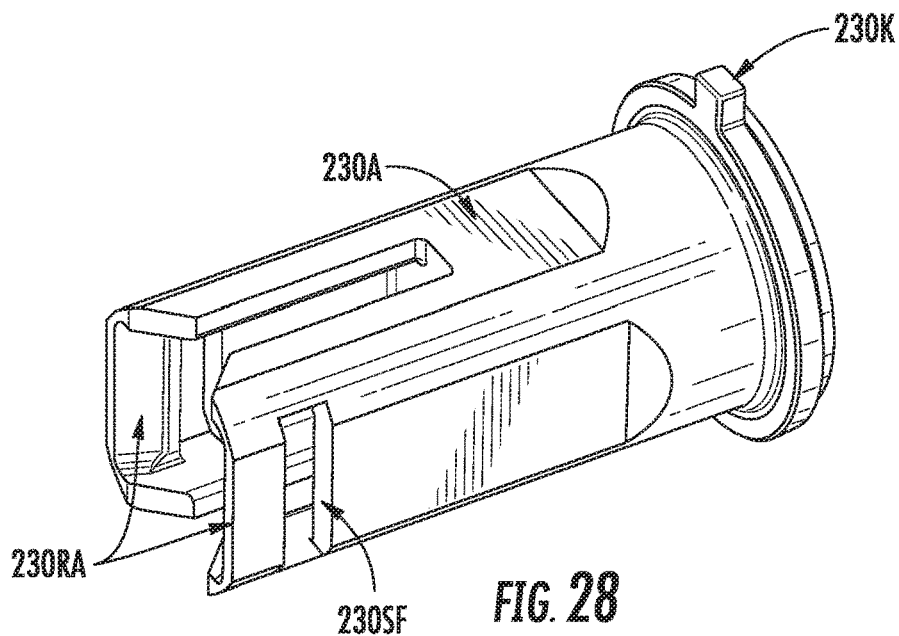
FIGS. 28 and 29 are perspective views of the adapter of the modular adapter sub-assembly of FIGS. 9-12.
Figure 29:
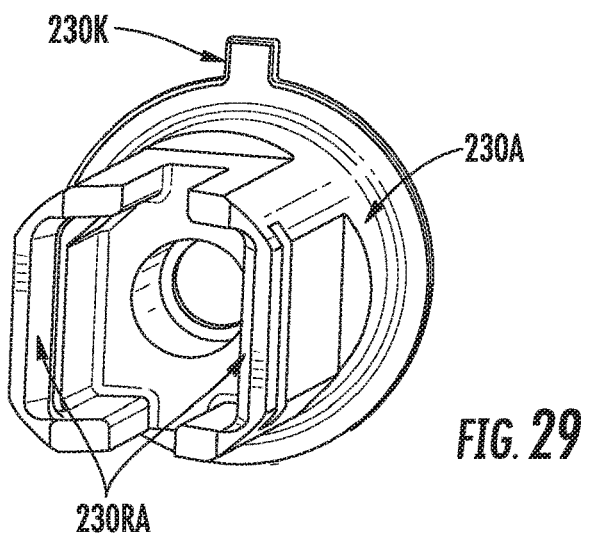
Figure 30:
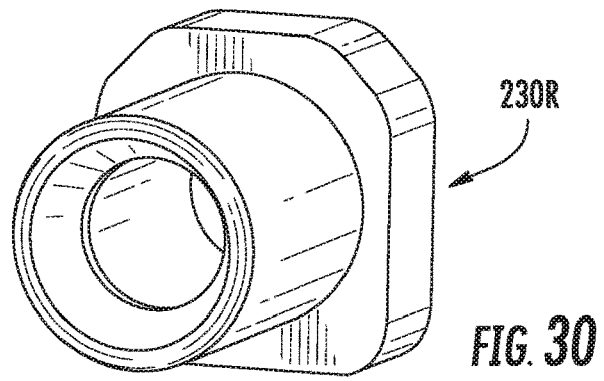
FIG. 30 is perspective view of the retainer of the modular adapter sub-assembly of FIGS. 9-12.
Figure 31:
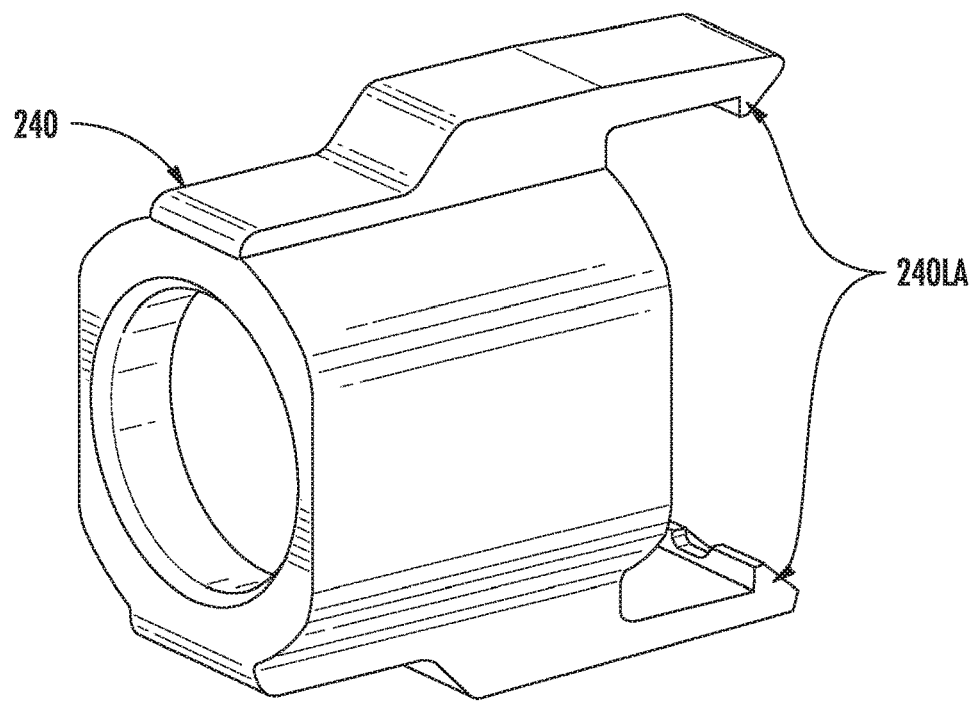
FIGS. 31 and 32 are perspective views of a keeper of the modular adapter sub-assembly of FIGS. 9-12.
Figure 32:
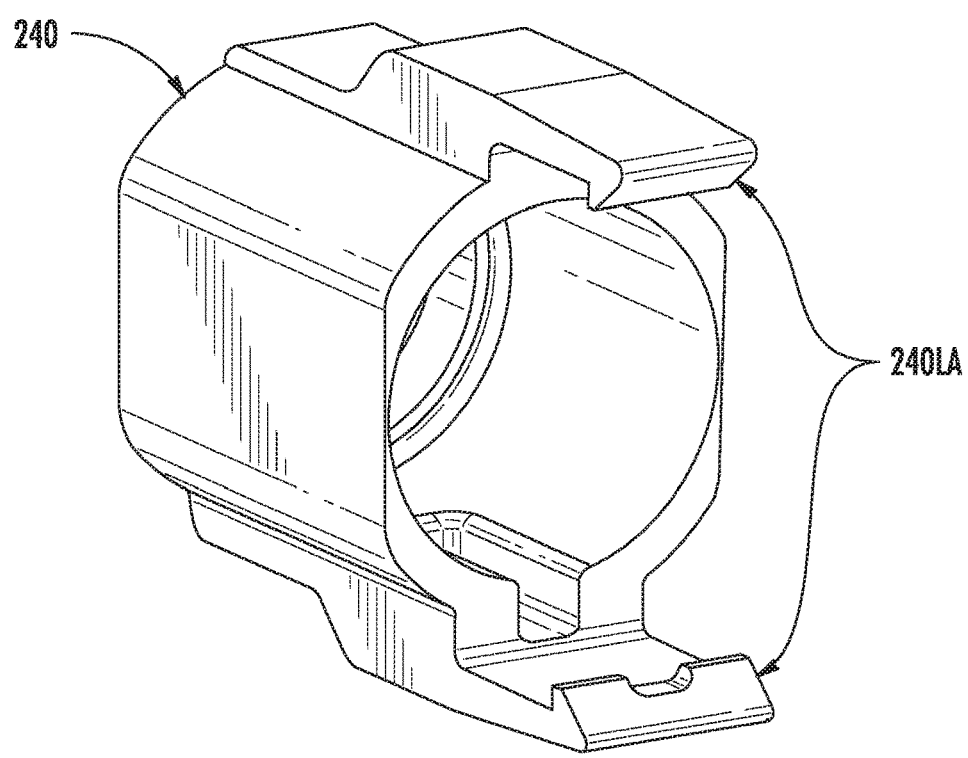

FIGS. 28 and 29 depict detailed views of adapter 230A. Adapter 230A comprises a plurality of resilient arms 230RA comprising securing features (not numbered). Adapter 230A also comprises an adapter key 230K for orientating the adapter 230A with the adapter body 255. Securing features 230SF cooperate with protrusions on the housing of rear connector 252 for retaining the rear connector 252 to the adapter 230A. The ferrule 252F is disposed within the ferrule sleeve 230FS when assembled. FIG. 12 is a sectional view showing the attachment of the rear connector 252 with the adapter 230A with ferrule sleeve retainer 230R and the ferrule sleeve 230FS therebetween. Ferrule sleeves 230FS are used for precision alignment of mating ferrules between rear connectors 252 and connector 10. Devices may use alternative rear connectors if desired and can have different structures for supporting different rear connectors. FIG. 30 depicts details of the ferrule sleeve retainer 230R FIGS. 31 and 32 show detailed views of retainer 240 that forms a portion of the modular sub-assembly 310SA. Retainer 240 comprises one or more latch arms 240LA for cooperating with the adapter body 255 for securing the adapter 230A and resilient member 230RM of the modular adapter sub-assembly 310SA.

The concepts disclosed allow relatively small multiports 200 having a relatively high-density of connections along with an organized arrangement for connectors 10 attached to the multiports 200. Shells have a given height H, width W and length L that define a volume for the multiport as depicted in FIG. 3. By way of example, shells 210 of multiport 200 may define a volume of 800 cubic centimeters or less, other embodiments of shells 210 may define the volume of 400 cubic centimeters or less, other embodiments of shells 210 may define the volume of 100 cubic centimeters or less as desired. Some embodiments of multiports 200 comprise a connection port insert 230 having a port width density of at least one connection port 236 per 20 millimeters of width W of the multiport 200. Other port width densities are possible such as 15 millimeters of width W of the multiport. Likewise, embodiments of multiports 200 may comprise a given density per volume of the shell 210 as desired.

Figure 2:
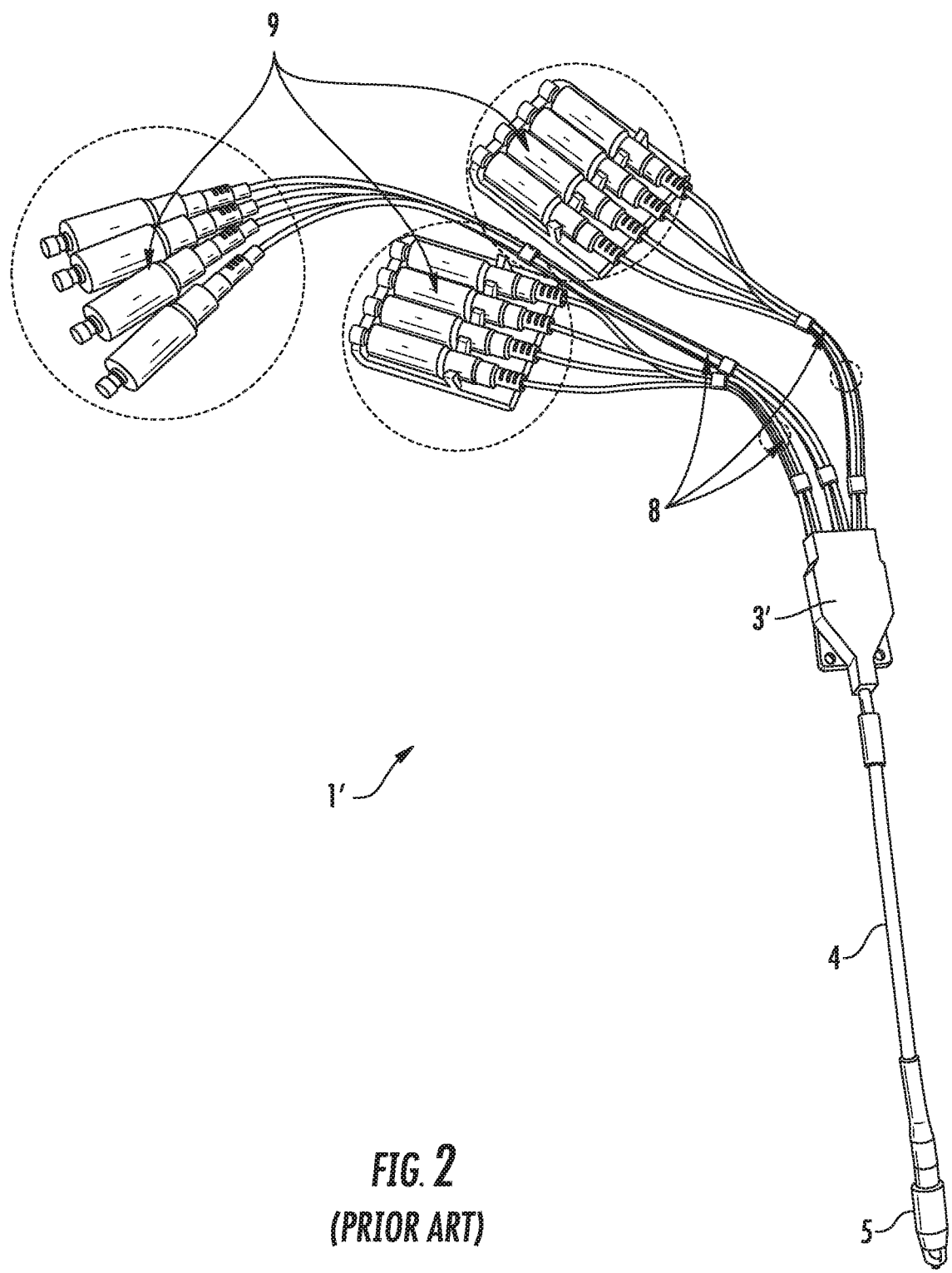

The concepts disclosed allow relatively small form-factors for multiports as shown in Table 1. Table 1 below compares representative dimensions, volumes, and normalized volume ratios with respect to the prior art of the shells (i.e., the housings) for multiports having 4, 8 and 12 ports as examples of how compact the multiports of the present application are with respect to convention prior art multiports. Specifically, Table 1 compares examples of the conventional prior art multiports such as depicted in FIG. 1 with multiports having a linear array of ports. As depicted, the respective volumes of the conventional prior art multiports of FIG. 1 with the same port count are on the order of ten times larger than multiports with the same port count as disclosed herein. By way of example and not limitation, the multiport may define a volume of 400 cubic centimeters or less for 12-ports, or even if double the size could define a volume of 800 cubic centimeters or less for 12-ports. Multiports with smaller port counts such as 4-ports could be even smaller such as the shell or multiport defining a volume of 200 cubic centimeters or less for 4-ports, or even if double the size could define a volume of 200 cubic centimeters or less for 4-ports. Devices with sizes that are different will have different volumes form the explanatory examples in Table 1 and these other variations are within the scope of the disclosure. Consequently, it is apparent the size (e.g., volume) of multiports of the present application are much smaller than the conventional prior art multiports of FIG. 1. In addition to being significantly smaller, the multiports of the present application do not have the issues of the conventional prior art multiports depicted in FIG. 2. Of course, the examples of Table 1 are for comparison purposes and other sizes and variations of multiports may use the concepts disclosed herein as desired.

One of the reasons that the size of the multiports may be reduced in size with the concepts disclosed herein is that the connectors that cooperate with the multiports have locking features that are integrated into the housing 20 of the connectors 10. In other words, the locking features for securing connector are integrally formed in the housing of the connector, instead of being a distinct and separate component like a coupling nut of a conventional hardened connector used with conventional multiports. Conventional connectors for multiports have threaded connections that require finger access for connection and disconnecting. By eliminating the threaded coupling nut (which is a separate component that must rotate about the connector) the spacing between conventional connectors may be reduced. Also eliminating the dedicated coupling nut from the conventional connectors also allows the footprint of the connectors to be smaller, which also aids in reducing the size of the multiports disclosed herein.

TABLE 1

Comparison of Conventional Multiport of FIG. 1 with Multiports of Present Application

| Multiport Type | Port Count | Dimension L × W × H (mm) | Volume ($cm^3$) | Normalized Volume Ratio |
|---|---|---|---|---|
| Prior Art FIG. 1 | 4 | 274 × 66 × 73 | 1320 | 1.0 |
| | 8 | 312 × 76 × 86 | 2039 | 1.0 |
| | 12 | 381 × 101 × 147 | 5657 | 1.0 |
| Linear | 4 | 76 × 59 × 30 | 134 | 0.10 |
| | 8 | 123 × 109 × 30 | 402 | 0.20 |
| | 12 | 159 × 159 × 30 | 758 | 0.14 |

Multiport or Devices may have other constructions using the concepts disclosed. FIGS. 33-47 depict views of another explanatory device 200 configured as a multiport that comprises at least one connection port 236 along with a securing feature 310 associated with the connection port 236 that is similar to the multiport 200 of FIGS. 3 and 4.

Figure 33:
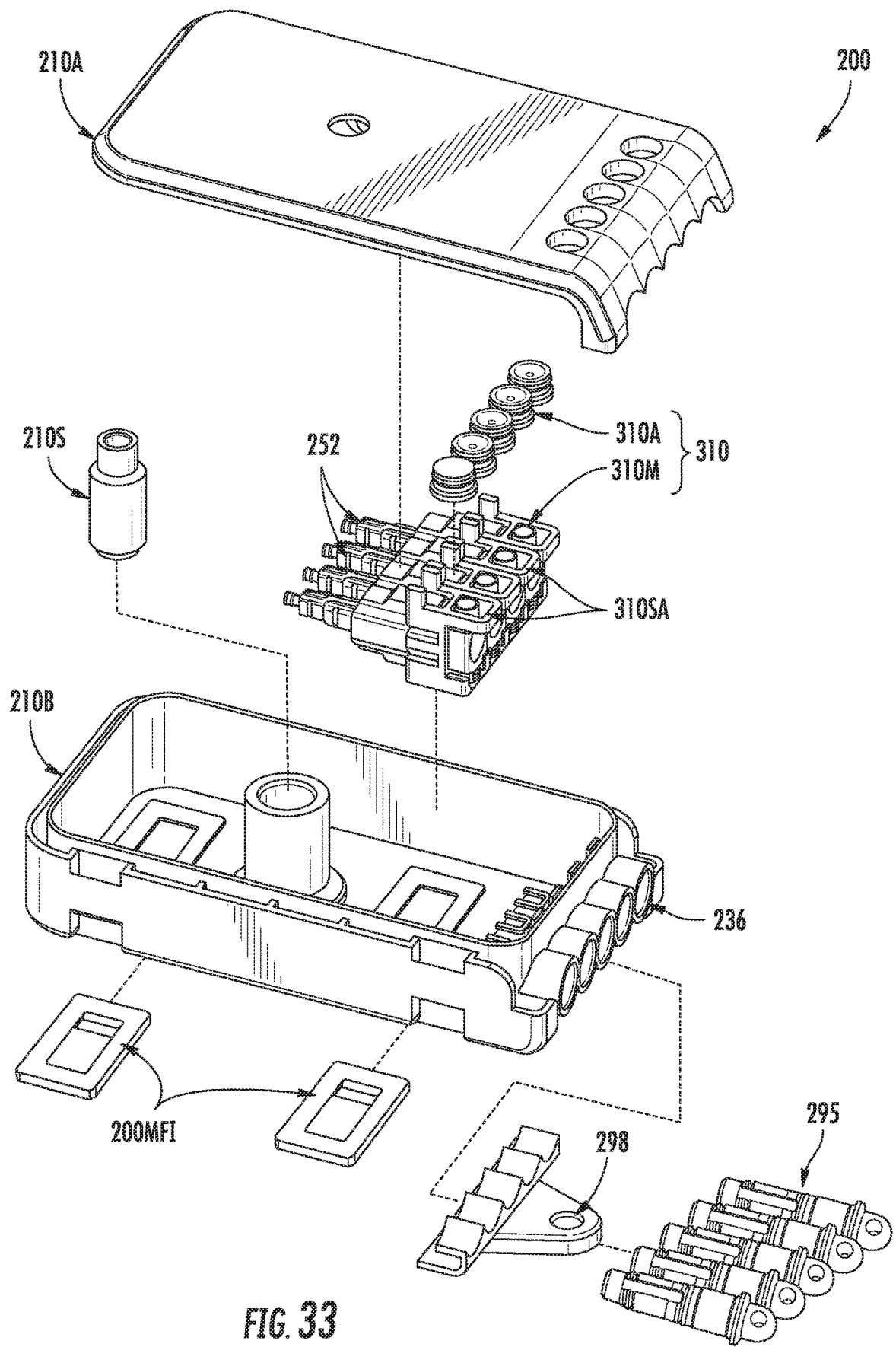
FIG. 33 is a partially exploded view of another explanatory multiport with the optical fibers removed for clarity that is similar to the multiport of FIGS. 3 and 4.
Figure 34:
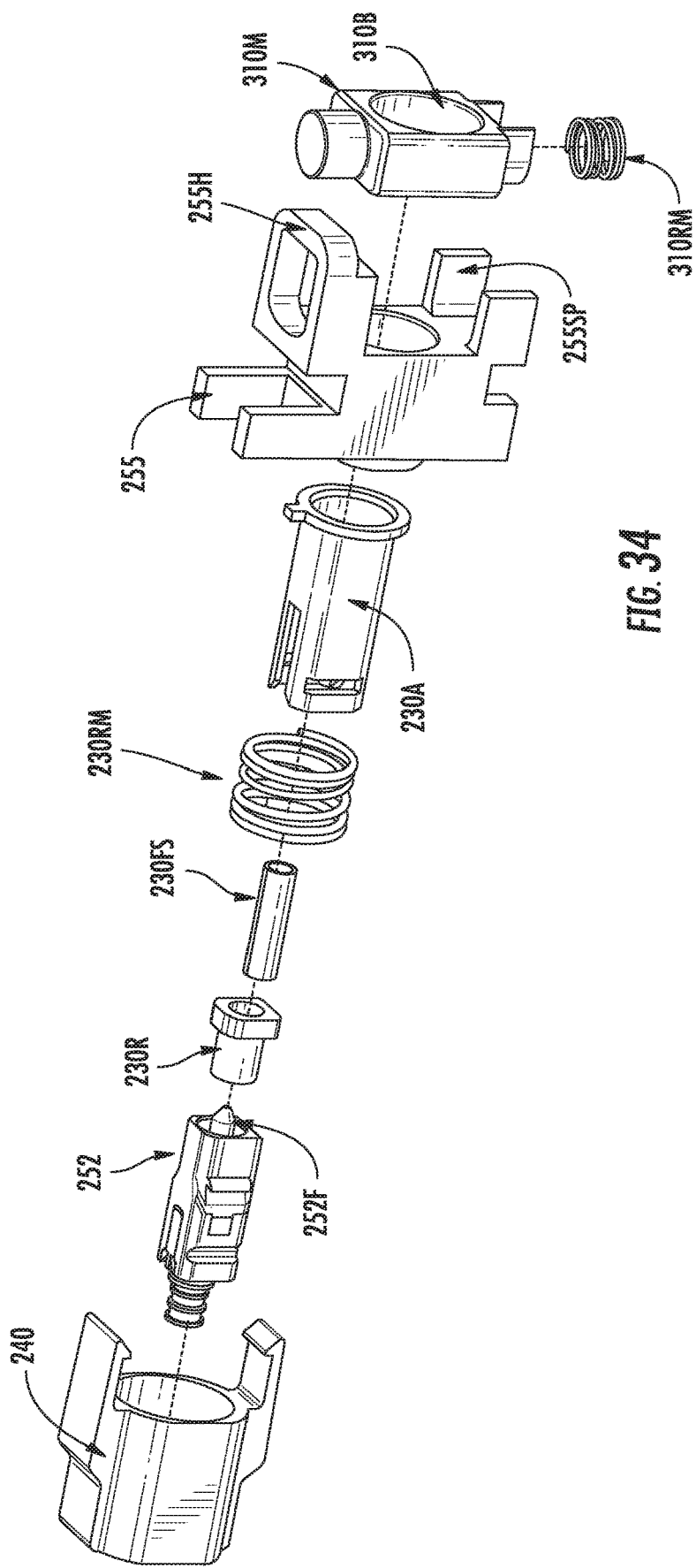
FIG. 34 is an exploded view of the modular adapter sub-assembly of the multiport of FIG. 33.
Figure 35:
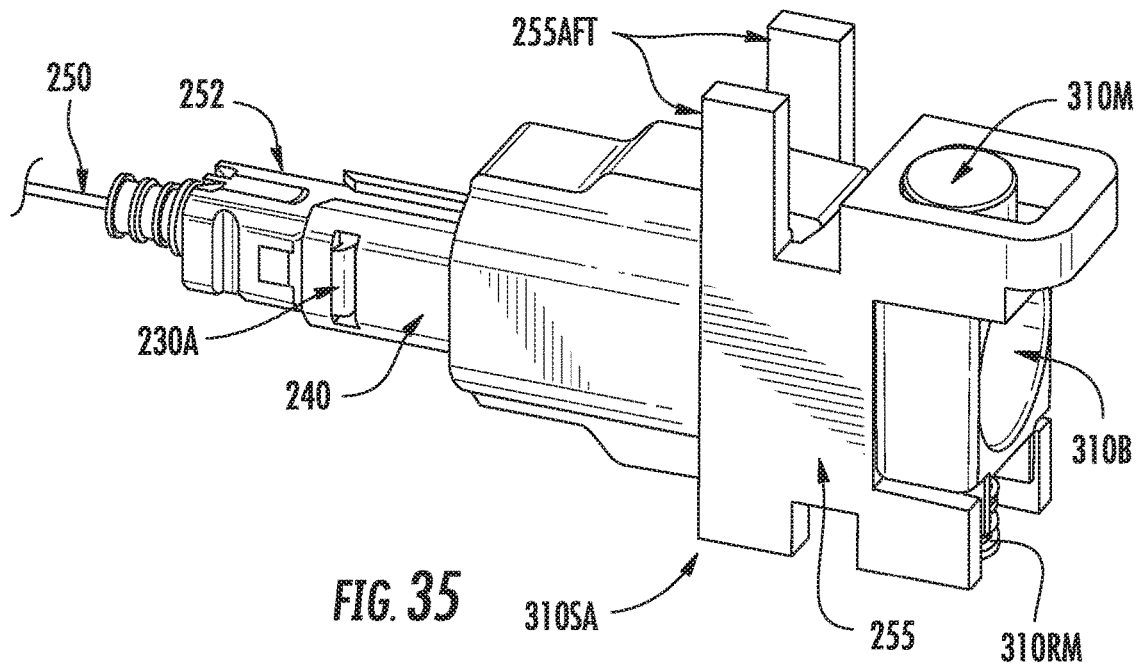
FIG. 35 is a perspective view of the modular adapter sub-assembly of FIG. 34.
Figure 36:
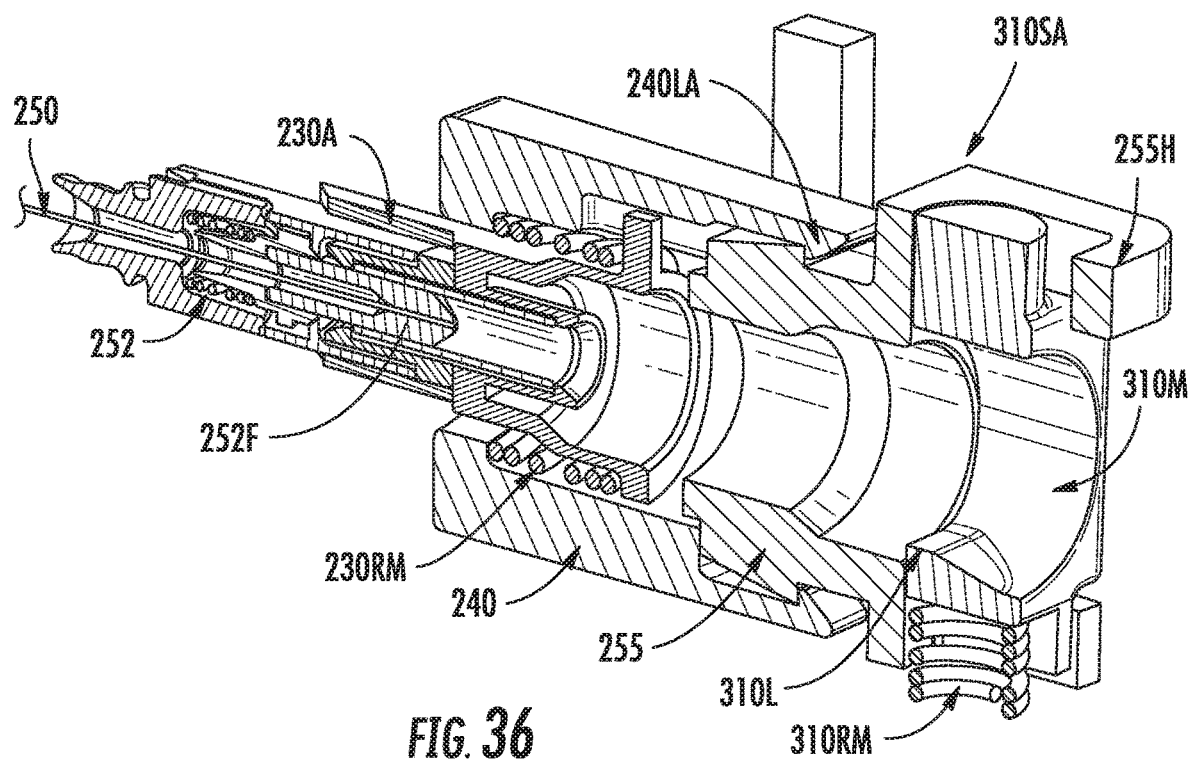
FIG. 36 is a longitudinal sectional view of the modular adapter sub-assembly of FIG. 35.
Figure 37:
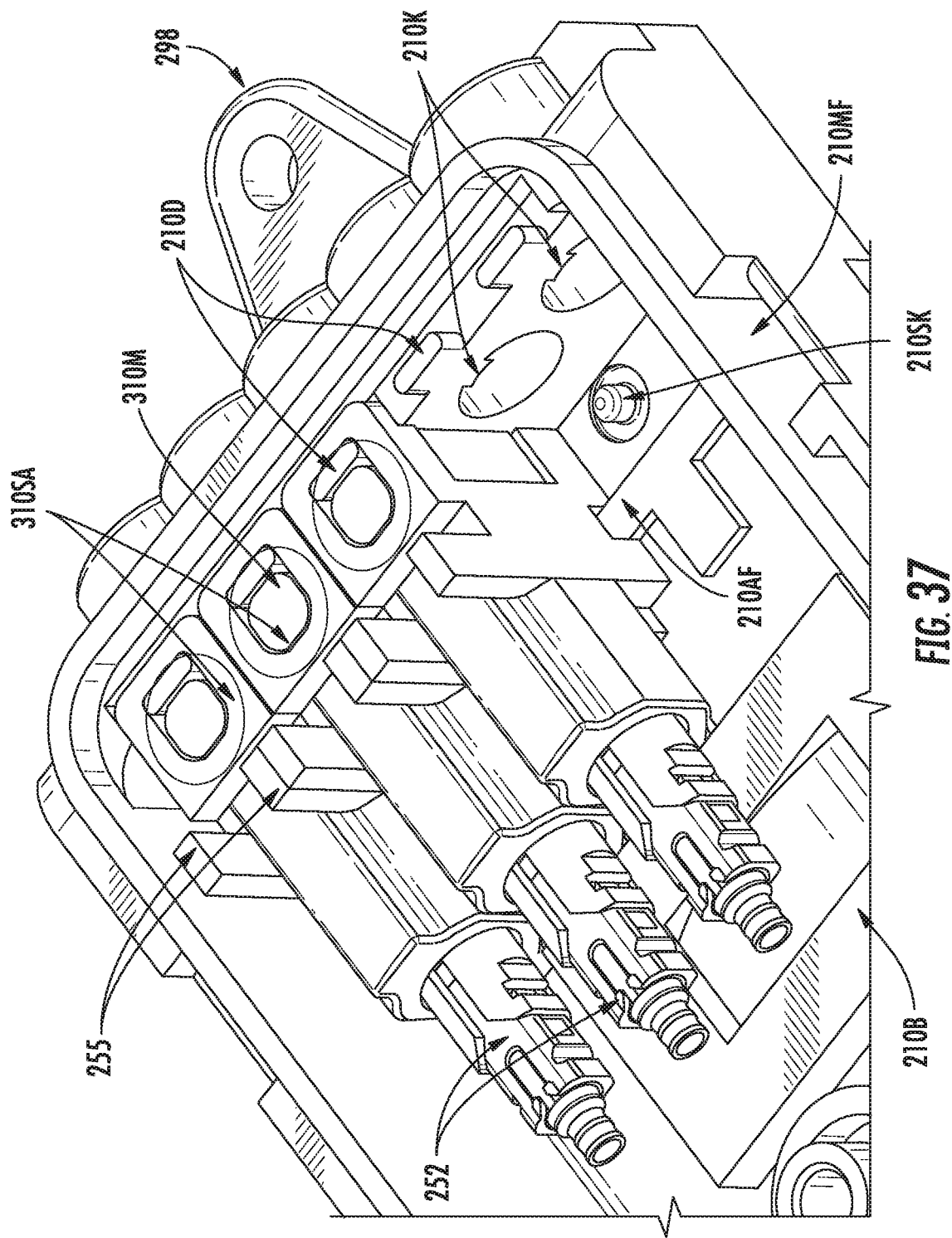
FIG. 37 is a detailed top perspective view of the modular adapter sub-assemblies of FIG. 35 being loaded into the second portion of the shell with the optical fibers removed for clarity.

FIG. 33 depicts a partially exploded view of another multiport 200 that is similar to multiport 200 of FIGS. 3 and 4 and has the optical fibers 250 removed for clarity, and FIGS. 34-36 are views of the modular adapter sub-assembly 310SA of the multiport 200 of FIG. 33. FIG. 37 shows the modular adapter sub-assemblies 310SA of FIG. 35 being loaded into the second portion 210B of the shell 210.

Like, the multiport 200 of FIGS. 3 and 4, this securing feature 310 comprises an actuator 310A and a securing member 310M with the securing member 310M being a portion of a modular adapter sub-assembly 310SA for ease of assembly and isolation of the retaining mechanisms so they can float independently. The securing feature member 310M of securing feature 310 is suitable for retaining connector in connection port 236 as discussed herein. Various different embodiments are possible for securing features 310 comprising more than one component for the devices disclosed.

Multiport 200 of FIG. 33 comprise one or more connection ports 236 and the one or more securing feature passageways 245 as a portion of the shell 210. Multiport 200 of FIG. 33 comprises a shell 210 comprising a body 232 with one or more connection ports 236 disposed on a first end or portion 212 with each connection port 236 comprising a respective optical connector opening 238. The optical connector openings 238 extend from an outer surface 234 of shell 210 into a cavity 216 and define a connection port passageway 233. One or more respective securing feature passsageways 245 extend from the outer surface 234 of the shell 210 to the respective connection port passageways 233. A plurality of security features 310 are associated with the respective plurality of connection ports 236. As depicted, shell 210 is formed by a first portion 210A and a second portion 210B.

FIGS. 34-36 are views of the modular adapter sub-assembly 310SA of the multiport 200 of FIG. 33, that is similar to the modular adapter sub-assembly 310SA used in the multiport 200 of FIGS. 3 and 4. The main difference in the modular adapter sub-assembly of FIGS. 34-36 are in the design of the adapter body 255. In this adapter body 255 the securing feature resilient member 310RM is not capture in a resilient member pocket of the adapter body 255. Instead, the second shell 210B comprises a spring keeper 210SK adjacent to the respective connection port 236 best shown in FIG. 37. This may make the assembly of the multiport 200 more challenging. Additionally, adapter body 255 of the multiport 200 of FIG. 33 has different alignment feature 255Af on the bottom of the adapter body 255.

FIG. 37 is a top detailed perspective view of the modular adapter sub-assemblies of FIG. 35 being loaded into the second portion 210B of the shell 210 with the optical fibers removed for clarity. As best shown in FIG. 37, the modular sub-assembles 310SA are individually placed into the second portion 210B of shell 210 after the securing feature resilient member 310RM is place about the spring keeper 210SK. As shown the alignment features 210AF of the second portion 210B of shell 210 align the modular adapter sub-assembly 310SA with the respective connection ports 236. In this embodiment, the alignment features 210AF are configured as a T-rail for seating the adapter body 255.

Figure 38:
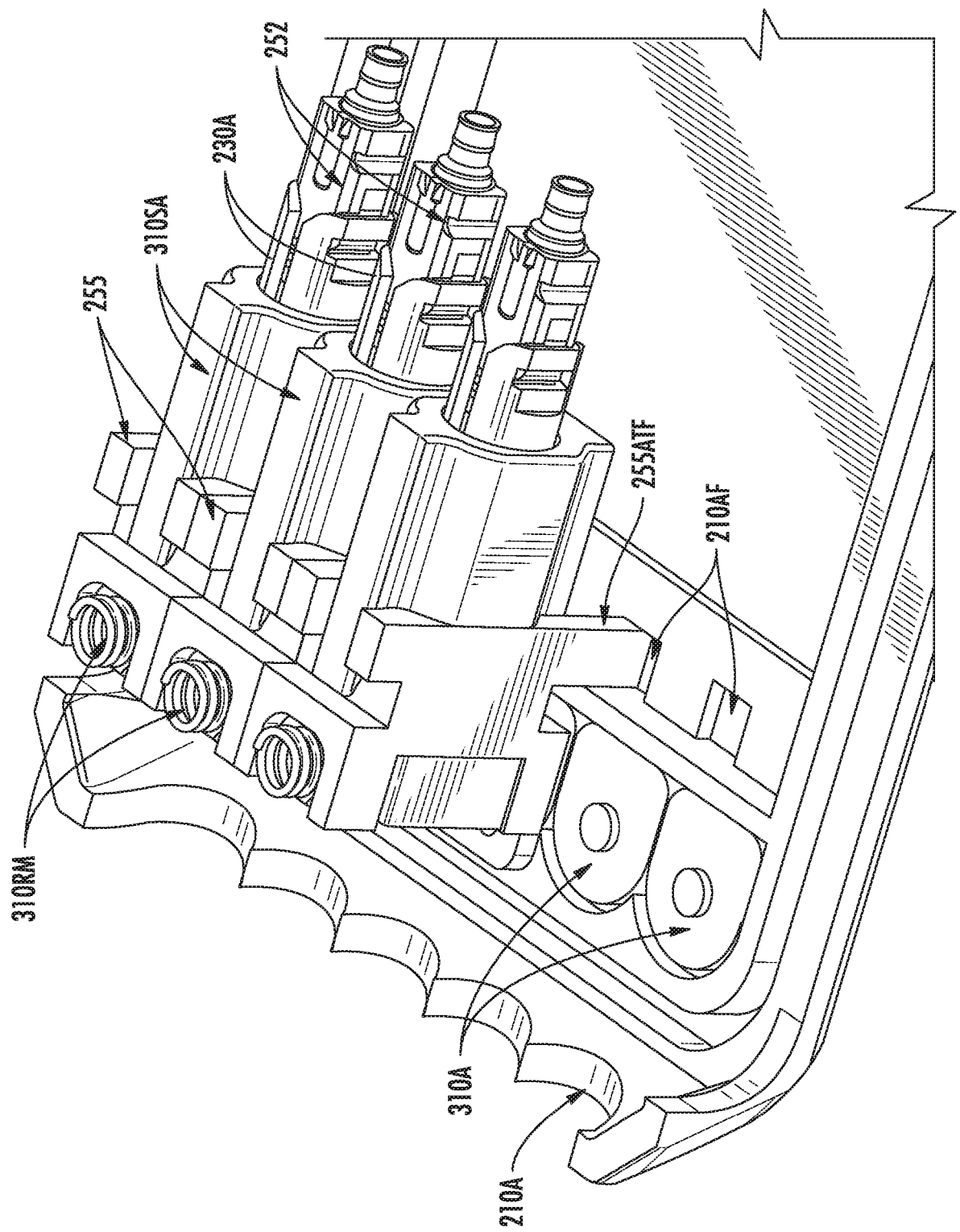
FIG. 38 is a detailed perspective view showing how the features of the modular sub-assemblies of FIG. 35 engage the first portion of the shell when assembled.

FIG. 38 is a detailed perspective view showing how the features of the modular adapter sub-assemblies 310SA of FIG. 35 engage the first portion 210A of the shell 210 when assembled. FIG. 38 depicts a partial assembled view of multiport 200 of FIG. 33 showing the respective actuators 310A placed into securing feature passageways 245 within the first portion 210A of the shell 210 and the modular sub-assemblies 310SA being placed on the first portion 210A of the shell. This view is shown to depict the cooperating geometry between the modular sub-assembles 310SA and the first portion 210A of shell 210. Like the other multiport 200, first portion 210A of shell 210 also comprises alignment features 210AF sized and shaped for cooperating with the alignment features 255AFT on the top of adapter body 255 for securing the same when the multiport is assembled. The respective alignment features 210AF,255AF only allow assembly of the modular adapter sub-assemblies 310AS into the shell 210 in one orientation for the correct orientation of the locking feature 310L with respect to the connection port 236. This view also shows that actuators 310A have a different geometry since they do not have a completely round form-factor like the actuators 310A shown in FIGS. 19 and 20. After the internal assembly is completed, the first and second portions 210A,210B of shell 210 may assembled in suitable fashion using a sealing element 290 or not.

FIG. 39 is a detailed sectional views of the multiport 200 of FIG. 33 through the connection port for showing the internal construction of the multiport with a fiber optic connector retained using the securing feature 310. As shown in FIG. 39, the connector mating plane 230MP between the ferrule of the rear connector 252 and ferrule of connector 10 is disposed within the cavity 216 multiport 200 for protecting the connector mating interface. Specifically, the respective ferrules are aligned using the ferrule sleeve 230FS. Connector 10 includes a locking feature 20L on the housing 20 for cooperating with a securing feature 310 of multiport 200. This arrangement is similar for retaining connectors 10 in the multiport 200 of FIGS. 3 and 4. Connector 10 comprises at least one O-ring 65 for sealing with the connector port passageway 233 at a sealing surface when the connector 10 is fully inserted into the connection port 236.

FIGS. 40A and 40B depicts the use of an input tether 270 with multiport 200. The concepts disclosed may be used with the pass-through cables as well. Input tether 270 has optical fibers 250 that enter the multiport 200 and are terminated with to rear connectors 252 for making an optical connection at the connection port 236. In this embodiment, there is no securing feature for the input connection port 260. However, other embodiments may retain the securing feature and secure the input tether 270 from inside the device.

If used, input tether 270 may terminate the other end with a fiber optic connector or be a stubbed cable as desired. For instance, the input tether connector could be an OptiTip® connector for optical connection to previously installed distribution cables; however, other suitable single-fiber or multi-fiber connectors may be used for terminating the input tether 270 as desired. Input tether 270 may be secured to the multiport 200 in other suitable manners inside the multiport such as adhesive, a collar or crimp, heat shrink or combinations of the same. In other embodiments, the input tether could be secured using a securing member internal to the shell without the actuator as shown. The input tether to multiport interface could also be weatherproofed in a suitable manner. The input tether 270 may also have stubbed optical fibers for splicing in the field if desired, instead of the connector 278.

Furthermore, the input tether 270 may further comprise a furcation body that has a portion that fits into the multiport 200 at the input port of the shell 210 such as into the optical connector opening 238 of the input connection port 260, but the furcation body may be disposed within the shell 210 if desired as well. The furcation body is a portion of the input tether that transitions the optical fibers 250 to individual fibers for routing within the cavity 216 of the shell 210 to the respective connector ports. As an example, a ribbon may be used for insertion into the back end of the ferrule of fiber optic connector 278 and then be routed through the input tether 270 to the furcation body where the optical fibers are then separated out into individual optical fibers 250. From the furcation body the optical fibers 250 may be protected with a buffer layer or not inside the cavity 216 of the multiport 200 and then terminated on rear connector 252 as desired.

The input tether 270 may be assembled with the rear connectors 252 and/or fiber optic connector 278 in a separate operation from the assembly of multiport 200 if the rear connectors 252 fit through the input port. Thereafter, the rear connectors 252 may be individually threaded into the input connection port 260 of the multiport with the appropriate routing of the optical fiber slack and then have the rear connectors 252 attached to the appropriate structure for optical communication with the connection port passageways 233 of the multiport 200. The furcation body may also be secured to the connection port insert in the manner desired. By way of explanation, the input tether may be secured to shell 210 using a collar that fits into a cradle. This attachment of the input tether using collar and cradle provides improved pull-out strength and aids in manufacturing; however, other constructions are possible for securing the input tether.

Figure 41:
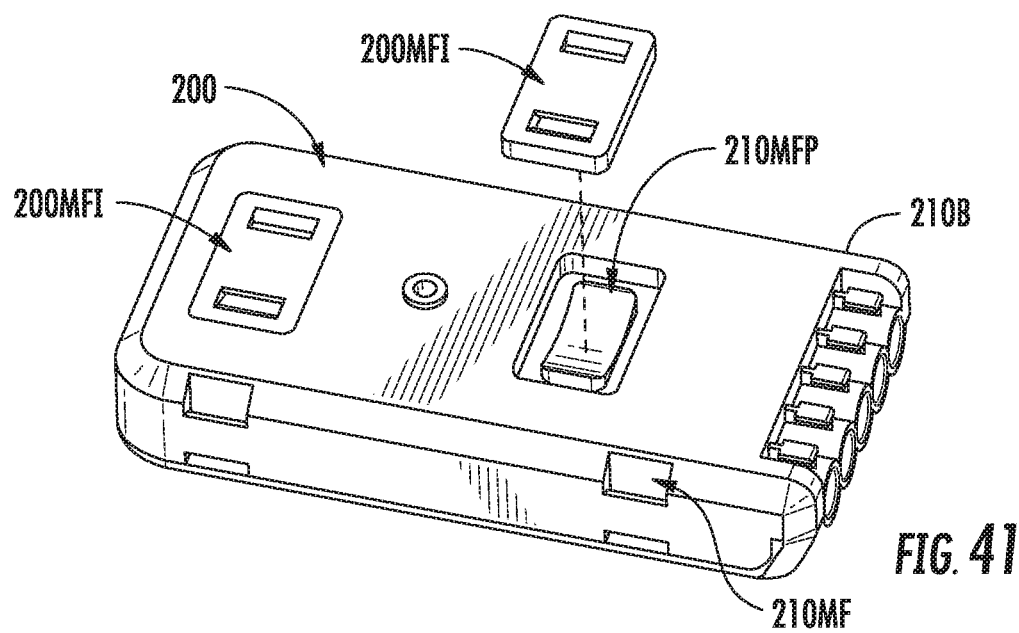
FIGS. 41-43 depict various views of a mounting feature insert that may be attached to the bottom of the second portion of the shell for use with the devices disclosed.
Figure 42:
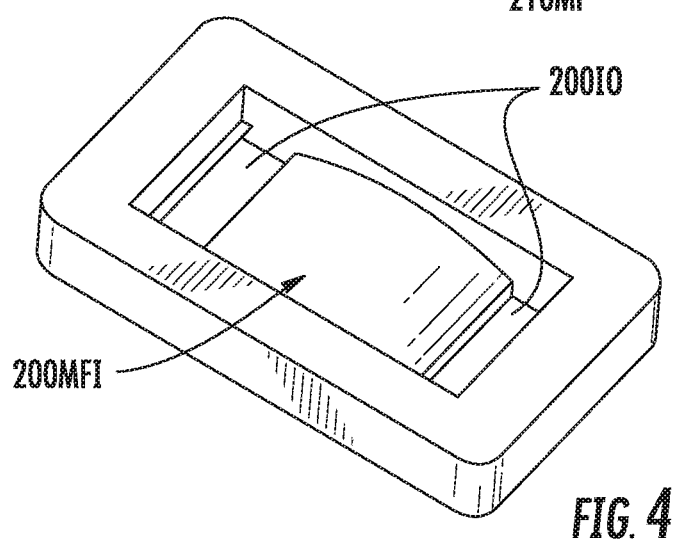
Figure 43:
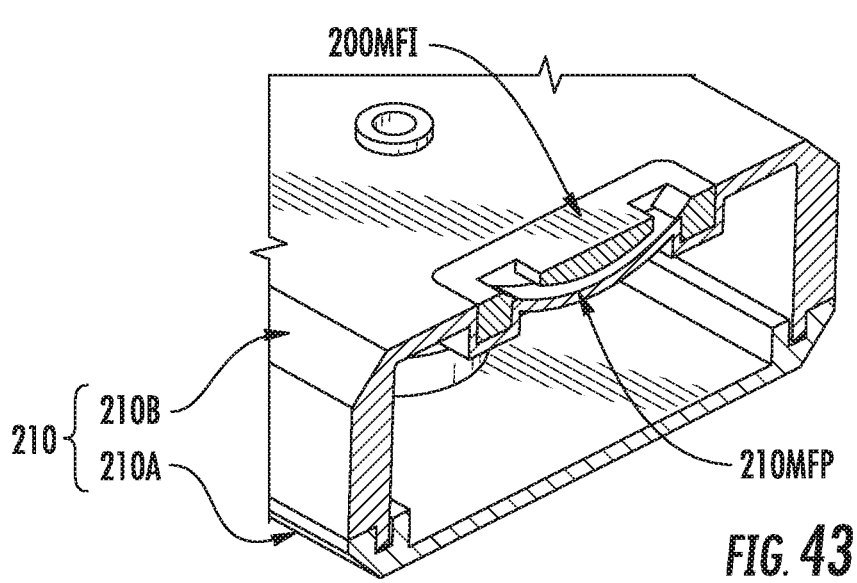

FIGS. 41-43 depict various views of a mounting feature insert 200MFI that may be attached to a portion of the shell 210 for securing the device such as with a band or tie-strap. FIG. 41 shows the bottom of the second portion 210B of shell 210 comprising one or more pockets 210MFP. As shown, mounting feature insert 200MFI cooperates with a suitable pocket 210MF to snap-fit together with a band for securing the multiport to a pole or the like. FIG. 42 depicts the mounting feature insert 200MFI comprising insert openings 200IO disposed on opposite sides of a curved saddle for receiving a band or strap, and FIG. 43 is a cross-sectional view of the cooperation between mounting feature insert 200MFI and the second portion 210B of shell 210.

Figure 44:
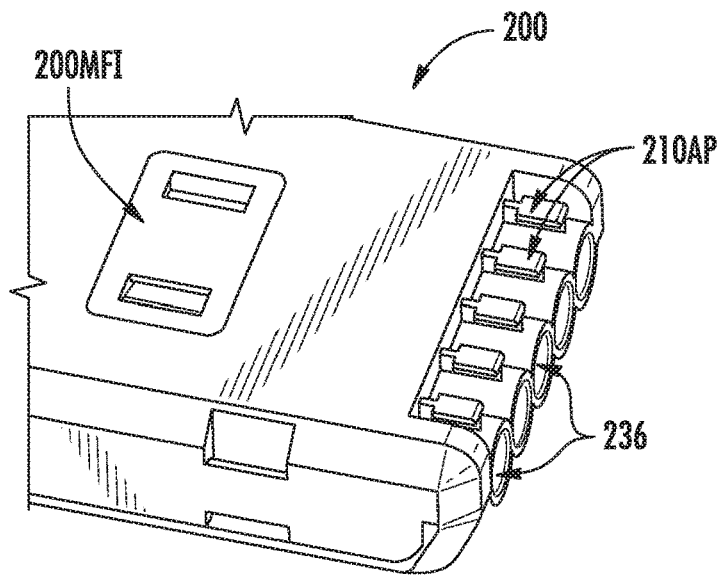
FIGS. 44-46 depict various views of a mounting tab that may be attached to the front end of the second portion of the shell for use with the devices disclosed.
Figure 45:
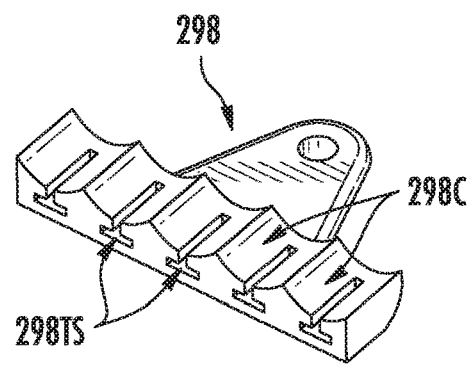
Figure 46:
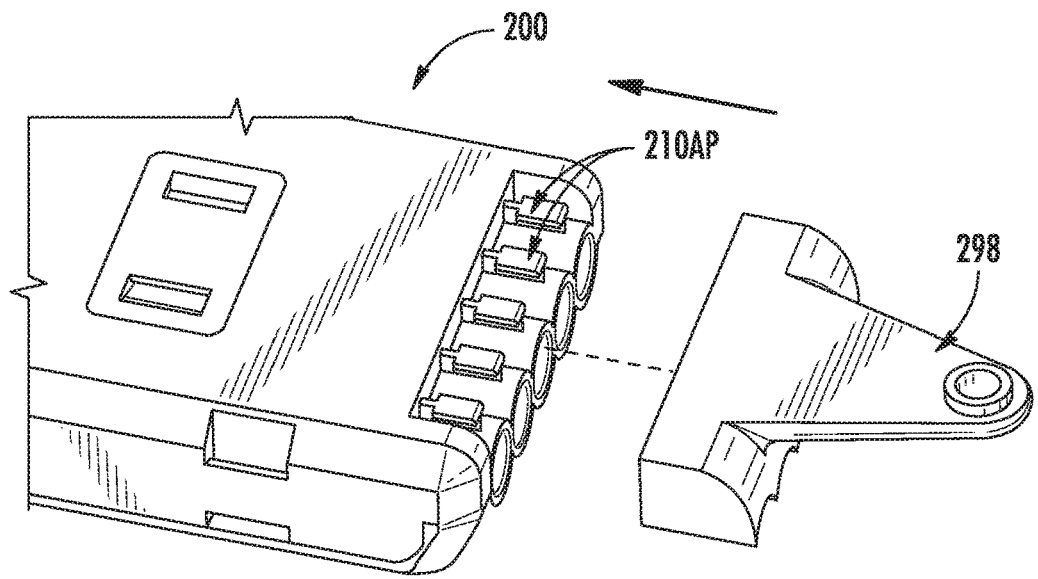

FIGS. 44-46 depict various views of a mounting feature 298 that may be attached to the front end of the second portion 210B of the shell 210 similar to the other mounting tab 298 disclosed. FIG. 44 depicts alignment protrusions 210AP on the front end 212 of second portion 210B of shell 210 for securing mounting tab 298. Alignment protrusions are configured as T-rails in this embodiment, but other geometry is possible. Specifically, alignment protrusions 210AP cooperate with a plurality of T-rail slots on mounting tab 298 as shown in FIG. 45 for aligning and attaching the mounting tab to the shell 210 of the multiport 200. Mounting tab 298 may be attached to the shell 210 as shown in FIG. 46, and adhesive or fastener may be used as desired. Other variations of for the mounting tab are possible.

As shown in FIGS. 47 and 48, multiports 200 may also have one or more dust caps 295 for protecting the connection port 236 or input connection ports 260 from dust, dirt or debris entering the multiport or interfering with the optical performance. Thus, when the user wishes to make an optical connection to the multiport, the appropriate dust cap 295 is removed from the connector port 236 and then connector 10 of cable assembly 100 may be inserted into the respective connection port 236 for making an optical connection to the multiport 200. Dust caps 295 may use similar release and retain features as the connectors 10. By way of explanation, when securing feature 310 is pushed inward or down, the dust cap 295 is released and may be removed. Moreover, the interface between the connection ports 236 and the dust cap or connector 10 may be sealed using appropriate geometry and/or a sealing element such as an O-ring or gasket.

Figure 49:
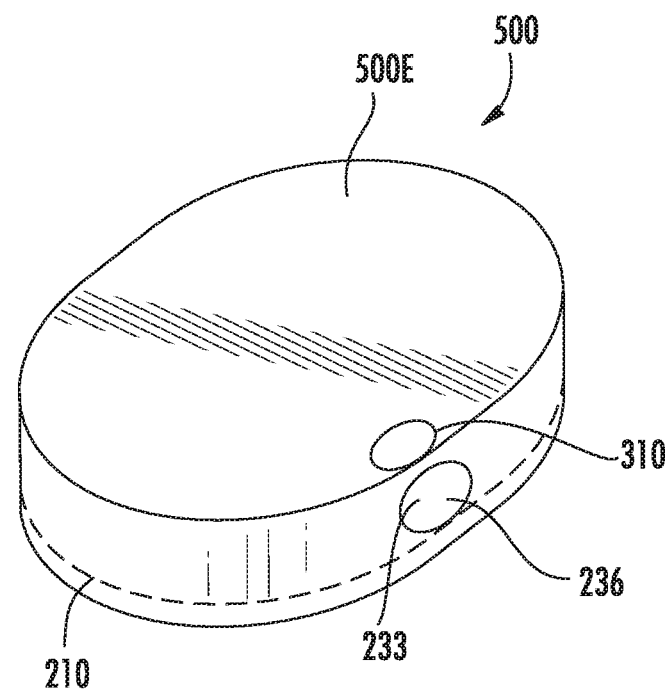
FIG. 49 is a perspective view of a wireless device comprising at least one connector port and a securing member according to the concepts disclosed herein.

FIG. 49 is a perspective view of a wireless device 500 having a similar construction to the concepts disclosed herein and comprising at least one connector port 236 associated with securing member 310. Wireless device 500 may have a securing feature resilient member 310RM for biasing a portion of the securing feature 310. Wireless device 500 may comprise one or more connection ports 236 disposed on the portion of shell 210 as shown in FIG. 49. Wireless device 500 may have an input port that includes power and may have electronics 500E (not visible) disposed with in the cavity (not visible) of the device. The wireless device 500 may have any of the other features disclosed herein and they will not be repeated for the sake of brevity.

Figure 50:
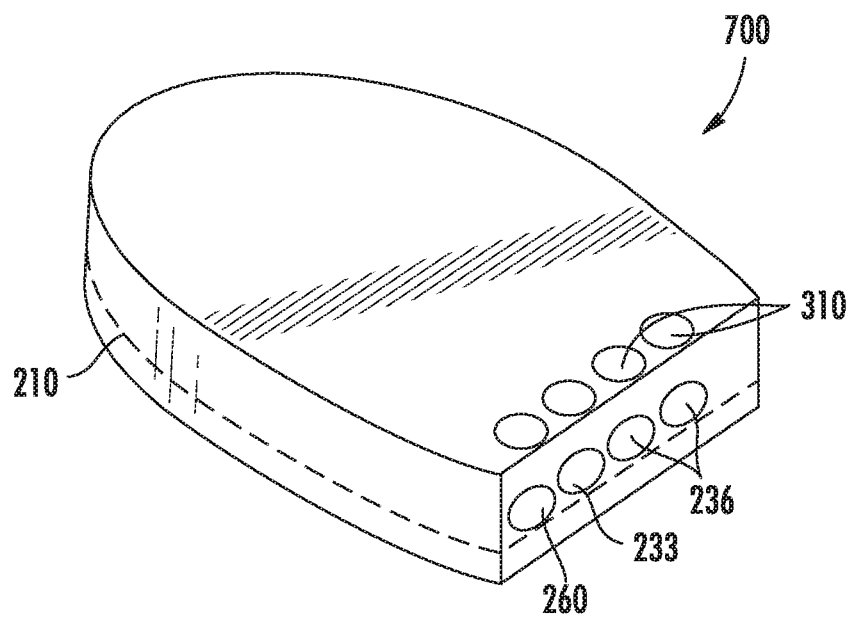
FIG. 50 is a perspective view of a closure comprising at least one connector port and a securing member according to the concepts disclosed herein.

Still other devices are possible according to the concepts disclosed. FIG. 50 is a perspective view of a closure 700 comprising at least one connector port 236 and associated securing member 310. Like wireless device 500, closure 700 may comprise one or more connection ports 236 disposed on the portion of shell 210 as shown in FIG. 50. Closure 700 may also have a securing feature resilient member 310RM for biasing a portion of the securing feature 310. Closure 700 may have one or more input ports or include other components disposed with in the cavity (not visible) of the device as disclosed herein. The closure 700 may have any of the other features disclosed herein and they will not be repeated for the sake of brevity.

Methods for making devices 200, 500 and 700 are also disclosed herein. The methods disclosed may further include installing at least one securing feature 310 into a device 200, 500 and 700 so that the at least one securing feature 310 is associated with connection port 236. The securing feature 310 may translate between an open position OP and a retain position RP, and at least one securing feature resilient member (310RM) is positioned for biasing a portion of the at least one securing feature (310) to a retain position RP.

The methods may further comprise the securing feature (310) comprising a locking feature 310L. The locking feature further comprise a ramp with a ledge.

The methods may further comprise at least one securing feature (310) translating from a retain position (RP) to an open position (OP) as a suitable fiber optic connector (10) is inserted into the at least one connection port (236).

The method may further comprise securing feature 310 being capable of moving to a retain position RP automatically when a suitable fiber optic connector is fully-inserted into the at least one connector port passageway 233.

The method may further comprise translating the securing feature 310 for moving the securing feature 310 to the open position OP from a normally-biased closed position CP.

Although the disclosure has been illustrated and described herein with reference to explanatory embodiments and specific examples thereof, it will be readily apparent to those of ordinary skill in the art that other embodiments and examples can perform similar functions and/or achieve like results. For instance, the connection port insert may be configured as individual sleeves that are inserted into a passageway of a device, thereby allowing the selection of different configurations of connector ports for a device to tailor the device to the desired external connector. All such equivalent embodiments and examples are within the spirit and scope of the disclosure and are intended to be covered by the appended claims. It will also be apparent to those skilled in the art that various modifications and variations can be made to the concepts disclosed without departing from the spirit and scope of the same. Thus, it is intended that the present application cover the modifications and variations provided they come within the scope of the appended claims and their equivalents.

I claim:

1. A multiport for making optical connections, comprising:
 a shell;
 at least one connection port comprising an optical connector opening extending from an outer surface of the multiport into a cavity and defining a connection port passageway;
 at least one modular adapter sub-assembly disposed within the shell;

at least one securing feature capable of translating being associated with the at least one connection port passageway, and the at least one securing feature comprises an actuator and a securing member, wherein the securing member comprises a bore and a locking feature, and the securing member is part of the modular adapter sub-assembly, wherein the at least one securing feature translates from a retain position to an open position as a suitable fiber optic connector is inserted into the at least one connection port;

a sealing feature disposed on the at least one securing feature; and at least one securing feature resilient member for biasing a portion of the at least one securing feature, wherein of the at least one securing feature is biased to a retain position.

2. The multiport of claim 1, wherein the locking feature comprises a ramp with a ledge.

3. The multiport of claim 2, wherein the locking feature comprises a retention surface.

4. The multiport of claim 1, wherein the at least one connection port is a portion of the shell.

5. The multiport of claim 4, the shell comprises at least a first portion and a second portion.

6. The multiport of claim 1, wherein the multiport is weatherproof.

7. The multiport of claim 1, wherein the bore that is aligned with the at least one connection port passageway.

8. The multiport of claim 1, wherein the at least one securing feature is capable of releasing a fiber optic connector when translating to an open position.

9. The multiport of claim 1, wherein the at least one securing feature is capable of moving to a retain position automatically when a suitable fiber optic connector is fully-inserted into the at least one connector port passageway.

10. The multiport of claim 1, wherein the bore comprises the locking feature.

11. The multiport of claim 1, at least one optical fiber routed from the at least one connection port toward an input connection port of the multiport.

12. The multiport of claim 1, the at least one modular adapter sub-assembly comprising an adapter aligned with the at least one connection port.

13. The multiport of claim 12, the at least one modular adapter sub-assembly comprising an adapter body and a retainer, wherein the adapter is secured to the adapter body using retainer.

14. The multiport of claim 1, the at least one modular adapter sub-assembly capable of floating relative to the at least one connection ports passageway.

15. The multiport of claim 1, further comprising at least one rear connector comprising a rear connector ferrule.

16. The multiport of claim 1, further comprising at least one rear connector having a SC footprint.

17. The multiport of claim 1, further comprising an optical splitter disposed within the cavity.

18. The multiport of claim 1, the connection port passageway comprising a keying portion.

19. The multiport of claim 18, wherein the keying portion comprises a male key.

20. The multiport of claim 1, wherein the shell defines a volume of 800 cubic centimeters or less.

21. The multiport of claim 1, wherein the multiport has a port width density of at least one connection port per each 20 millimeters of width of multiport.

22. The multiport of claim 1, further comprising a sealing element.

* * * * *

UNITED STATES PATENT AND TRADEMARK OFFICE
CERTIFICATE OF CORRECTION

| | |
|---|---|
| PATENT NO. | : 11,668,890 B2 |
| APPLICATION NO. | : 16/658627 |
| DATED | : June 6, 2023 |
| INVENTOR(S) | : Joel Christopher Rosson |

It is certified that error appears in the above-identified patent and that said Letters Patent is hereby corrected as shown below:

On the Title Page

On the page 2, in Column 2, (U.S. Patent Documents), Line 41, delete "Burek" and insert -- Burek et al. --.

On the page 9, in Column 2, under "Other Publications", Line 39, delete "Poeceedings" and insert -- Proceedings --.

In the Specification

In Column 1, Line 15, delete "2018." and insert -- 2018; --.

Signed and Sealed this
Fifth Day of December, 2023

Katherine Kelly Vidal
*Director of the United States Patent and Trademark Office*